United States Patent
Ackerson et al.

(10) Patent No.: US 10,521,952 B2
(45) Date of Patent: Dec. 31, 2019

(54) QUOTIDIAN SCENE RECONSTRUCTION ENGINE

(71) Applicant: QUIDIENT, LLC, Easton, MD (US)

(72) Inventors: David Scott Ackerson, Easton, MD (US); Donald J. Meagher, Candia, NH (US); John K. Leffingwell, Madison, AL (US); Kostas Daniilidis, Wynnewood, PA (US)

(73) Assignee: Quidient, LLC, Easton, MD (US)

( * ) Notice: Subject to any disclaimer, the term of this patent is extended or adjusted under 35 U.S.C. 154(b) by 0 days.

(21) Appl. No.: 16/089,064

(22) PCT Filed: Apr. 11, 2017

(86) PCT No.: PCT/US2017/026994
§ 371 (c)(1),
(2) Date: Sep. 27, 2018

(87) PCT Pub. No.: WO2017/180615
PCT Pub. Date: Oct. 19, 2017

(65) Prior Publication Data
US 2019/0130630 A1  May 2, 2019

Related U.S. Application Data

(60) Provisional application No. 62/321,564, filed on Apr. 12, 2016, provisional application No. 62/352,379, (Continued)

(51) Int. Cl.
*G06T 15/08* (2011.01)
*G06T 7/557* (2017.01)
(Continued)

(52) U.S. Cl.
CPC ............ *G06T 15/08* (2013.01); *G06T 7/0002* (2013.01); *G06T 7/557* (2017.01); *G06T 9/001* (2013.01);
(Continued)

(58) Field of Classification Search
CPC .................... G06T 15/08; G06T 7/557; G06T 2207/10052
See application file for complete search history.

(56) References Cited

U.S. PATENT DOCUMENTS 6,123,733 A * 9/2000 Dalton ................... G06T 15/08
324/307
8,547,374 B1 * 10/2013 Sadjadi .................. G06T 17/00
345/419

(Continued)

OTHER PUBLICATIONS

International Search Report for PCT/US2017/026994, dated Jul. 6, 2017, 2 pages.
(Continued)

*Primary Examiner* — Pinkal R Chokshi
*Assistant Examiner* — Frank Johnson
(74) *Attorney, Agent, or Firm* — Nixon & Vanderhye, P.C.

(57) ABSTRACT

A stored volumetric scene model of a real scene is generated from data defining digital images of a light field in a real scene containing different types of media. The digital images have been formed by a camera from opposingly directed poses and each digital image contains image data elements defined by stored data representing light field flux received by light sensing detectors in the camera. The digital images are processed by a scene reconstruction engine to form a digital volumetric scene model representing the real scene. The volumetric scene model (i) contains volumetric data elements defined by stored data representing one or more media characteristics and (ii) contains solid angle data elements defined by stored data representing the flux of the
(Continued)

light field. Adjacent volumetric data elements form corridors, at least one of the volumetric data elements in at least one corridor represents media that is partially light transmissive. The constructed digital volumetric scene model data is stored in a digital data memory for subsequent uses and applications.

66 Claims, 53 Drawing Sheets

Related U.S. Application Data filed on Jun. 20, 2016, provisional application No. 62/371,494, filed on Aug. 5, 2016, provisional application No. 62/420,797, filed on Nov. 11, 2016, provisional application No. 62/427,603, filed on Nov. 29, 2016, provisional application No. 62/430,804, filed on Dec. 6, 2016, provisional application No. 62/456,397, filed on Feb. 8, 2017.

(51) Int. Cl.
| | |
|---|---|
| *G06T 9/40* | (2006.01) |
| *H04N 13/111* | (2018.01) |
| *G06T 7/00* | (2017.01) |
| *G06T 15/20* | (2011.01) |
| *G06T 9/00* | (2006.01) |
| *H04N 5/76* | (2006.01) |
| *H04N 5/232* | (2006.01) |
| *G06T 17/00* | (2006.01) |

(52) U.S. Cl.
CPC .............. *G06T 9/40* (2013.01); *G06T 15/205* (2013.01); *H04N 13/111* (2018.05); *G06T 17/005* (2013.01); *G06T 2207/10052* (2013.01); *G06T 2207/10148* (2013.01); *G06T 2207/20016* (2013.01); *G06T 2207/30252* (2013.01); *H04N 5/23229* (2013.01); *H04N 5/76* (2013.01)

(56) References Cited

U.S. PATENT DOCUMENTS

| | | | |
|---|---|---|---|
| 8,749,620 | B1 | 6/2014 | Knight et al. |
| 2008/0068372 | A1* | 3/2008 | Krah ..................... H04N 13/363 345/419 |
| 2011/0128412 | A1 | 6/2011 | Milnes et al. |
| 2013/0038696 | A1* | 2/2013 | Ding ........................ G02B 5/09 348/47 |
| 2014/0184749 | A1 | 7/2014 | Hilliges et al. |
| 2014/0201022 | A1* | 7/2014 | Balzer ................ G01N 21/8806 705/26.4 |
| 2015/0373320 | A1* | 12/2015 | Ackerson ................ G06T 17/00 348/44 |
| 2016/0028935 | A1 | 1/2016 | El-Ghoroury et al. |
| 2018/0113200 | A1* | 4/2018 | Steinberg ................ G01S 7/497 |
| 2018/0144540 | A1* | 5/2018 | Novak .................... G06T 15/10 |
| 2018/0149791 | A1* | 5/2018 | Urness ................ G02B 6/0028 |
| 2018/0227568 | A1* | 8/2018 | Vetter ..................... G06T 15/08 |
| 2019/0011621 | A1* | 1/2019 | Karafin ................ H04N 13/344 |
| 2019/0072897 | A1* | 3/2019 | Jepsen ................ G03H 1/0406 |
| 2019/0155835 | A1* | 5/2019 | Daugharthy .............. G06T 7/90 |

OTHER PUBLICATIONS

Written Opinion of the ISA for PCT/US2017/026994, dated Jul. 6, 2017, 7 pages.

* cited by examiner

901 – Single Center, Unidirectional Sael Arrangement

903 – Single Center, Multidirectional Saels Arrangement

905 – Single Center, Omnidirectional Saels Arrangement

907 – Single Center, Isotropic Sael Arrangement

911 – Planar Centers, Unidirectional Saels Arrangement

913 – Volumetric Centers, Omnidirectional Saels Arrangement

QUOTIDIAN SCENE RECONSTRUCTION ENGINE

CROSS REFERENCE TO RELATED APPLICATIONS

This application is the U.S. national phase of International Application No. PCT/US2017/026994 filed Apr. 11, 2017, which designated the U.S. and claims the benefit of priority of U.S. Provisional Patent Application No. 62/321,564, filed Apr. 12, 2016, U.S. Provisional Patent Application No. 62/352,379, filed Jun. 20, 2016, U.S. Provisional Patent Application No. 62/371,494, filed Aug. 5, 2016, U.S. Provisional Patent Application No. 62/427,603, filed Nov. 29, 2016, U.S. Provisional Patent Application No. 62/430,804, filed Dec. 6, 2016, U.S. Provisional Patent Application No. 62/456,397, filed Feb. 8, 2017, and U.S. Patent Application No. 62/420,797, filed Nov. 11, 2016, the disclosures of which are incorporated herein by reference in their entireties.

FIELD OF THE INVENTION

The present invention relates to the field of 3D imaging in general, and more particularly, volumetric scene reconstruction.

BACKGROUND OF THE INVENTION 3D images are digital 3D models of real-world scenes that are captured for a variety of purposes, including visualization and information extraction. They are acquired by 3D imagers which are variously referred to as 3D sensors, 3D cameras, 3D scanners, VR cameras, 360° cameras, and depth cameras. They address the need for 3D information in applications used in global sectors including defense, security, entertainment, education, healthcare, infrastructure, manufacturing, and mobile.

A number of methods have been developed to extract 3D information from a scene. Many involve active light sources such as lasers and have limitations such as high power consumption and limited range. An almost ideal method is to use two or more images from inexpensive cameras (devices that form images by sensing a light field using detectors) to generate detailed scene models. The term Multi-View Stereo (MVS) will be used here, while it and variations are also known by other names such as photogrammetry, Structure-from-Motion (SfM), and Simultaneously Localization And Mapping (SLAM) among others. A number of such methods are presented in the Furukawa reference, "Multi-View Stereo: A Tutorial." It frames MVS as an image/geometry consistency optimization problem. Robust implementations of photometric consistency and efficient optimization algorithms are found to be critical for successful algorithms.

To increase the robustness of the extraction of scene models from images, an improved modeling of the transport of light is needed. This includes the characteristics of light interactions with matter, including transmission, reflection, refraction, scattering and so on. The thesis of Jarosz, "Efficient Monte Carlo Methods for Light Transport in Scattering Media" (2008) provides an in-depth analysis of the subject.

In the simplest version of MVS, if the viewpoints and poses of a camera are known for two images, the position of a "landmark" 3D point in a scene can be computed if the projection of the point can be found in the two images (its 2D "feature" points) using some form of triangulation. (A feature is characteristics of an entity expressed in terms of a description and a pose. Examples of features include a spot, a glint, or a building. The description i) can be used to find instances of the feature at poses in a field (space in which entities can be posed), or ii) can be formed from descriptive characteristics at a pose in a field.) Surfaces are extracted by combining many landmarks. This works as long as the feature points are, indeed, correct projections of fixed landmark points in the scene and not caused by some viewpoint-dependent artifact (e.g., specular reflections, intersection of edges). This can be extended into many images and situations where the viewpoints and poses of the camera are not known. The process of resolving the landmark locations and camera parameters is called Bundle Adjustment (BA) although there are many variations and other names used for specific uses and situations. This topic is comprehensively discussed by Triggs in his paper "Bundle Adjustment—A Modern Synthesis" (2009). An important subtopic in BA is being able to compute a solution without explicitly generating derivatives analytically, which become increasingly difficult computationally as the situation becomes complex. An introduction to this is given by Brent in the book "Algorithms for Minimization Without Derivatives."

While two properties of light, color and intensity, have been used in MVS, there are major limitations when used with everyday scenes. These include an inability to accurately represent surfaces without textures, non-Lambertian objects and transparent objects in the scene. (An object is media that is expected to be collocated. Examples of objects include: a leaf, a twig, a tree, fog, clouds and the earth.) To solve this, a third property of light, polarization, has been found to extend scene reconstruction capabilities. The use of polarimetric imaging in MVS is called Shape from Polarization (SIP). The Wolff, U.S. Pat. No. 5,028,138, discloses basic SfP apparatus and methods based on specular reflection. Diffuse reflections, if they exist, are assumed to be unpolarized. The Barbour U.S. Pat. No. 5,890,095 discloses a polarimetric imaging sensor apparatus and a micropolarizer array. The Barbour U.S. Pat. No. 6,810,141 discloses a general method of using a SPI sensor to provide information about objects, including information about 3D geometry. The d'Angelo patent DE102004062461 discloses apparatus and methods for determining geometry based on Shape from Shading (SfS) in combination with SfP. The d'Angelo patent DE102006013318 discloses apparatus and methods for determining geometry based on SfS in combination with SIP and a block matching stereo algorithm to add range data for a sparse set of points. The Morel patent WO 2007057578 discloses an apparatus for SfP of highly reflective objects.

The Koshikawa paper, "A Model-Based Recognition of Glossy Objects Using Their Polarimetrical Properties," is generally considered to be the first paper disclosing the use of polarization information to determine the shape of dielectric glossy objects. Later, Wolff showed in his paper, "Polarization camera for computer vision with a beam splitter," the design of a basic polarization camera. The Miyazaki paper, "Determining shapes of transparent objects from two polarization images," develops the SIP method for transparent or reflective dielectric surfaces. The Atkinson paper, "Shape from Diffuse Polarization," explains the basic physics of surface scattering and describes equations for determining shape from polarization in the diffuse and specular cases. The Morel paper, "Active Lighting Applied to Shape from Polarization," describes an SfP system for reflective metal surfaces that makes use of an integrating dome and active lighting. It explains the basic physics of surface scattering and describes equations for determining shape from polarization in the diffuse and specular cases. The d'Angelo Thesis, "3D Reconstruction by Integration of Photometric and Geometric Methods," describes an approach to 3D reconstruction based on sparse point clouds and dense depth maps.

While MVS systems are mostly based on resolving surfaces, improvements have been found by increasing the dimensionality of the modeling using dense methods. Newcombe explains this advancement in his paper "Live Dense Reconstruction with a Single Moving Camera" (2010). Another method is explained by Wurm in the paper "Octo-Map: A Probabilistic, Flexible, and Compact 3D Map Representation for Robotic Systems" (2010).

When applying MVS methods to real-world scenes the computational requirements can quickly become impractical for many applications, especially for mobile and low-power operation. In areas outside MVS such as medical imaging where such computational issues have been addressed in the past, the use of octree and quadtree data structures and methods have been found effective. This is especially the case when implemented in modest, specialized processors. This technology is expected to allow for the use of a very large number of simple, inexpensive, low-power processors to be applied to computationally difficult situations. The basic octree concepts where introduced by Meagher in paper "Geometric Modeling Using Octree Encoding" and the Thesis "The Octree Encoding Method for Efficient Solid Modeling." It was later extended for orthographic image generation in U.S. Pat. No. 4,694,404.

SUMMARY OF EXAMPLE EMBODIMENTS OF THE INVENTION

The following simplified summary may provide a basic initial understanding of some aspects of the systems and/or methods discussed herein. This summary is not an extensive overview of the systems and/or methods discussed herein. It is not intended to identify all key/critical elements or to delineate the entire scope of such systems and/or methods. Its sole purpose is to present some concepts in a simplified form as a prelude to the more detailed description that is presented later.

In some embodiments data defining digital images is acquired while aiming a camera in different directions (e.g., opposingly directed poses) within a workspace of a quotidian scene (e.g., containing different types of media through which light (e.g., propagating electromagnetic energy within and/or outside the visible frequency/wavelength spectrum) is transported or reflected) and input directly to a scene reconstruction engine. In other embodiments such digital image data has been previously acquired and stored for later access by a scene reconstruction engine. In either case, the digital images contain image data elements defined by stored data representing light field flux received by light sensing detectors in the camera.

Example scene reconstruction engines process such digital images to form a digital volumetric scene model representing the real scene. The scene model may contain volumetric data elements defined by stored data representing one or more media characteristics. The scene model may also contain solid angle data elements defined by stored data representing sensed light field flux. Adjacent volumetric data elements may form corridors in the scene model and at least one of the volumetric data elements in at least one corridor represents media that is partially light transmissive.

The volumetric scene model data is stored in a digital data memory for any desired subsequent application (e.g., to provide humanly perceived displays, to provide design data for an application related to the real scene as well as many other applications known to those skilled in the art).

In some example embodiments, the acquired image data elements represent at least one predetermined light polarization characteristic of the imaged real scene light field.

In some example embodiments, some corridors may occupy a region between (i) a camera light sensing detector position at a time when an associated digital image was acquired and (ii) a volumetric data element representing a media element that includes a reflective surface element.

In some example embodiments, some corridors may include a volumetric data element located at a distal end of the corridor representing a reflective media surface that is featureless when observed via non-polarized light.

In some example embodiments, some corridors may include a volumetric data element located at a distal end of the corridor representing a localized orientation gradient on a solid media surface (e.g., an indented "bump" on a vehicle skin caused by hail damage) that is featureless when observed via non-polarized light.

In some example embodiments, the scene reconstruction engine receives user identification of at least one scene reconstruction goal and scene reconstruction processing is iteratively continued until the identified goal has been achieved to a predetermined degree of accuracy. Such iterative processing may continue, for example, until the angular resolution of at least some volumetric data elements in the scene model are as good or better than the angular resolution of an average human eye (e.g., about 1 arcminute or approximately 0.0003 radians).

In some example embodiments, digital images of at least some media in the real scene are acquired with differing distances between the camera and media of interest (e.g., close-up images of smaller media elements such as leaves on flowers, trees, etc).

In some example embodiments, the volumetric data elements are stored in digital memory in a spatially sorted and hierarchical manner to expedite scene reconstruction processing and/or later application uses of the reconstructed model data.

In some example embodiments, the solid angle data elements are stored in a solid-angle octree (SAO) format to expedite scene reconstruction processing and/or later application uses of the reconstructed model data.

In some example embodiments, some volumetric data elements include representations of single center, multi-directional light fields.

In some example embodiments, volumetric data elements at distal ends of at least some corridors are associated with a solid angle data element centered at the center of the volumetric scene model.

In some example embodiments, intermediately situated volumetric data elements in at least some corridors are associated with a multi-directional light field of a solid angle data element.

In some example embodiments, scene reconstruction processing employs a non-derivative optimization method to computer the minimum of a cost function used to locate feature points in the acquired digital images.

In some example embodiments, scene reconstruction processing includes refinement of a digital volumetric scene model by iteratively: (A) comparing (i) projection digital images of a previously constructed digital volumetric scene model to (ii) respectively corresponding formed digital images of the real scene; and (B) modifying the previously constructed digital volumetric scene model to more closely conform to the compared digital images of the real scene thereby generating a newly constructed digital volumetric scene model.

In some example embodiments, the camera may be embedded within a user-borne portable camera (e.g., in an eye-glasses frame) to acquire the digital images of the real scene. In such embodiments, the acquired digital image data may be communicated to a remote data processor where at least part of a scene reconstruction engine resides.

The example embodiments include at least: (A) machine apparatus in which claimed functionality resides, (B) performance of method steps that provide an improved scene reconstruction process, and/or (C) non-volatile computer program storage media containing executable program instructions which, when executed on a compatible digital processor, provide an improved scene reconstruction process and/or create an improved scene reconstruction engine machine.

Additional features and advantages of the example embodiments are described below.

BRIEF DESCRIPTION OF THE DRAWINGS

These and other features and advantages will be better and more completely understood by referring to the following detailed description of example non-limiting illustrative embodiments in conjunction with the following drawings.

DETAILED DESCRIPTION

Figure 1:
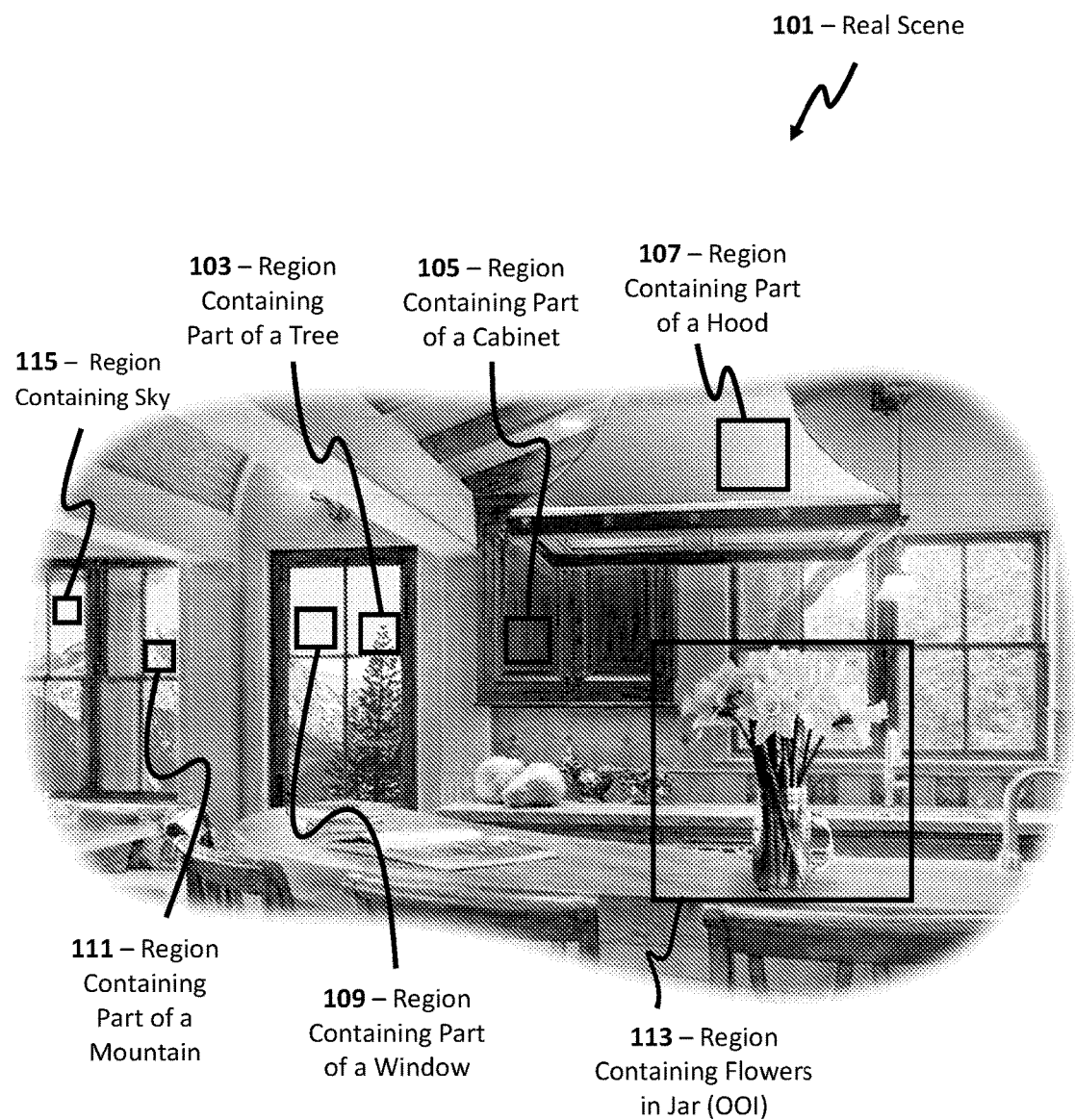
FIG. 1 illustrates a scene that may be scanned and modeled in accordance with some example embodiments.

For ease of reference, the following terms are provided along with non-limiting examples:

Corridor. Channel of transmissive media.

Frontier. Incident light field at the scene model boundary.

Imaging Polarimeter. Camera that senses polarimetric images.

Light. Electromagnetic waves at frequencies including visible, infrared and ultraviolet bands.

Light Field. Flow of light in a scene.

Media. Volumetric region that includes some or no matter in which light flows. Media can be homogeneous or heterogeneous. Examples of homogeneous media include: empty space, air and water. Examples of heterogeneous media include volumetric regions including the surface of a mirror (part air and part slivered glass), the surface of a pane of glass (part air and part transmissive glass) and the branch of a pine tree (part air and part organic material). Light flows in media by phenomena including absorption, reflection, transmission and scattering. Examples of media that is partially transmissive includes the branch of a pine tree and a pane of glass.

Workspace. A region of a scene that includes camera positions from which images of the scene are captured.

Scene Reconstruction Engines (SREs) are digital devices that use images to reconstruct 3D models of real scenes. SREs that are available today are effectively unable to reconstruct an important type of scene called a quotidian scene ("quotidian" means everyday). Generally speaking, quotidian scenes i) are densely volumetric, ii) include objects that are occluding, shiny, partially transmissive and featureless (e.g., a white wall) and iii) include complex light fields. Most of the scenes that people occupy in the course of their daily lives are quotidian. One reason that today's SREs cannot effectively reconstruct quotidian scenes is that they don't reconstruct light fields. In order to successfully reconstruct shiny and partially transmissive objects such as cars and jars, the light field in which the objects are immersed must be known.

The example embodiments include a new type of SRE that provides capabilities such as, for example, efficient reconstruction of quotidian scenes to useful levels of scene model accuracy (SMA), and its use. A scene reconstruction engine, according to certain embodiments, uses images to form a volumetric scene model of a real scene. The volumetric elements of the scene model represent corresponding regions of the real scene in terms of i) the types and characteristics of media occupying the volumetric elements, and ii) the type and characteristics of the light field present at the volumetric elements. Novel scene solving methods are used in embodiments to achieve efficiency. Novel spatial processing techniques are used in embodiments to ensure that the writing and reading from the highly detailed volumetric scene model is efficient during and after the creation of the model, and for providing the model for use by numerous applications that require an accurate volumetric model of a scene. A type of camera that has important advantages for quotidian scene reconstruction is an imaging polarimeter.

3D imaging systems include a scene reconstruction engine and a camera. There are three broad 3D imaging technologies that are currently available: Time-of-Flight, Multi-View Correspondence and Light Field Focal Plane. Each fails to effectively reconstruct quotidian scenes in at least one way. Time-of-Flight cameras are effectively unable to reconstruct quotidian scenes at longer distances. A key deficiency with Multi-View Correspondence is that it cannot determine shape in featureless surface regions, thus leaving gaps in surface models. Light Field Focal Plane cameras have very low depth resolution, because their stereo baseline is very small (the width of the imaging chip). These deficiencies will remain major price-performance bottlenecks and effectively relegate these technologies to narrow specialty applications.

The scene 101 shown in FIG. 1 is an example of a real scene which is also quotidian. Scene 101 primarily includes a kitchen region, and includes a region containing part of a tree 103, a region containing part of a cabinet 105, a region containing part of a hood 107, a region containing part of a window 109, a region containing part of a mountain 111, a region containing flowers in a jar 113, and a region containing part of the sky 115. Scene 101 is a quotidian scene because it contains non-Lambertian objects, including partially transparent objects and fully transparent objects. Scene 101 also extends to the frontier through the windows.

Most spaces that people occupy in the course of their daily lives are quotidian. Yet no conventional scene reconstruction engines can cost-effectively reconstruct quotidian scenes to the accuracy needed by most potential 3D imaging applications. Example embodiments of the present invention provide a scene reconstruction engine that can efficiently and accurately form various types of scenes including those that are quotidian. However, example embodiments are not limited to quotidian scenes, and may be used in modeling any real scene.

Preferably the scene reconstruction engine produces a scene model having, at least in some parts, angular resolution as good as an average human eye can discern. The human eye has an angular resolution of approximately one arcminute (0.02°, or 0.0003 radians, which corresponds to 0.3 m at a 1 km distance). In the past few years, visual display technology has begun to offer the capability of creating a projected light field that is nearly indistinguishable from the light field in the real scene it represents (as judged by the naked eye). The inverse problem, the reconstruction of a volumetric scene model from images of sufficient resolution, with similar accuracy as judged by the eye, is not yet effectively solved by other 3D imaging technologies. In contrast, scene models reconstructed by an example embodiment can approach and surpass the above accuracy threshold.

Figure 2A:
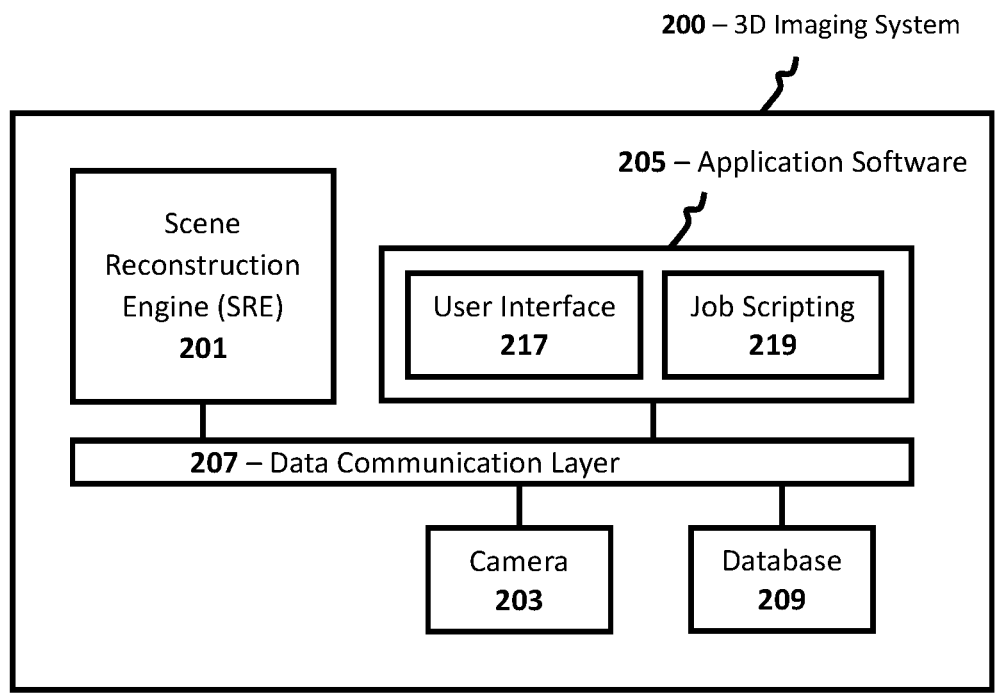
FIG. 2A is a block diagram of a 3D imaging system according to some example embodiments.

FIG. 2A is a block diagram of a 3D imaging system 200 according to some example embodiments. The 3D imaging system 200 may be used to scan a real scene such as, for example, scene 101, and to form a corresponding volumetric scene model. The 3D imaging system 200 includes a scene reconstruction engine (SRE) 201, a camera 203, application software 205, a data communication layer 207, and a database 209. The application software 205 may include a user interface module 217 and a job scripting module 219. A 3D imaging system 200 may be embodied in mobile and wearable devices (such as glasses).

SRE 201 includes the instruction logic and/or circuitry to perform various image capture and image processing operations, and overall control of the 3D imaging system 200 to produce volumetric scene models. SRE 201 is further described below in relation to FIG. 11.

Camera 203 may include one or more cameras that are configurable to capture images of a scene. In some example embodiments, camera 203 is polarimetric in that it captures the polarization characteristic of light in a scene and generates images based on the captured polarization information. A polarimetric camera is sometimes referred to as an imaging polarimeter. In some example embodiments, camera 203 may include a PX 3200 polarimetric camera from Photon-X of Orlando, Fla., USA, an Ursa polarimeter from Polaris Sensor Technologies of Huntsville, Ala., USA, or a PolarCam™ snapshot micropolarizer camera from 4D Technology of Tempe, Ariz., USA. In certain example embodiments, camera 203 (or a platform attached to it) may include one or more of a position sensor (e.g., GPS sensor), an inertial navigation system including a motion sensor (e.g., accelerometer) and a rotation sensor (e.g., gyroscope) that can be used to inform the position and/or pose of the camera. When camera 203 includes more than one camera, the cameras may all be cameras of the same specifications or may include cameras of different specifications and capabilities. In some embodiments, two or more cameras, which may be co-located or at different positions in a scene, may be operated by the imaging system in synchronization with each other to scan the scene.

Application software 205 includes instruction logic for using components of the 3D imaging system to obtain images of a scene and to generate a 3D scene module. Application software may include instructions for obtaining inputs regarding scanning and a model to be generated, for generating goals and other commands for scanning and model generation, and for causing SRE 201 and camera 203 to perform actions for scanning and model generation. Application software 205 may also include instructions for performing processes after the scene model is generated, such as, for example, an application using the generated scene model. An example flow of an application software is described in relation to FIG. 14. An example application using a volumetric scene model generated according to embodiments is described below in relation to FIG. 33.

Data communication layer 207 provides for components of the 3D imaging system to communicate with each other, for one or more components of the 3D imaging system to communicate with external devices via local area or wide area network communication, and for sub-components of a component of the 3D imaging system to communicate with other sub components or other components of the 3D imaging system. The data communication layer 207 may include interfaces and/or protocols for any communication technology or combination of communication technologies. Example communication technologies for the data communication layer includes one or more communication busses (e.g., PCI, PCI Express, SATA, Firewire, USB, Infiniband, etc.), and network technologies such as Ethernet (IEEE 802.3) and/or wireless communications technologies (such as Bluetooth, WiFi (IEEE 802.11), NFC, GSM, CDMA2000, UMTS, LTE, LTE-Advanced (LTE-A), and/or other short-range, mid-range, and/or long-range wireless communications technologies.

Database 209 is a data store for storing configuration parameters for the 3D imaging system, images captured of a scene via scanning, libraries of historically acquired images and volumetric scene models, and volumetric scene models being currently generated or refined. At least part of database 209 may be in memory 215. In some embodiments, parts of database 209 may be distributed among memory 215 and external storage devices (e.g., cloud storage or other remote storage accessible via data communication layer 207). Database 209 may store certain data in a manner that is efficient for writing to, for accessing and for retrieving, but is not limited to a particular type of database or data model. In some example embodiments, database 209 uses octree and/or quadtree formats for storing volumetric scene models. The octree and quadtree formats are further described in relation to FIG. 20 and others. In some embodiments, database 209 may use a first type of data format for storing scanned images, and a second type of data format for storing the volumetric scene model information. Octrees are spatially sorted so regions of the scene can be accessed directly. In addition, they can be efficiently accessed in a specific direction in space, such as the direction of particular light rays in a scene. They are also hierarchical so coarse-to-fine algorithms can process information at a low level of resolution until higher-resolution information is needed during algorithm operation, depending on the results at a coarse level. This also makes access from secondary memory efficient. Only the lower-resolution information is retained in primary memory until higher-resolution is actually needed.

Figure 2B:
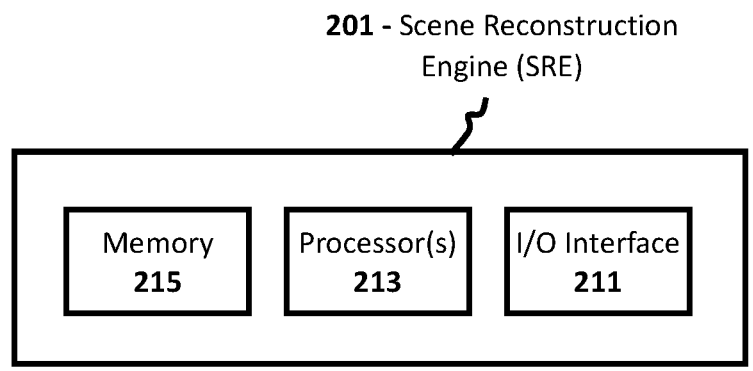
FIG. 2B is a block diagram of scene reconstruction engine (a device configured to use images to reconstruct a volumetric model of a scene) hardware according to some example embodiments.

FIG. 2B is a block diagram of SRE hardware according to some example embodiments and includes at least an input/output interface 211, at least one processor 213, and a memory 215. Input/output interface 211 provides one or more interfaces by which the 3D imaging system 200 or component thereof can interact with users and/or other devices. Input/output interface 211 may provide for the 3D imaging system 200 to communicate with input devices (e.g., keyboard, touchscreens, voice command input, controllers for guiding the movement of cameras, etc.) and/or output devices such as screens and/or additional storage. Input/output interface may provide for wired and/or wireless connection with any of the input, output or storage devices.

Processor 213 includes one or more of, for example, a single- or multi-core processor, a microprocessor (e.g., a central processing unit or CPU), a digital signal processor (DSP), an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). In some embodiments, each or any of the processors uses an instruction set architecture such as x86 or Advanced RISC Machine (ARM). Processor 213 may execute operations of one or more of SRE 201, camera 203, application software 205, data communication layer 207, database 209, input/output interface 211. In some example embodiments, processor 213 includes at least three distributed processors such that 3D imaging system 200 includes a first processor in SRE 201, a second processor in camera 203 and a third processor controlling processing of 3D imaging system 200.

Memory 215 includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors). The memory may be volatile memory or non-volatile computer-readable storage media. In example embodiments, volumetric scene model information and scanned images may be distributed by processor 213 among different memories (e.g., volatile vs non-volatile memory, cache memory vs RAM, etc.) based on dynamic performance needs of the 3D imaging system.

The user interface module 217 implements software operations to obtain input from the user, and to output information for the user. Interface 217 can be implemented using browser-based technology or other user interface generation technology.

The job scripting module 219 implements operations to receive goals and initial parameters for scanning a scene and model generation for the scene, and to generate a sequence of operations to achieve the desired goals in the scanning and model generation.

Although FIG. 2 illustrates an embodiment in which the camera 203 is separate from the SRE 201 and other components of the 3D imaging system 200, it should be appreciated that contemplated embodiments in accordance with this disclosure include embodiments in which the camera is in a separate housing than the rest of the system and communicating via a network interface, embodiments in which a camera and an SRE are in a common housing (in some embodiments, the camera being mounted on the same circuit board as a chip implementing the operation of the SRE) and communicating with database 209 via a network interface, embodiments in which camera 203 has integrated with it in the same housing the components 201, 205-215, and the like.

Figure 3:
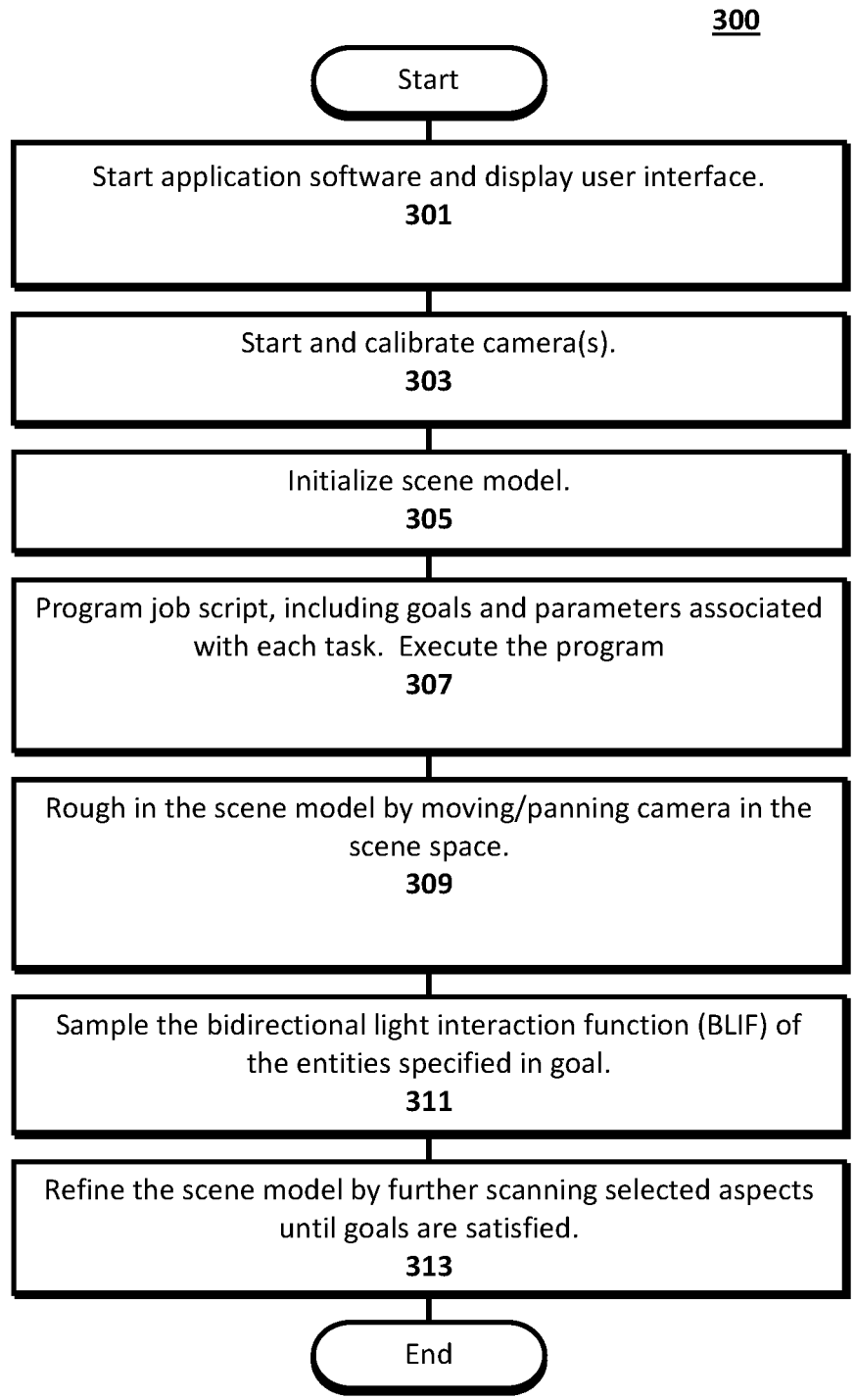
FIG. 3 is a flowchart of a process to capture images of a scene and to form a volumetric model of the scene, in accordance with some example embodiments.

FIG. 3 illustrates a flowchart of a process 300 to scan a scene and to reconstruct a volumetric model of the scene, in accordance with some example embodiments. For example, process 300 may be performed by the 3D imaging system 200 to scan the real scene 101 and to form a volumetric scene model of that scene. At least one processor 213 may execute instructions associated with process 300 as provided by application software 205, SRE 201, camera 203 and other components of 3D imaging system 200.

After entering process 300, at operation 301, the 3D imaging system may present a user with a user interface for providing input relating to starting and calibrating one or more cameras, initializing the scene model, and controlling subsequent operations of process 300. For example, the user interface may be generated by user interface module 217 and may be displayed on an output device via input/output interface 211. The user may provide input using one or more input devices coupled to the 3D imaging system via input/output interface 211.

At operation 303, one or more cameras are started and, optionally, calibrated. In some embodiments, camera calibration is performed in order to determine response models for the various characteristics that are measured by the camera (e.g., geometric, radiometric and polarimetric characteristics). Calibration may be performed as an off-line step and the calibration parameters can be stored in a memory, where the camera and/or the 3D imaging system can access the stored calibration information for each camera and perform required calibration, if any. In embodiments where a camera (or a platform attached to it) includes position (e.g., GPS sensors), motion (e.g., accelerometer) and/or rotation (e.g., gyroscope) sensors, these sensors may also be calibrated, for example, to determine or set a current position and/or pose of each camera. Camera calibration is further described below in relation to the sensor modeling module 1205 shown in FIG. 12.

At operation 305, a scene model may be initialized. The volumetric scene model may be represented in memory with volume elements for the scene space. Initialization of the scene model prior to the start of scanning enables the scene to be scanned in a manner that is tailored to that particular scene, and thus more efficient. The initialization may also prepare data structures and/or memory for storing images and the scene model.

The scene model initializing may include the user specifying a description of the scene via the user interface. The scene description may be a high-level description such as, in the event of preparing to image the scene of FIG. 1, specifying that the scene includes a kitchen with a countertop, hood, jar with flowers, wooden cupboard and glass windows. The plan views shown in FIGS. 5 and 7 may be an example of a scene description provided to the 3D imaging system. The above exemplary description of the kitchen scene of scene 101 is merely an example, and it will be understood that the descriptions of the scene provided to the imaging system can be more specific or less specific than the above example description. The input description may be provided to the imaging system in one or more of textual input, menu selection, voice command, and the like. In some example embodiments, the input description of the scene may be provided in the form of a CAD design of the space.

The initializing may also include selecting how the volumetric scene model is stored (e.g., Octree or other format), storage locations, file names, cameras to be used in scanning, etc.

The subsequent operations of process 300 are directed to iteratively refining the scene model by characterizing respective volume elements representing portion of the scene being modeled.

At operation 307, one or more goals for the scene model, and corresponding sequence of plans and tasks are determined. The one or more goals may be specified by the user via the user interface. The goals may be specified in any of the forms enabled by the user interface. An exemplary goal, specified by a user in connection with imaging the scene 101, may be to have a scene model in which the flower petals are determined to a pre-specified level of certainty (e.g., 90% certainty of model relative to the description of the model), that is, to have volumetric scene model volume elements corresponding to the real scene occupied by the flower petals determined as including flower petals (or a material corresponding to flower petals) with a confidence of 90% or greater. Other goal criteria may be reducing uncertainty as to one or more aspects of a scene region below a specified threshold (e.g., thickness of petals in acquired model to be within 10 microns of a specified thickness), and a coverage level (e.g., that a certain percentage of volume elements in the scene space are resolved as to media types contained in them). Another goal criteria may be to iteratively refine the model until the incremental improvement in the scene or a part of the scene in relation to one or more criteria is below a threshold (e.g., iterate until at least a predetermined portion of the volume elements change its media type determination).

The imaging system automatically or in combination with manual input from the user, generates a plan including one or more tasks to accomplish the goals. As noted above, a goal can be specified by a requirement to satisfy one or more identified criteria. A plan is a sequence of tasks, arranged so as to satisfy the goals. Plan processing is described below in relation to FIG. 15. A task may be considered as an action to be performed. Scan processing, which may occur during performing a task, is described below in relation to FIG. 16.

In the example of scanning scene 101, in order to satisfy a goal of creating a scene model where the flower petals are determined to a pre-specified level of certainty, a generated plan may include a first task to move the camera in a certain path through the scene space and/or to pan the camera to acquire an initial scan of the scene space, a second task to move the camera in a certain second path and/or to pan the camera to acquire detailed scan of flowers as specified in the goal, and a third task to test the goal criteria against the current volumetric scene model and to repeat the second task until the goal is satisfied. Tasks may also specify parameters for image collection, image storage, and scene model calculation. Camera movement may be specified in terms of any of position, path, pose (orientation), travel distance, speed and/or time.

Figure 42:
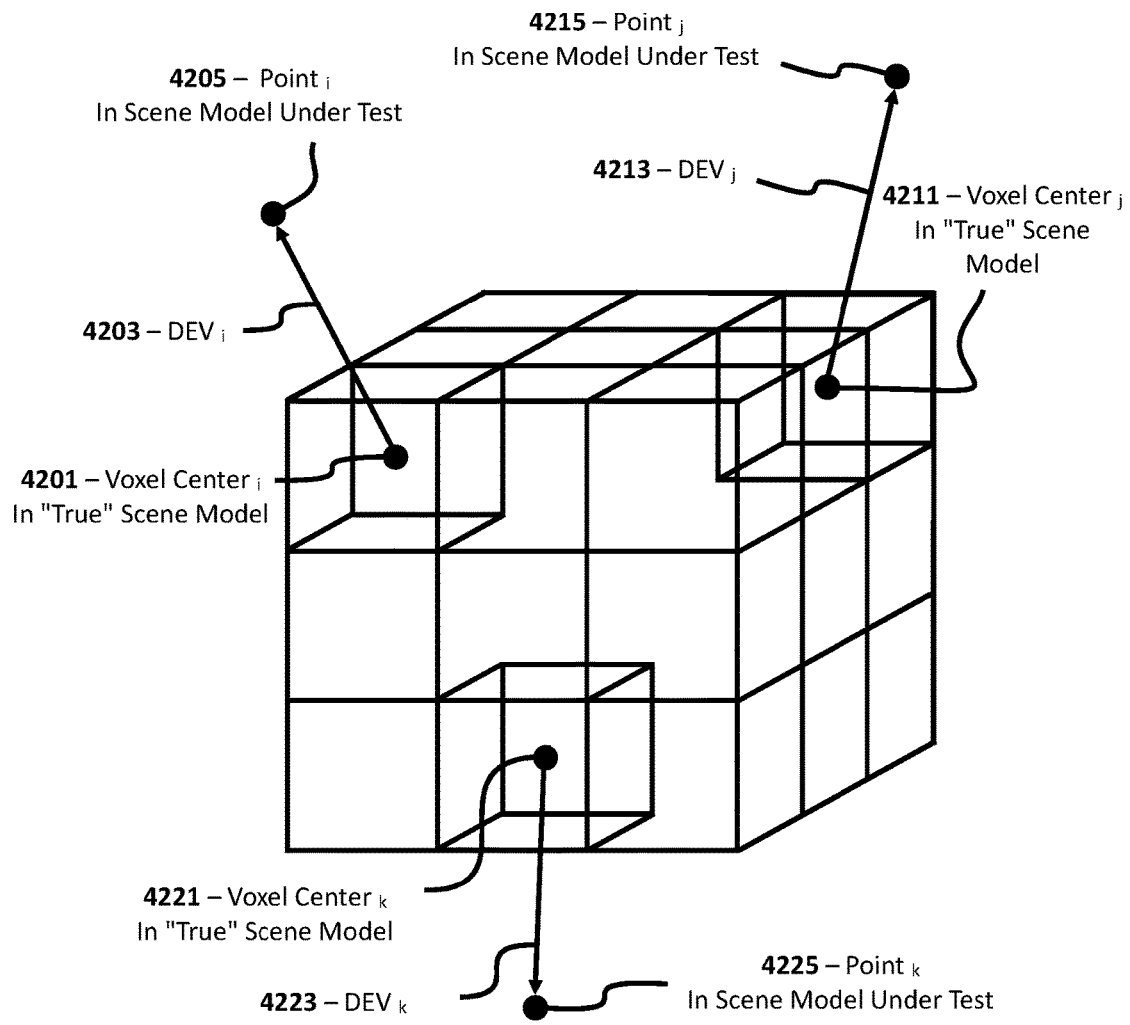
FIG. 42 is a geometric diagram that shows a metric of scene model accuracy (a measure of deviation between elements in a scene model and corresponding elements in the real scene that it represents), according to some example embodiments.

The accuracy of the scene model may be determined by comparing, for volume elements in the model, the current determinations with respect to media in the volume element and the light characteristics of the volume element to images captured from corresponding positions and poses. FIG. 42 shows a scene model accuracy (SMA) metric according to some example embodiments. In the example of FIG. 42, positional characteristics are indicated for some voxels (volume elements) in a region of adjacent voxels. Centers 4201, 4211, and 4221 of voxels in the true scene model are indicated. The true scene model, as the term is used in this example, is a presumed highly accurate model of the scene. The scene model under test, whose SMA is sought, contains estimated coordinates of points 4205, 4215, and 4225 corresponding to the voxel centers 4201, 4211, and 4221 in the true model. The distances 4203, 4213, and 4223 between the corresponding points in the two models define the (inverse) SMA. Before computing the distances, the model under test would typically be adjusted in a manner that preserves its internal structure while reducing any global (systematic) misregistration between it and the true model. A 6-DOF rigid coordinate transformation, for example, could be applied to the model under test based on an iterative-closest-point fitting operation against the true model. The example of FIG. 42, using spatial position as the modeled characteristic, generalizes to any characteristic modeled by an SRE. The deviation function may be defined over a heterogeneous combination of characteristics (e.g., positional deviations of point-like features, plus radiometric deviations of light field characteristics at corresponding voxels). A penalty function may be used to mitigate the effect of outlier deviations in computing the SMA. The application case will always suggest a way to construct a robust deviation function.

At operation 309, the scene model is roughed in by moving and/or panning the camera around the scene space. This may be performed according to one or more of the tasks in the generated plan. In some example embodiments, the camera may be moved by the user with or without prompting by the 3D imaging system. In some other example embodiments, the camera movement may be controlled by the 3D imaging system where, for example, the camera is mounted on a mounting or railing in which it can be controllably moved or in a UAV (e.g., drone that can be controlled to freely operate in the scene space).

An important consideration in this operation is the capability of embodiments to perform the scanning in a manner that minimizes the camera interaction with the light field in the scene space. The roughing in of the scene model is intended to form an initial scene model of the scene space. The roughing in may include moving and/or panning the camera in the scene space so as to capture one or more images of each of the entities in the scene that is specified in a goal, and of the space surrounding the goal entities. Persons of skill in the art will understand that the roughing in may include any amount of image capture and/or model forming, where although a minimal number of images of the goal entities and minimal coverage of the scene space is sufficient to form an initial scene model, a higher number images of goal entities and/or covering a larger portion of the scene space would yield a more complete and more accurate initial scene model. In general, a high quality initial scene model obtained from the roughing in would reduce the amount of iterative improvement of the scene model that is subsequently necessary to obtain a model within a specified set of goals.

Operations 311-313 are directed to iteratively refine the initial scene model until all the specified goals are satisfied. At operation 311, selected aspects of the scene space are subjected to further scanning. For example, a bidirectional light interaction function (BLIF) of the flowers may be determined by acquiring images while orbiting around small areas of a petal, leaf or jar shown in FIG. 1. BLIF is described below in relation to FIG. 10. The orbiting and the scanning parameters may be in accordance with one of the tasks generated from the initially specified goals. For example, where the rough in included moving and/or panning the camera over a wide area, the refining process may include moving the camera in a small orbit around a particular object of interest. Likewise, scanning parameters may be changed between the rough in and the refining stages: where rough in may include scanning with a wide FOV, for example, the refining process may involve using a much smaller FOV. (e.g., close-up(s) of an object of interest (OOI) view). This operation may include measuring material properties, for example, by comparing the measured light field parameters to statistical models.

At each of the operations 309-311 the acquired images may be stored in a memory. The generation or refining of the volumetric scene model may be performed concurrently with image acquisition. Refining of the volumetric scene model involves improving the assessment of the respective volume elements of the scene model. Further description of how the assessment of the volume elements is improved is described below in relation to FIGS. 18A-B. The volumetric scene model may be stored in the memory in a manner that is spatially efficient in storage and efficient in time to read and write. FIGS. 4A-C and 9A-E show parameters used in maintaining a scene for the volumetric scene model, and FIG. 20 and its related discussion describes how volume elements and aspects thereof are stored in efficient data structures.

At operation 313, it is determined whether the specified one or more goals are satisfied. If the goals are determined to have been satisfied, then process 300 is terminated. If it is determined that one or more goals are not satisfied, then operations 311-313 may be repeated until all the goals are satisfied. Following the current example of scanning scene 101, the currently acquired scene model may be tested to determine whether the specified goals have been satisfied, and if not, to adjust scanning parameters, and to proceed again to operation 311.

After operation 313, process 300 terminates. The scene model of the scene 101 which is stored in memory can be used in any application.

Figure 4A:
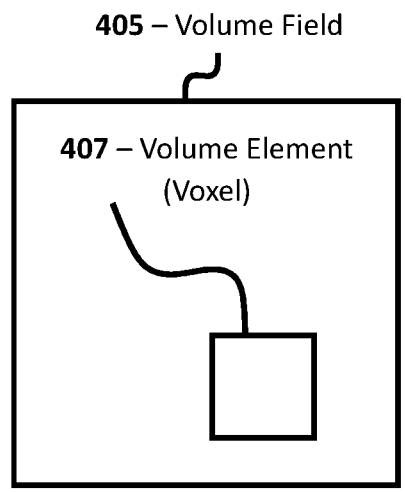
FIG. 4A is a geometric diagram that shows a volume field and volume element (voxel), according to some example embodiments.
Figure 4B:
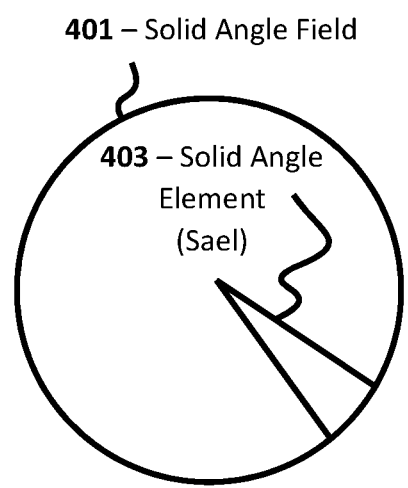
FIG. 4B. is a geometric diagram that shows a solid angle field and solid angle element (sael, pronounced "sail"), according to some example embodiments.

FIGS. 4A and 4B show how an SRE models space for reconstruction purposes. A grasp of these basic geometric entities will aid in understanding the succeeding description of the scene model entities used in some example embodiments.

A volume element 407 represents a finite positional extent in 3D space. Volume elements are known by the shorthand name "voxel". A voxel is bounded by a closed surface. A voxel can have any non-degenerate shape. It need not be cubical, and it need not exhibit any particular symmetry. A voxel is characterized by its shape and by the amount of volume it encloses, expressed in cubic meters or any other suitable unit. One or more voxels together constitute a volume field 405. In example embodiments, the SRE (e.g., SRE 201) uses volume fields to represent the media (or lack thereof) occupying regions in a scene. In some embodiments, a hierarchical spatial construct may be used to achieve increased processing throughput and/or a reduction in the data size of a volume field. See the discussion on octrees below.

A solid angle element 403 represents an angular extent in 3D space. Solid angle elements are known by the shorthand name "sael". A sael is bounded by a surface that is flat in the radial direction. That is to say, any line proceeding from the origin outward along a sael's bounding surface is a straight line. Although shown as such in FIG. 4B, a sael is not required to have the shape of a circular cone or to be symmetric. A sael can have any shape fitting the definition of a general conical surface, and is characterized by its shape and by the number of angle units it subtends, usually expressed in steradians. A sael is infinite in extent along its radial direction. One or more saels together constitute a solid angle field 401. In example embodiments, the SRE (e.g., SRE 201) uses a solid angle fields to represent the radiance of the light field in different directions at a voxel. In the same vein as for voxels above, a hierarchical spatial construct may be used for increased speed and/or reduced data size of a solid angle field. See the discussion on solid-angle octrees below with reference to FIG. 21.

Figure 5:
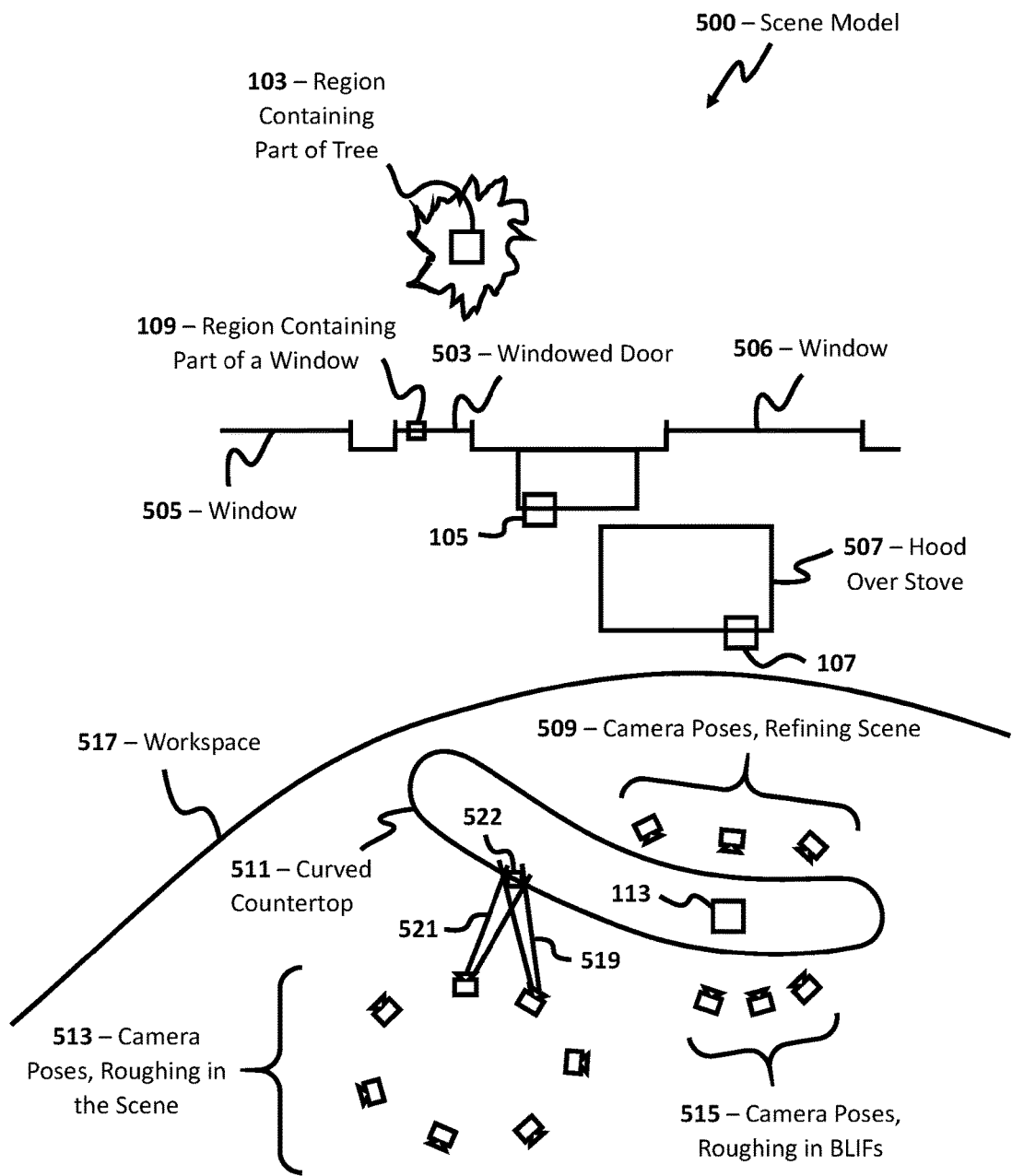
FIG. 5 is a geometric diagram that shows a workspace-scale plan view of the kitchen shown in FIG. 1, according to some example embodiments.

FIG. 5 shows a plan view of the example quotidian scene shown in FIG. 1. The description of the scene model input to the 3D imaging system during process 300 may include a description similar to FIG. 5 (e.g., as described in text, a machine-readable sketch of the plan view, etc.). In example embodiments, any one of, or any combination of, the user specified scene information, the initial scene model generated from the roughing in (e.g., see description of operation 309 above), and/or an iteratively improved version a scene model (e.g., see description of operation 311 above) may be a digital representation of the scene space represented in FIG. 5.

The scene model 500 may include, in relation to the example scene of a kitchen shown in FIG. 1, several indoor and outdoor entities. A workspace 517 divides the scene space into two broad regions. The workspace is the scene region visited by the cameras (physical camera apparatus) used to record (sample) the light field. It may be defined as the convex hull of such camera positions, or by other suitable geometric constructs indicating the positions visited. A voxel inside the workspace has the possibility of being observed from an entire sphere of surrounding viewpoints ("full orbit"), subject to the density of actual viewpoints and subject to occlusion by media within the workspace. A voxel outside the workspace has the possibility of being of being observed from only a hemisphere (half-space) of viewpoints. This carries the consequence that an opaque closed surface (e.g., statue, basketball) outside the workspace cannot be completely reconstructed using observations recorded by cameras inside the workspace.

Inside the workspace, a jar containing flowers sits on a curved countertop 511. The region 113 containing the flowers and jar is designated as an OOI for detailed reconstruction. Several other entities lie outside the workspace. A region 103 containing part of a tree lies outside the windowed wall of the kitchen. Windows 505 and 506 lie in the wall. In a windowed door 503 lies a region 109 containing part of one of the door's windowpanes. Another region 105 contains part of a kitchen cabinet. In the vicinity of a stove hood 507 lies a region 107 containing part of the hood.

The three overall stages of scene reconstruction (in this example) are shown according to some example embodiments. First, the SRE (e.g., SRE 201) "roughs-in" the overall scene in the overall vicinity of the OOI by approximately panning 513 (may also include moving along a path) the camera in many directions to observe and reconstruct the light field. In the example, a human user performs the pan as guided and prompted by the SRE (e.g., SRE 201 as guided by application software 205). Voxel 522 terminates corridors 519 and 521 that originate at two camera viewpoints from the scene rough-in pan 513. Next, the SRE performs an initial reconstruction of the BLIFs of media present in the OOI (e.g., flower petal, leaf, stem, jar) by guiding a short camera orbit arc 515 of the OOI. Finally, the SRE achieves a high-resolution reconstruction of the OOI by guiding a detail scan of the OOI. The detail scan comprises one or more full or partial orbits 509 of the OOI, requesting as many observations as are needed to meet the reconstruction workflow's accuracy and/or resolution goals. A fuller discussion is presented below with reference to SRE operation (FIGS. 14 to 18B).

In some example embodiments, a scene model (including quotidian scene models) primarily comprises mediels and radiels. A mediel is a voxel containing media that interacts with the light field as described by a BLIF. A radiel is a radiometric element of a light field and may be represented by a sael paired with a radiometric power value (radiance, flux, or any other suitable quantity). A mediel may be primitive or complex. A primitive mediel is one whose BLIF and emissive light field are modeled with high consistency (e.g., in some applications, less than 5% RMS relative deviation between radiance values of the observed exitant light field (formed digital image) and the exitant light field (projected digital image) predicted by the model) by one of the BLIF models available to the SRE in a given workflow. A complex mediel is one whose BLIF is not thus modeled. Upon observation, a complex mediel, or region of complex mediels, is also known as an "observed but unexplained" or "observed, not explained" region. Complex mediels can become primitive mediels as more observations and/or updated media models become available to the SRE. Primitive mediels generally can be represented with greater parsimony (in the sense of Occam's razor) than complex mediels. A primitive mediel more narrowly (implying "usefully") answers the question, "What type of media occupies this voxel in space?".

Figure 6:
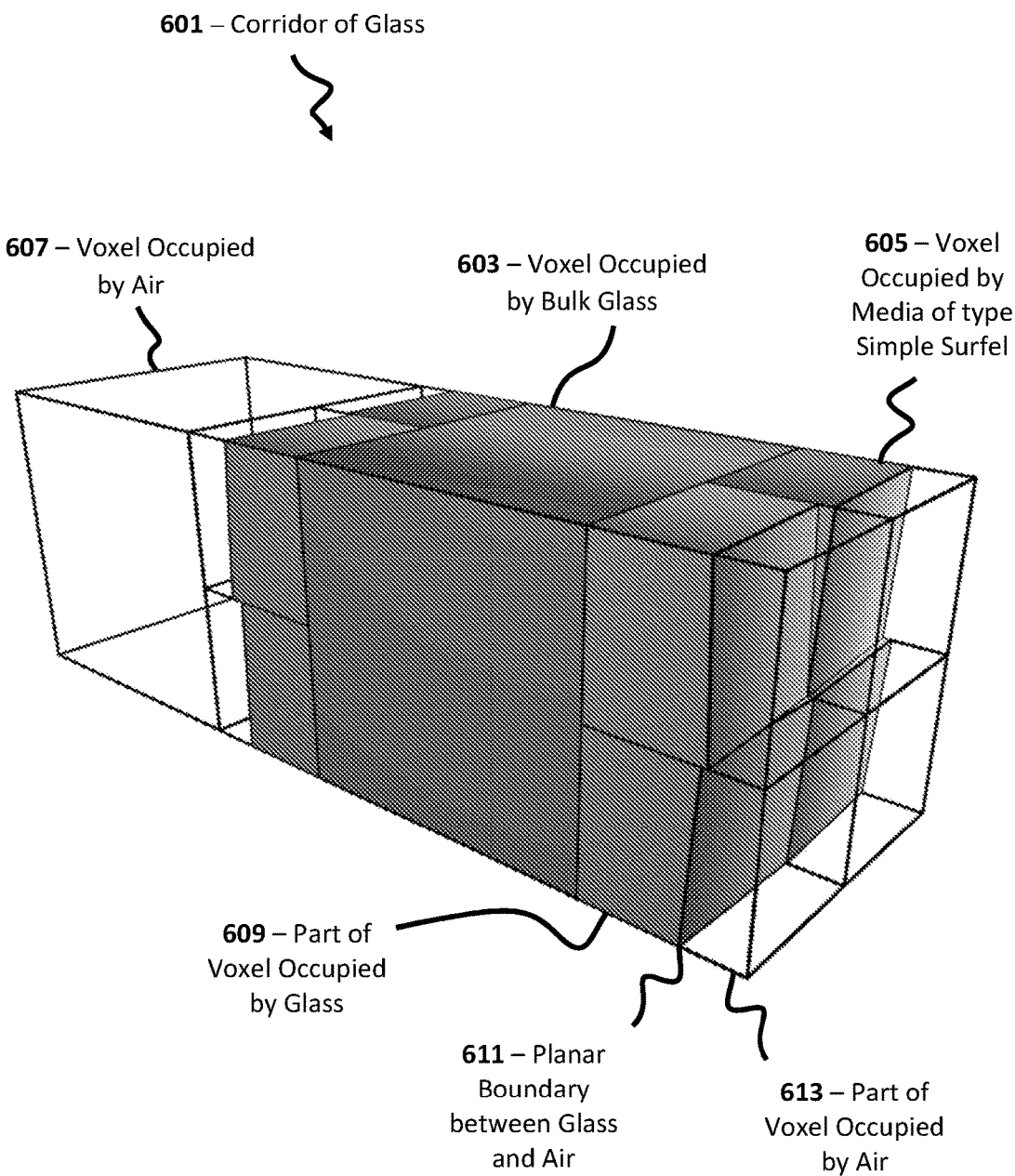
FIG. 6 is a 3D diagram that shows a voxel-scale view of a small part of the kitchen window, according to some example embodiments.

As can be observed in FIG. 1, the kitchen window in region 109 has empty space on either side (front and back of the glass). FIG. 6 shows a representation of part of the region 109 (shown in FIGS. 1 and 5) containing kitchen window glass from the volumetric scene model in accordance with some example embodiments. FIG. 6 illustrates how voxels are used so as to accurately represent media in the scene space. A model 601 of part of the glass region 109 consists of a bulk glass mediel 603, glass-against-air surfels 605, and a bulk air mediel 607. A surfel is a mediel representing a planar boundary between bulk media regions of different type, typically differing in refractive index, which induces a reflection when light is incident at the boundary. A reflective surface (reflective media) comprises one or more surfels. Each surfel is partly occupied 609 by glass and partly occupied 613 by air. The glass and air meet at a planar boundary 611. A typical SRE scenario would include a parsimonious model of the glass' BLIF. The glass-against-air surfels would be represented as type "simple surfel" with an appropriately detailed BLIF indicating the refractive index and other relevant properties. The bulk glass mediel interior to the windowpane would be represented as type "simple bulk" with physical properties similar to those of the simple glass surfels.

The model 601 may be considered a "corridor of voxels" or "a corridor of mediels" representing a plurality of voxels (or mediels) in the direction of a field of view of a camera capturing the corresponding images. The corridor, for example, may extend from the camera to the horizon through glass in the region 109. Voxels and/or mediels in a corridor may or may not be of uniform dimensions.

In the example scene of FIGS. 1 and 5, in example embodiments, different media regions are reconstructed less or more parsimoniously as informed by the reconstruction goals and recorded observations. Compared to the rest of the scene, a heavier share of computing resources is devoted to reconstructing the OOI as primitive mediels. The rest of the scene could be represented as complex mediels, each having an exitant light field that is used in reconstruction computations performed on the OOI.

Figure 7A:
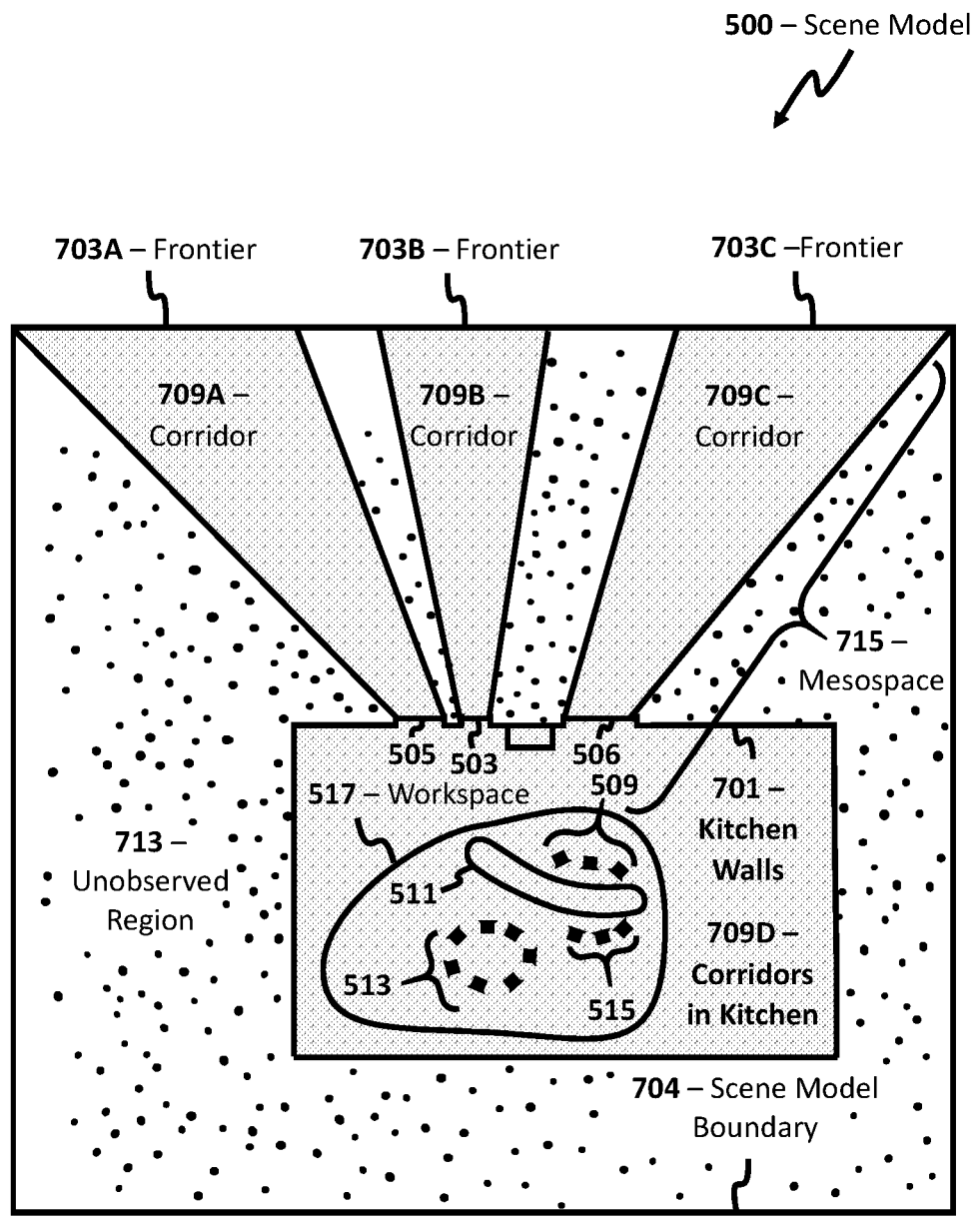
FIG. 7A is a geometric diagram that shows a plan view of a model of the kitchen scene, according to some example embodiments.

FIG. 7A is a geometric diagram that shows a plan view of a model of the kitchen scene shown in FIG. 1. The scene model 500 is enclosed by a scene model boundary 704. The scene model boundary is suitably sized to accommodate the OOI and other entities whose exitant light field significantly influences the incident light field of the OOI. Three corridors, 709A, 709B, and 709C extend a short distance from the kitchen windows 503, 505, and 506 to the scene model boundary 704. Where the corridors end at the scene model boundary, the incident light field defines three frontiers 703A, 703B, and 703C. Each of the three frontiers is a "surface light field" composed of radiels pointing approximately inward along the frontier's corridor. The corridors 709D inside the kitchen cover the entire volume interior to the kitchen. Region 713 beyond the opaque walls 701 of the kitchen is unobserved by cameras in the example workspace. A mesospace 715 region extends from the workspace 517 to the scene model boundary 704. (A mesospace is the space between the workspace and the scene model boundary.)

Figure 7B:
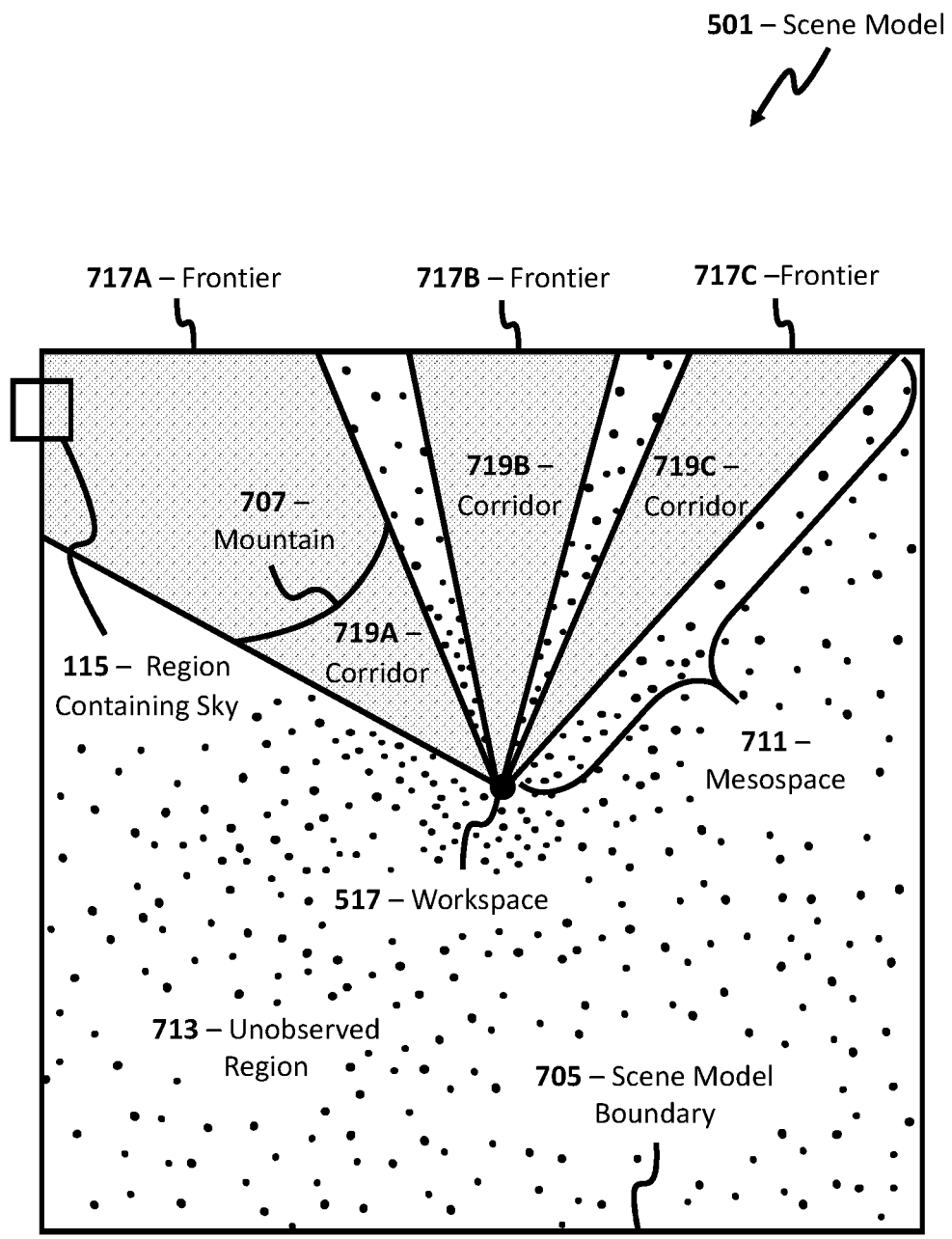
FIG. 7B is a geometric diagram that shows a plan view of a model of the kitchen scene, the kitchen depicted as a small dot at this scale, according to some example embodiments.

FIG. 7B is a geometric diagram that shows a plan view of another model of the kitchen scene shown in FIG. 1. As compared to FIG. 7A, the scene model boundary 705 is quite far from the workspace. In some example scenarios, as the camera moves around to image the kitchen scene, and/or as reconstruction processing operations proceed, the scene model would naturally grow in spatial extent from the size depicted in FIG. 7A to the size depicted in FIG. 7B. An SRE's tendency toward parsimony (Occam's razor) in representing reconstructed scene regions will tend to "push" the scene model boundary outward to a distance where parallax is not meaningfully observable (i.e., where multiview reconstruction of mediels is not robustly achievable). As reconstruction progresses, the scene model boundary will also tend to be centered about the workspace. The scene model 500 of FIG. 7A could be considered an earlier stage of reconstruction (of the kitchen scene), while the scene model 501 of FIG. 7B could be considered a later stage of reconstruction.

The three corridors 719A, 719B, and 719C extend from the workspace out to the now much more distant scene model boundary. As with the frontiers in the narrower scene model of FIG. 7A, each of the frontier 717A, 717B, and 717C defines a surface light field representing the light incident at the respective portion of the scene model boundary 704. The surface light field of frontier 717B, for example, will generally have "less parallax" than the surface light field of frontier 703B, which is the corresponding frontier at the earlier stage of reconstruction shown in FIG. 7A. That is to say, a given small region of frontier 717B will have radiels oriented in a narrower span of directions (toward kitchen window 503) than will a small region of frontier 703B. In the limit as the scene model boundary is extremely far from the workspace (e.g., at an advanced stage of reconstructing a wide-open space such as the outdoors), each small region of frontier contains a single, very narrow radiel pointing radially inward toward the center of the workspace. The region containing sky 115 depicted in FIG. 1 is represented in frontier 717A. The mesospace 711 is larger, as compared to mesospace 715 in FIG. 7A. A mountain 707 lies in the mesospace. Some degree of reconstruction is possible for mediels composing the mountain, depending on their media type in the real scene, atmospheric conditions (e.g., haze) in the observation corridor, the media models available, and operating settings of the SRE.

Figure 8A:
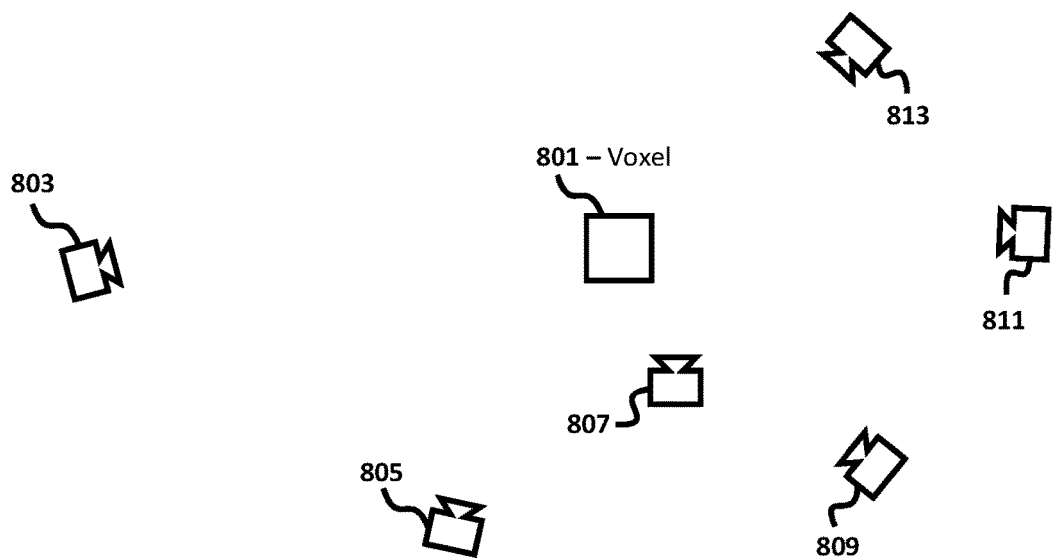
FIG. 8A is a geometric diagram that shows the poses of cameras which are used to reconstruct a voxel, according to some example embodiments.

FIG. 8A is a geometric diagram that shows the poses of one or more cameras used to reconstruct a mediel. In the example of FIG. 8A, one or more cameras image a voxel 801 from multiple viewpoints. Each viewpoint 803, 805, 807, 809, 811, and 813 records the exitant radiance value (and polarimetric characteristics) for a particular radiel of the light field exiting voxel 801. The reconstruction process can use images recorded at significantly different distances, as shown for poses 803 and 807, relative to the voxel 801 of interest. The models of light transport (including BLIF interaction) used in reconstruction account for the differences in relative direction and subtended solid angle between the voxel of interest and the imaging viewpoints.

Figures 8B, 8C, 8D, 8E:
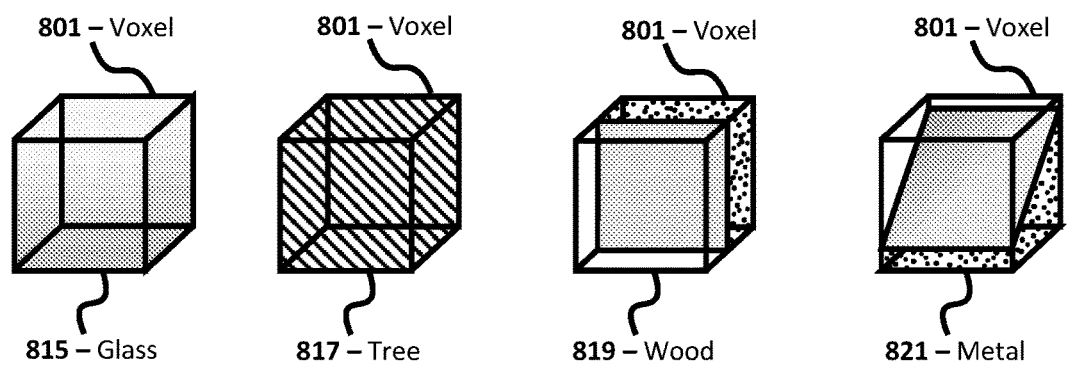
FIGS. 8B, 8C, 8D & 8E are geometric diagrams that show a variety of materials which may occupy a voxel, according to some example embodiments.

FIGS. 8B, 8C, 8D, and 8E are geometric diagrams that show a variety of mediel types possible for voxel 801 in an example scenario. These are typical mediels involved in an SRE's scene modeling. The glass 815 mediel is simple glass bulk, as in FIG. 6. The tree 817 mediel represents the heterogeneous media composing tree branches in their natural configuration, including the air between the solid media (leaves, wood) of the tree. The tree mediel may be a complex mediel because no "low-dimensional" parametric model of the BLIF fits the observed light field exiting the tree mediel. A low-dimensional parametric model uses reasonably few mathematical quantities to represent salient characteristics of an entity. The wood 819 mediel is a surfel representing a wood surface against air. The wood mediel may be simple if the physical wood media is homogeneous enough in material composition such that a low-dimensional parametric BLIF can model its light field interaction behavior. In the example of FIG. 8E, the metal 821 surfel's BLIF could be represented by a numerical scalar value for the refractive index, a second numerical scalar for the extinction coefficient, and a third numerical scalar for the anisotropic "grain" of the surface in the case of brushed metal. The determination whether a light field associated with a voxel indicates a mediel of a particular type can be made by comparing the light field associated with the voxel to predetermined statistical models of BLIFs for various media types. Media modeling module 1207 maintains statistical models of BLIFs for various media types.

Figure 9A:
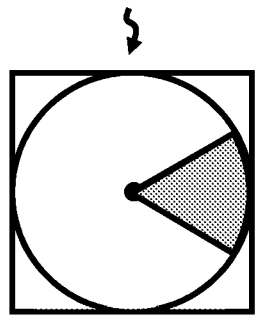
FIG. 9A is a geometric diagram that shows a single center, unidirectional sael arrangement that can be used to represent, for example, light fields or sensor frustums, according to some example embodiments.
Figure 9B:
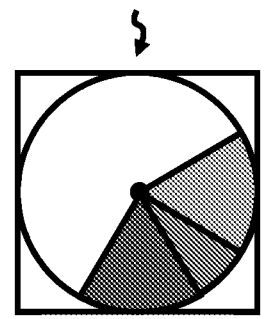
FIG. 9B is a geometric diagram that shows a single center multidirectional saels arrangement that can be used to represent, for example, light fields or sensor frustums, according to some example embodiments.
Figure 9C:
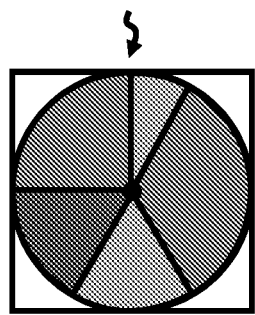
FIG. 9C is a geometric diagram that shows a single center omnidirectional saels arrangement that can be used to represent, for example, light fields or sensor frustums.
Figure 9D:
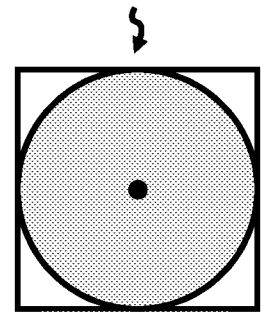
FIG. 9D is a geometric diagram that shows a single center isotropic sael arrangement that can be used to represent, for example, light fields or sensor frustums, according to some example embodiments.

FIGS. 9A-F depict example sael arrangements that may exist in a scene. FIG. 9A shows a single-center unidirectional sael arrangement 901. The sael of a single radiel in a light field is an example of this sael arrangement. FIG. 9B shows a single-center multidirectional arrangement 903 of saels. The collection of saels of multiple radiels in a light field, the saels sharing a common origin voxel, is an example of this sael arrangement. FIG. 9C shows a single-center omnidirectional arrangement 905 of saels. The collection of saels of multiple radiels in a light field, the saels sharing a common origin voxel and together completely covering (tessellating) the sphere of directions, is an example of this sael arrangement. When each sael is paired with a radiance value to yield a radiel, a single-center omnidirectional sael arrangement is known as a "point light field". FIG. 9D shows a single-center, omnidirectional, isotropic sael arrangement 907. The sael of a radiel in an isotropic light field is an example of this sael arrangement. Because the light field is isotropic at the voxel (equal radiance in all directions), the point light field is representable by a single coarse-grained radiel covering the entire sphere of directions. In some SRE embodiments, this might be realized as the root (coarsest) node of a solid-angle octree. More detail on solid-angle octrees is given below with reference to FIG. 21.

Figure 9E:
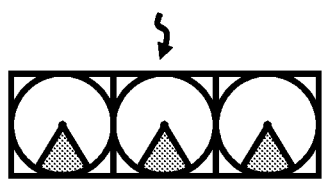
FIG. 9E is a geometric diagram that shows a planar centers unidirectional saels arrangement that can be used to represent, for example, light fields or sensor frustums, according to some example embodiments.
Figure 9F:
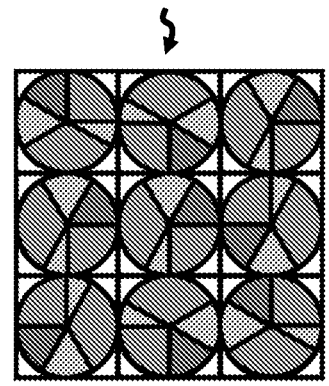
FIG. 9F is a geometric diagram that shows a multi-center omnidirectional saels arrangement that can be used to represent, for example, light fields or sensor frustums, according to some example embodiments.

FIG. 9E shows a planar-centers unidirectional arrangement 911 of saels. The collection of saels subtended by the pixels (one sael per pixel) in a camera's idealized focal plane is an example of this sael arrangement type. Each pixel conveys the radiance value of the radiel it subtends in the scene. Note that a planar-centers unidirectional sael arrangement 911 is a subtype of the more general (non-planar) multi-center multidirectional type of sael arrangement, which, when located at a 2D manifold of voxels and paired with radiance values, is also called a "surface light field". FIG. 9F shows a sael arrangement 913 having multiple volumetric centers and omnidirectional saels. A collection of point light fields (defined in the preceding paragraph) is an example of this sael arrangement type. In some embodiments, a skillfully arranged collection of such point light fields provides a useful representation of the light field in an extended region of scene space.

Figure 10:
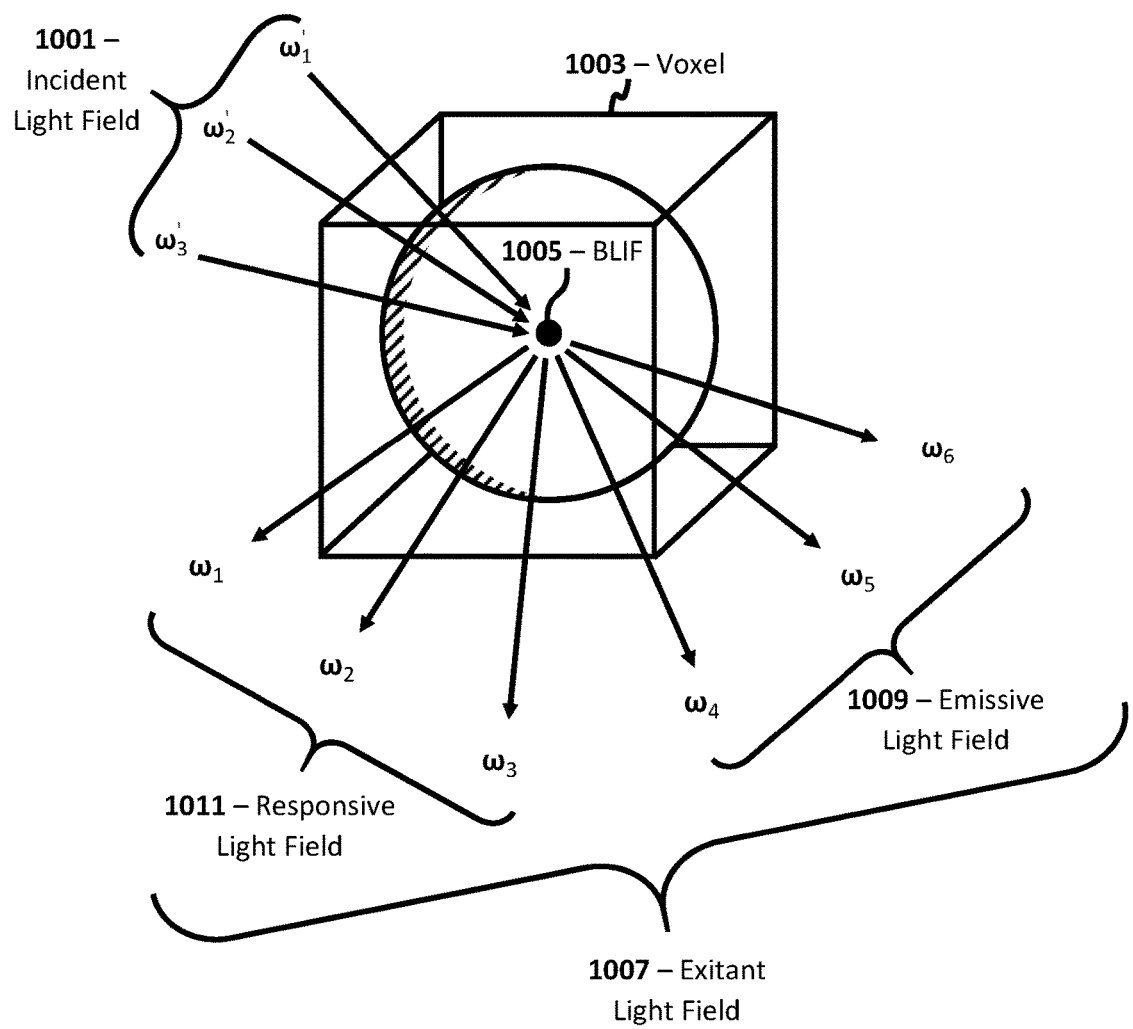
FIG. 10 is an isometric diagram that shows a bidirectional light interaction function (BLIF) which relates an incident (proceeding from outside a closed boundary to the inside of that closed boundary) light field, responsive light field, emissive light field and exitant (proceeding from inside a closed boundary to the outside of that closed boundary) light field, according to some example embodiments.

FIG. 10 is an isometric diagram that shows a BLIF which relates an incident light field, emissive light field and exitant light field. FIG. 10 shows a model that may be used to represent the interaction that takes place at a single mediel, the mediel consisting of a voxel 1003 and an associated BLIF 1005. Radiels of an incident light field 1001 enter the mediel. The BLIF operates on the incident light field and yields a responsive light field 1011 exiting the mediel. The total exitant light field 1007 is the union of the responsive light field and an (optional) emissive light field 1009. The emissive light field is emitted by the mediel independent of stimulation by incident light.

Figure 11:
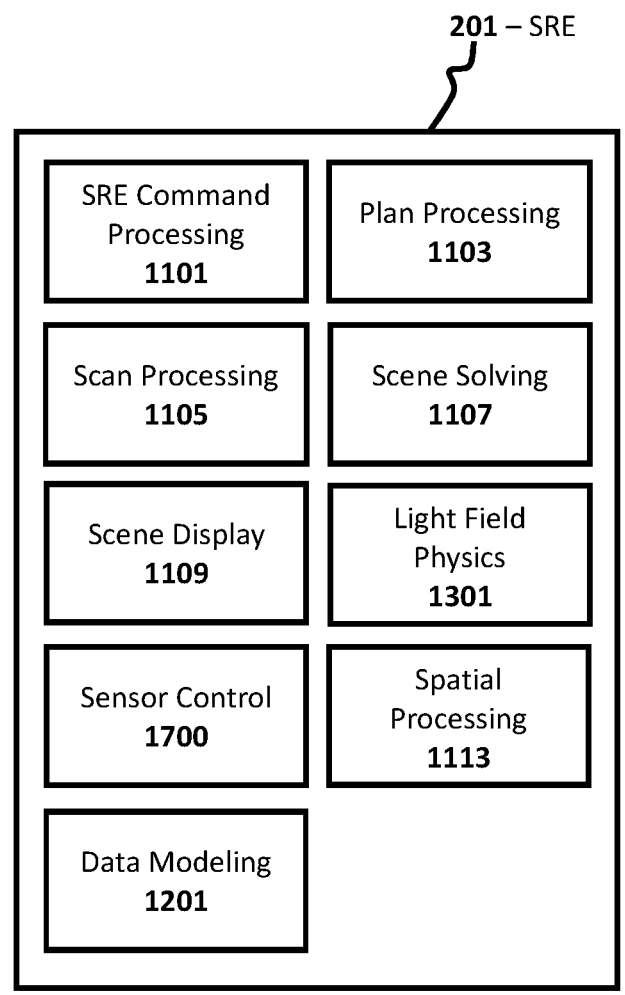
FIG. 11 is a schematic diagram that shows scene reconstruction engine (SRE) functions, according to some example embodiments.

FIG. 11 is a block diagram of an SRE, such as, for example, SRE 201, illustrating some of its operational modules according to some example embodiments. Operational modules 1101-1115 includes instruction logic for performing certain functions in scanning a scene and/or scene reconstruction, and may be implemented using software, firmware, hardware, or any combination thereof. Each of the modules 1101-1115 may communicate others of the modules 1101-1115 or with other components of the 3D imaging system via a data communication layer such as data communications layer 207 of the 3D imaging system 200 described above.

An SRE command processing module 1101 receives commands from a calling environment which may include a user interface or other components of the 3D imaging system. These commands may be realized as compiled software function calls, as interpreted script directives, or in any other suitable form.

A plan processing module 1103 forms and executes a plan toward an iterative scene reconstruction goal. The scene reconstruction goal may be provided to plan processing module 1103 by the application software controlling the SRE. Plan processing module 1103 may control scan processing module 1105, scene solving module 1107, and scene display module 1109 in accordance with one or more tasks defined per a plan for achieving the goal. Detail regarding the plan processing module's breakdown of a goal into a sequence of subcommands is given below with reference to FIG. 15. In some embodiments, application software may bypass the plan processing function and interface directly with modules 1105-1109. Plan processing module 1103 may perform sensor calibrations before scanning of the scene commences.

A scan processing module 1105 drives one or more sensors (e.g., one camera, or multiple cameras acting in concert) to acquire the sensed data needed to achieve a scene reconstruction goal. This may include dynamic guidance on sensor pose and/or other operating parameters, such guidance may feed a sensor control module 1111 or inform the actions of a human user via the user interface provided by application software controlling the process. A sensor control module 1111 manages individual sensors to acquire data and directs sensed data to the appropriate modules consuming that data. The sensor control module 1111 may, in response to sensed data, dynamically adjust geometric, radiometric, and polarimetric degrees of freedom as required for successful completion of an ongoing scan.

A scene solving module 1107 estimates the values of one or more physical characteristics of a postulated scene model. The estimated values maximize the consistency between the postulated scene model and observations of the corresponding real scene (or between the postulated model and one or more other scene models). Scene solving, including detail regarding the consistency calculation and updating of modeled characteristic values, is further described in relation to FIGS. 18A-18B below.

A spatial processing module 1113 operates on hierarchically subdivided representations of scene entities. In some embodiments, some of the spatial processing 1113 operations are selectively performed with improved efficiency using arrays of parallel computing elements, specialized processors, and the like. An example of such improved efficiency is the transport of light field radiance values between mediels in a scene. In an example embodiment, the incident light field generation module 2003 (shown in FIG. 20) processes each incident radiel using a small group of FPGA cores. When processing many mediels and/or incident radiels, the FPGA-based example embodiment can run the light transport computations for thousands of radiels in parallel. This contrasts with a traditional CPU-based embodiment, where at most a few dozen incident radiels can be processed simultaneously. GPU-based embodiments enable parallelism into the low thousands, but at a much higher cost in electrical power consumption. A similar efficiency argument applies to the incident to exitant light field processing module 2007 (shown in FIG. 20) when operating on many incident and/or exitant radiels. Spatial processing operations, including the solid-angle octree, are further described below with reference to FIG. 19 and succeeding drawings.

A scene display module 1109 prepares visual representations of a scene for human viewing. Such representations may be realistic in nature, analytic in nature, or a combination of the two. An SRE provides a scene display 1109 function that generates synthetic images of a scene in two broad modes: realistic and analytic. Realistic display of a scene synthesizes the "first person" image a real camera would see if immersed in a scene as represented by the current state of the reconstructed volumetric scene model at a specified viewpoint. The optical energy received by a pixel of the virtual camera is computed by reconstructing the scene model's light field at the pixel. This is accomplished using the scene solving module 1107 to solve for (and integrate) radiels of the light field at the synthetic pixels. The synthesis may incorporate the modeled characteristics of cameras discussed with reference to the sensor modeling module 1205 above. False coloring may be used for the synthetic pixel values as long as the false color assigned to a pixel is based on the reconstructed radiometric energy at the pixel. Analytic display of a scene synthesizes an image that represents part of a scene and is not a realistic image (as described above).

A light field physics processing module 1115 operates on measuring the light field and modeling light field aspects in the scene model. This module is described below in relation to FIG. 13.

A data modeling module 1117 operates to model various aspects including the scene to be scanned, and the sensors to be used. Data modeling module 1117 is described in relation to FIG. 12.

Aside from the above modules 1103-1117, an SRE may also include other modules. Other modules may include, but are not limited to, interfacing with databases, allocating local and remote computing resources (e.g., load balancing), gracefully handling operating errors, and event logging. For database access, an SRE may use specialized data structures to read and write large amounts of spatial data with great efficiency. Octrees, quadtrees, and/or solid-angle octrees may be employed in some embodiments for storage of the vast numbers of mediels and radiels that exist at various resolutions in a scene model. An SRE may use standard database records and techniques to store the generally much smaller amount of non-spatial data, such as sensor parameters, operating settings, and the like. An SRE may service analytic queries (e.g., "What total volume is represented by the contiguous group of voxels with the specified BLIF XXX?").

Figure 12:
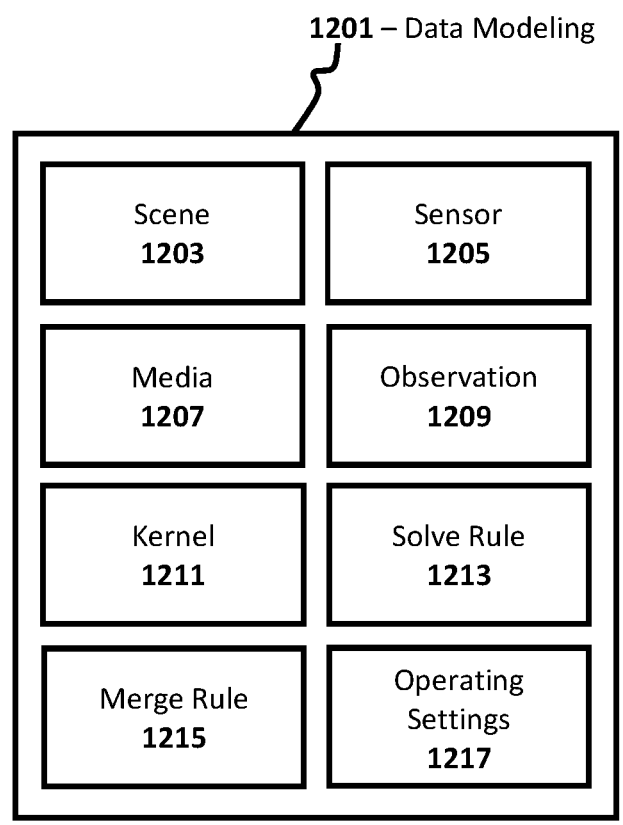
FIG. 12 is a schematic diagram that shows data modeling, according to some example embodiments.

FIG. 12 is a block diagram showing a data modeling module 1201 of an SRE, such as, for example, data modeling module 1117 of SRE 201 according to some example embodiments. Data modeling module 1201 may include scene modeling module 1203, sensor modeling module 1205, media modeling module 1207, observation modeling module 1209, (feature) kernel modeling module 1211, solve rule module 1213, merge rule module 1215, and operational settings module 1217.

A scene modeling module 1203 includes operations to generate an initial model of a scene (see, for example, description of operation 307 in FIG. 3), and to refine aspects of the initial scene model in collaboration with other data modeling modules. The initial scene model is described above in relation to FIGS. 5 and 7. Voxels and other elements with which a scene is modeled are described above in relation to FIGS. 4, 6, 8B-8E, and 9A-9F. Updating/refining of the scene model (referred to as the "postulated scene model") is described in relation to FIGS. 18A-18B.

A sensor modeling module 1205 represents characteristics of sensors (e.g., camera 203) that are used in the scene reconstruction process of a particular scene. Sensors may fall into two broad categories: cameras which sense the light field, and sensors that sense other characteristics of a scene. Each camera is modeled in one or more of its geometric, radiometric, and polarimetric characteristics. The geometric characteristics may indicate how a given sael of scene space maps to one or more spatially indexed light-sensing elements (e.g., pixel photosites) of the camera. The radiometric characteristics may indicate how strongly a radiance value at a particular optical wavelength excites a pixel when incident. Polarimetric characteristics may indicate the relation between the polarization characteristics (e.g., elliptical polarization state as represented by a Stokes vector) of a radiel and its excitation strength at a pixel when incident. These three classes of characteristics together define a forward mapping from a sensed radiel to the digital value output by a camera per pixel.

By suitably inverting this mapping, the sensor modeling module 1205 enables the corresponding inverse mapping from a digital pixel value to physically meaningful characteristics of a radiel. Such characteristics comprise the radiance, spectral band (wavelength), and polarization state of an observed radiel. The polarization state of light is characterized in some embodiments by the polarization ellipse formalism (4-element Stokes vector). Some embodiments may model a reduced set of polarimetric characteristics due to simplified polarimeter architectures. The sensing of the linear component but not the circular component of the full polarization state is an example of this. The inability to sense the circular polarization component may, for example, limit the ability to accurately reconstruct organic media, such as plant leaves, which tend to induce significant circular polarization in reflected light.

The above geometric, radiometric, and polarimetric characteristics of a camera are represented by a camera response model. Sensor modeling module 1205 may determine these response models. For certain cameras, parts of the response model may be parameterized in a few degrees of freedom (or even a single degree of freedom). Conversely, parts of the response model may be parameterized in many degrees of freedom. The dimensionality (number of degrees of freedom) of a component of a camera response model depends on how much uncertainty a given reconstruction goal can tolerate in the various light field characteristics measured by a camera. A polarimeter using a filter mask of "micropolarizing" elements on the camera pixels, for example, may require an independent four-by-four Mueller correction matrix per pixel (millions of real-number scalars) in order to measure polarimetric characteristics of the light field to the uncertainty demanded by an example goal. A polarimeter using a rotating polarizing filter, in contrast, may require only a single global four-by-four Mueller correction matrix that suffices for all pixels (sixteen real-number scalars). In another example, the SRE corrects for camera lens distortion in order to use an idealized "pinhole camera" model. For a given lens, this correction involves anywhere from five to fourteen or more real-number correction parameters. In some cases, a parametric model may be unavailable or impractical. In such a case, a more literal representation of the response model may be employed, such as a lookup table.

The above response models may be flexibly applied at different stages of the reconstruction flow. For example, there may be a speed advantage to correcting for camera lens distortion on-the-fly per individual pixel rather than as a preprocessing step on an entire image.

If not supplied by the vendor or other external source, camera response models are discovered by performing one or more calibration procedures. Geometric calibration is ubiquitous in the field of computer vision and is performed, for example, by imaging a chessboard or other optical target of known geometry. Radiometric calibration may be performed by imaging a target with known spectral radiance. Polarimetric calibration may be performed by imaging a target with known polarization state. Low uncertainty in all three response models is desirable to reconstruction performance, as reconstruction depends on an SRE's ability to predict light field observations based on a postulated scene model's light field. If one or more of the response models has high uncertainty, the SRE may have weaker predictive ability for observations recorded by that sensor.

As the example embodiments enable precise 6-DOF localization of the camera relative to its containing scene, the scene itself (when stationary) can serve as a target of stable radiance for discovering one component of the radiometric response: the mapping from incident radiance to incident irradiance, which varies across the focal plane depending on the camera's optical configuration (e.g., lens type and configuration). In example scenarios, 6-DOF camera poses are resolved to high precision when scene solving module 1107 frees the pose parameters to vary along with the parameters of scene mediels and radiels being solved. In the invention, robust camera localization is possible when the observed light field exhibits even gentle gradients relative to a change of pose (many existing localization methods require comparatively sharp gradients).

Non-camera sensors may also be calibrated in a suitable manner. For example, position, motion and/or rotation sensors may be calibrated and/or their initial values determined so that subsequent motion can be tracked relative to the initial values. A time-of-flight range sensor, for example, may record observations of a scene region in order to determine its initial pose relative to a camera that observes the same region. The scene solving module 1107 may use the initial pose estimate to initialize and then refine a model of the scene, including the time-of-flight sensor's poses and the camera's poses at various viewpoints. In another example, an inertial navigation system, rigidly attached to a camera, records estimates of its pose while the camera observes a scene. When the camera subsequently observes the scene from another viewpoint, the inertial navigation system's pose estimate at the new viewpoint may be used to initialize and/or refine the camera's pose estimate at the new viewpoint.

A media modeling module 1207 regards a participating (e.g., light interacting) media type, characterized primarily, but not exclusively, by its BLIF 1005. Media modeling manages the library of media present in a database. Media modeling also maintains a hierarchy of media types. A "wood" media type and a "plastic" media type both fall under the "dielectric" supertype, while "copper" falls under the "metallic" supertype. During scene reconstruction, a mediel may resolve to one or more of these media types, with an associated likelihood per type.

An observation modeling module 1209 regards sensed data observations. Observations recorded by cameras and other sensors are represented. Calibrations and response models are represented when they pertain to a particular observation rather than the sensor itself. An example of this is a camera lens distortion model that changes over the course of an imaging scan due to dynamic focus, aperture, and zoom control. An observation from a camera at a certain viewpoint comprises radiance integrated at pixels. The observation model for such an observation would comprise the pixel radiance values, the camera's estimated pose at the time of observation, time reference information (e.g., an image timestamp), calibration values and/or response models specific to the observation (e.g., zoom-dependent lens distortion), and calibration values and/or response models independent of the observation.

The chain of calibration and/or response models at different levels of observation locality forms a nested sequence. The nesting order may be embodied using database record references, bidirectional or unidirectional memory pointers, or any other suitable mechanism. The nesting order enables traceability of various levels of reconstructed scene model information back to the original source observations in a manner that enables "forensic analysis" of the data flow that yielded a given reconstruction result. This information also enables reinvocation of the reconstruction process at various stages using alternate goals, settings, observations, prior models, and the like.

A kernel modeling module 1211 regards patterns and/or functions used for detecting and/or characterizing (extracting the signature of) scene features from their recorded observation. The ubiquitous SIFT function in computer vision is an example kernel function in the realm of feature detection that may be used in example embodiments. Kernel modeling manages the library of kernel functions present in a database and available for feature detection in a given reconstruction operation. More detail about scene features is given below in describing the detection and use of scene features at operation 1821 with reference to FIG. 18B.

A solve rule module 1213 regards the order in which the scene solving module 1107 evaluates (for consistency) postulated values of the modeled characteristics of scene entities. The postulated mediel types shown in FIGS. 8B-8E, for example, could be evaluated in parallel or in some prioritized serial order. Within the evaluation of each postulated mediel type, various numerical ranges for the values of characteristics could similarly be evaluated in parallel or in series. An example of this is different ranges (bins) for the angular degrees of freedom of the normal vector of metal surfel 821. The desired sequence of serial and/or parallel evaluations of postulates in the preceding example is represented by a solve rule data construct. Solve rule module 1213 manages a library of solve rules (contained in a database). The postulate evaluation order is partially determined by the hierarchy of modeled media types maintained by media modeling module 1207. More detail regarding the evaluation of model postulates is given below in describing scene solving process 1800 with reference to FIG. 18A.

A merge rule module 1215 regards the merging (aggregation, coalescing) of finer spatial elements to form coarser spatial elements. Mediels and radiels are prime examples of such spatial elements. Merge rule module 1215 manages a library of merge rules (contained in a database). A merge rule has two principal aspects. Firstly, a merge rule indicates when a merge operation should take place. In the case of media, a merge may be indicated for mediels whose values for positional, orientational, radiometric, and/or polarimetric characteristics fall within a certain mutual tolerance across the mediels. The radiometric and polarimetric characteristics involved in the merge decision may be those of a mediel's BLIF, responsive light field, emissive light field, (total) exitant light field, and/or incident light field. In the case of a light field, a merge may be indicated for radiels whose values for positional, orientational, radiometric, and/or polarimetric characteristics fall within a certain mutual tolerance across the radiels. Secondly, a merge rule indicates the resulting type of the coarser spatial element formed when finer spatial elements merge. In the case of mediels, the hierarchy of modeled media types maintained by media modeling module 1207 partially determines the coarser mediel that results. The preceding description of the merge rule module 1215 remains valid in the case that the media and light fields in a scene are parameterized using spherical harmonics (higher harmonics merge to form a lower harmonic) or any other suitable system of spatial basis functions.

An operating settings module 1217 operates to provide the allocation of local and remote CPU processing cycles, GPU computing cores, FPGA elements, and/or special-purpose computing hardware. The SRE may rely upon module 1217 for allocating certain types of computations to particular processors, to allocate computations while considering load balancing, etc. In an example, if scene solving 1107 is repeatedly bottlenecked due to a lack of updated incident radiel information in certain scene regions of interest, operating settings module 1217 may allocate additional FPGA cores to the exitant to incident light field processing module 2005 (shown in FIG. 20). In another example, if network bandwidth between an SRE and the cloud is suddenly reduced, operating setting module 1217 may, at the cost of using a great share of local memory, begin caching cloud database entities in local memory in order to eliminate the high latency in fetching cloud entities on demand.

Figure 13:
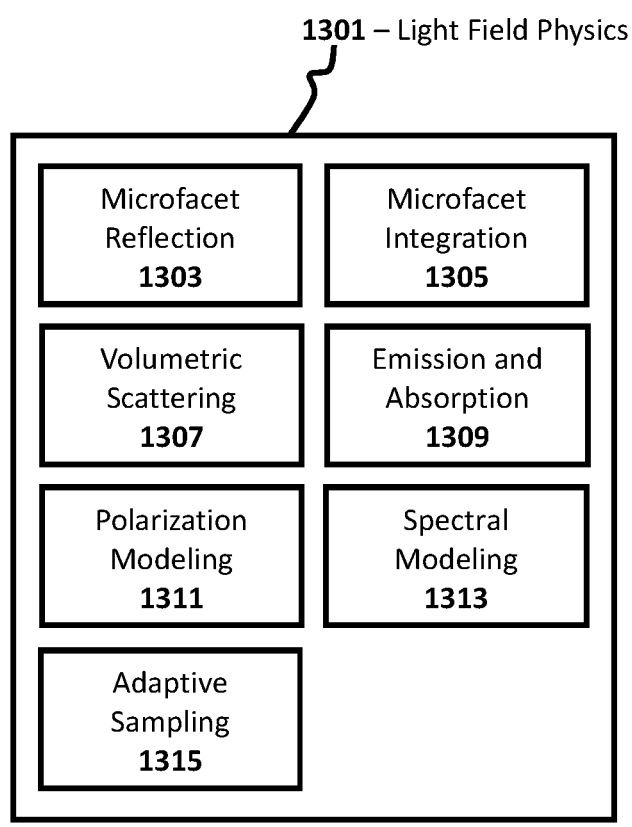
FIG. 13 is a schematic diagram that shows light field physics functions, according to some example embodiments.

FIG. 13 is a block diagram of a light field physics processing module 1301 of an SRE, such as, for example, the light field physics processing module 1115 of SRE 201 according to some example embodiments. Module 1301 includes operations that model the interaction between the light field and media in a scene, as expressed by a BLIF. Light field physics processing module includes microfacet (Fresnel) reflection module 1303, microfacet integration module 1305, volumetric scattering module 1307, emission and absorption module 1309, polarization modeling module 1311, and spectral modeling module 1313. An adaptive sampling module 1315 is employed make the modeling problem tractable by focusing the available computing resources on radiels of maximum impact to reconstruction operations. In some embodiments, the light field physics module uses spatial processing (such as that provided by spatial processing module 1113), including optional specialized hardware, to realize light field operations with low electrical power consumption and/or improved processing throughput. More detail on this is conveyed below with reference to FIG. 20.

Light field physics models the interaction between media and the light that enters (is incident on) and exits (is exitant from) it. Such interactions are complex in real scenes when all or a large number of known phenomena are included. In example embodiments, the light field physics module uses a simplified "light transport" model to represent these interactions. As noted above, FIG. 10 shows the model used to represent the interaction that takes place at a single mediel. The emissive light field is emitted by the mediel independent of stimulation by incident light. Energy conservation dictates that the total energy of the responsive light field is less than the total energy of the incident light field.

In the light transport model, (the radiance of) each responsive radiel exiting a mediel is a weighted combination of (the radiances of) radiels entering that mediel or a set of contributing mediels (in the case of "light hopping", such as subsurface scattering, where light exits a mediel in response to light entering a different mediel). The combination is usually, but not always, linear. The weights may be a function of the wavelength and polarization state of the incident radiels, and they may change with time. As noted above, an emissive term may also be added to account for the light emitted by the mediel when not stimulated by incident light. The light transport interaction used in example embodiments may be expressed by the following equation:

$$L(x \to \omega) = L_e(x \to \omega) + \int_{X'} \int_{\Omega'_{4\pi}} f_l(x \to \omega', x' \leftarrow \omega') L(x' \leftarrow \omega') d\omega' dx' \quad [\text{Eq. 1}]$$

where:

x is a voxel (position element).
x' is a voxel that contributes to the radiance exitant at x.
X' is all voxels that contribute to the radiance exitant at x.
ω is a sael of exitant radiance.
ω' is a sael of incident radiance.
x→ω and x←ω are the sael defined by voxel x and sael (A).
$L(x \to \omega)$ is the radiance of the exitant radiel at sael x→ω.
$L(x' \leftarrow \omega')$ is the radiance of the incident radiel at sael x'←ω'.
$L_e(x \to \omega)$ is the emissive radiance of the exitant radiel at sael x→ω.
$f_l(x \to \omega, x' \leftarrow \omega')$ is the BLIF, with light hopping, that relates the incident radiel at x'←ω' to the exitant radiel at x→ω.
dω' is the (amount of) solid angle subtended by sael ω'.
dx' is the (amount of) surface area represented by voxel x'.
$\Omega'_{4\pi}$ is the entire sphere (4π steradians) of incident saels.

The preceding and following light transport equations do not explicitly show dependencies on wavelength, polarization state, and time. Persons skilled in the art will understand that the equations can be extended to model these dependencies.

As mentioned above, certain media exhibit the phenomenon of "light hopping", where a mediel's responsive light field depends not only (or at all) on the mediel's incident light field, but on the light field entering one or more other mediels. Such hops give rise to important scene characteristics of some types of media. Human skin, for example, exhibits significant subsurface scattering, a subclass of general light hopping. When light hopping is not modeled, the incident contributing domain X' reduces to the single voxel x, eliminating the outer integral:

$$L(x \to \omega) = L_e(x \to \omega) + \int_{\Omega'_{4\pi}} f_l(x, \omega \leftarrow \omega') L(x \leftarrow \omega') d\omega' \quad [\text{Eq. 2}]$$

where:

$f_l(x, \omega \leftarrow \omega')$ is the BLIF, without light hopping, that relates the incident radiel at x←ω' to the exitant radiel at x→ω.

When a mediel is presumed to be of type surfel, the BLIF reduces to a conventional bidirectional reflectance distribution function (BRDF):

$$L(x \to \omega) = L_e(x \to \omega) + \int_{\Omega'_{2\pi}} f_r(x, \omega \leftarrow \omega') L(x \leftarrow \omega')(n \cdot \omega') d\omega' \quad [\text{Eq. 3}]$$

where:

$f_r(x, \omega \leftarrow \omega')$ is the BRDF that relates the incident radiel at x←ω' to the exitant radiel at x→ω.
n is the surface normal vector at surfel x.

(n·ω') is a cosine foreshortening factor that balances its reciprocal factor present in the convention BRDF definition.
$\Omega'_{2\pi}$ is the continuous hemisphere (2π steradians) of incident saels centered about the normal vector of a surfel.

When light is transported through space modeled as being empty, radiance is conserved within the sael (along the path) of propagation. That is to say, the radiance of an incident radiel, at a given voxel, equals the radiance of the corresponding exitant radiel at the last non-empty mediel of interaction before entering the voxel in question. A mediel of empty space has a BLIF that is the identity function: the exitant light field equals the incident light field (and the emissive light field has zero radiance in all saels). In a scene model consisting of (non-empty) media regions in empty space, conservation of radiance is used to transport light along paths that intersect only empty mediels. An embodiment using other radiometric units, such as radiant flux, may be formulated with an equivalent conservation rule.

Microfacet reflection module 1303 and microfacet integration module 1305 together model the light field at the boundary between media of different types as indicated by a change in refractive index. This covers the common case of surfels in a scene. Microfacet reflection models the reflection component of the total scattering interaction at each small microfacet composing a macroscopic surfel. Each microfacet is modeled as an optically smooth mirror. A microfacet can be opaque or (non-negligibly) transmissive. Microfacet reflection uses the well-known Fresnel equations to model the ratio of reflected radiance to incident radiance in various saels of interest (as dictated by adaptive sampling 1315) at voxels of interest. The polarization state of the incident (e.g., 1001 in FIG. 10) and exitant (e.g., 1007 in FIG. 10) light field is modeled, as described below with reference to polarization modeling module 1311.

Microfacet integration module 1305 models the total scattering interaction over the statistical distribution of microfacets present at a macroscopically observable surfel. For the reflected component, this involves summing the exitant radiance over all microfacets composing the macroscopic surfel. A camera pixel records such macroscopic radiance.

A volumetric scattering module 1207 models the scattering interactions that occur at transmissive media in a scene. This comprises the generally anisotropic scattering at saels in such media. Volumetric scattering is realized in terms of a scattering phase function or other suitable formulation.

A polarization modeling module 1311 models the changing polarization state of light as it propagates through transmissive media and interacts with surfaces. The Stokes vector formalism is used to represent the polarization state of a radiel of the light field. The Stokes vector is expressed in a specified geometric frame of reference. Polarization readings recorded by different polarimeters must be reconciled by transforming their Stokes vectors into a common frame of reference. This is accomplished by a Mueller matrix multiplication representing the change of coordinate system. Polarization modeling performs this transformation as needed when observations at multiple pixels and/or viewpoints are compared during reconstruction.

Polarization modeling module 1311 also models the relation between the polarization states of incident and exitant radiels in various saels upon reflection. This relation is expressed in the polarimetric Fresnel equations that govern the reflection of s-polarized and p-polarized light at dielectric and metallic surfaces. For light incident on dielectric and metallic surfaces in some default media, the polarimetric Fresnel equations indicate how the reflected and transmitted (refracted) radiance relate to the incident radiance. The polarimetric Fresnel equations, in conjunction with polarimetric observations of a scene, enable the accurate reconstruction of reflective surfaces that are featureless when observed with a non-polarimetric camera.

An emission and absorption module 1309 models the emission and absorption of light at mediels. Emission at a mediel is represented by an emissive light field 1009 in sampled and/or parametric form. Absorption at a given wavelength is represented by an extinction coefficient or similar quantity indicating the degree of attenuation per unit distance as light travels through the media in question.

A spectral modeling module 1313 models the transport of light at different wavelengths (in different wavebands). The total light field comprises light in one or more wavebands. Spectral modeling module 1313 subdivides the light field into wavebands as needed for reconstruction operations, given the spectral characteristics of the cameras observing a scene. The wavelength dependence of the light field's interaction with a media type is represented in the media's BLIF.

An adaptive sampling module 1315 determines the optimal angular resolution to use for modeling radiels in various directions at each mediel of interest in a scene model. This determination is generally based on the SMA goal for (characteristics of) the mediel, its postulated BLIF(s), and uncertainty estimates for (characteristics of) the radiels that enter and exit the mediel. In the preferred embodiment, the adaptive sampling module 1315 determines the appropriate subdivision (tree levels) of the solid-angle octree(s) representing the incident and exitant light fields associated with a mediel. The BLIF of a shiny (highly reflective) surface, for example, has a tight "specular lobe" in the mirror bounce direction relative to an incident radiel. When scene solving 1107 starts the process of computing the consistency between an observed radiel and the corresponding modeled radiel predicted a postulated BLIF, the adaptive sampling module 1315 determines that the mediel-incident radiels of maximal importance are radiels in the opposing mirror bounce direction relative to the postulated surface normal vector. This information may then be used to focus the available computing resources on determining the modeled radiance values for the determined incident radiels. In the preferred embodiment, the determination of these radiance values is accomplished via the light field operations module 1923 (shown in FIG. 19).

Figure 14:
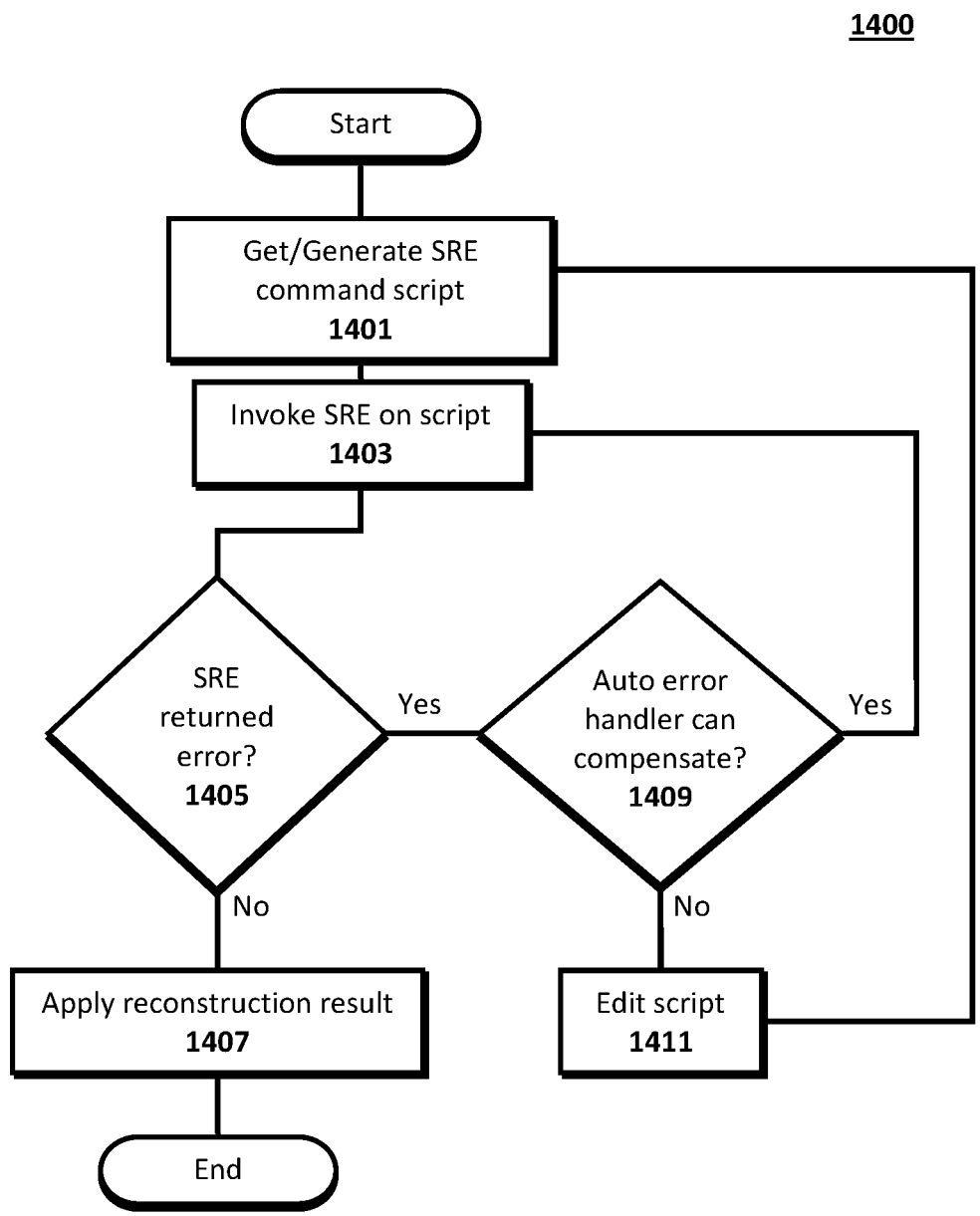
FIG. 14 is a functional flow diagram that shows a software app, according to some example embodiments.

FIG. 14 illustrates a process 1400 of an application software that uses an SRE in a 3D imaging system according to some embodiments. For example, process 1400 may be performed by application software 205 described above in relation to SRE 201.

After entering process 1400, at operation 1401, the application software may generate and/or provide a script of SRE commands. As noted above with reference to FIG. 11, such commands may be realized in many forms. The command script may be assembled by the application software as a result of user interaction via a user interface such as user interface 209. For example, as described in relation to process 300 above, user input may be acquired regarding scene information, one or more goals for the reconstruction, and scanning and/or reconstruction configurations. The application software may, based on acquired user input and/or other aspects such as historical performance or stored libraries and data, configure goals and operating parameters of the reconstruction job. The command script may also be drawn from another source, such as a preexisting command script saved in a database.

At operation 1403, the application software invokes the SRE on the prepared command script. This initiates a series of actions managed by the SRE, including but not limited to planning, scanning, solving, and display. In cases where human input and/or action is needed, the SRE may inform the application software to prompt the user appropriately. This may be accomplished using callbacks or another suitable mechanism. An example of such prompted user action occurs when the user moves a handheld camera to new viewpoints to record further image data requested by the 3D imaging system (e.g., scene solving module 1107) toward meeting some reconstruction goal. An example of prompted user input occurs when the scene solving function was fed a prior scene model with insufficient information to resolve an ambiguity in the type of media occupying certain voxel of interest. In this case, the application software may prompt the user to choose between alternative media types.

At operation 1405, it is determined whether the SRE completed the command script without returning an error. If the SRE reaches the conclusion of the command script without returning an error, then at operation 1407 the application software applies the reconstruction result in some manner useful in the application domain (e.g., an application dependent use of the reconstructed volumetric scene model). In automotive hail damage assessment, for example, the surface reconstruction of a car hood could be saved in a database for virtual inspection by a human inspector or for hail dent detection by a machine learning algorithm. In another example application, scanning and model reconstruction of a scene such as a kitchen at regular intervals may be used to detect state of perishable goods spread throughout the space so that new orders can be initiated. For a more detailed description of a reconstruction job, see the description of example process 1840 with reference to FIG. 18C below. Process 1400 may terminate after operation 1407.

If, at operation 1405, the SRE returns an error, at operation 1409 an optional error handling function (e.g., in the application software) may attempt to compensate by adjusting the goals and/or operating settings. As an example of changing operating settings, if a given SMA goal was not met when reconstructing an OOI in a scene, operation 1409 could increase the total processing time and/or number of FPGA cores budgeted for the scripted job. Then process 1400 proceeds to re-invoke the SRE (operation 1403) on the command script after such adjustment. If the error handling function cannot, at operation 1409, automatically compensate for the returned error, the user may be prompted at operation 1411 to edit the command script. This editing may be accomplished through user interaction similar to that employed when initially assembling the script. After the command script is edited, process 1400 may proceed to operation 1401.

Figure 15:
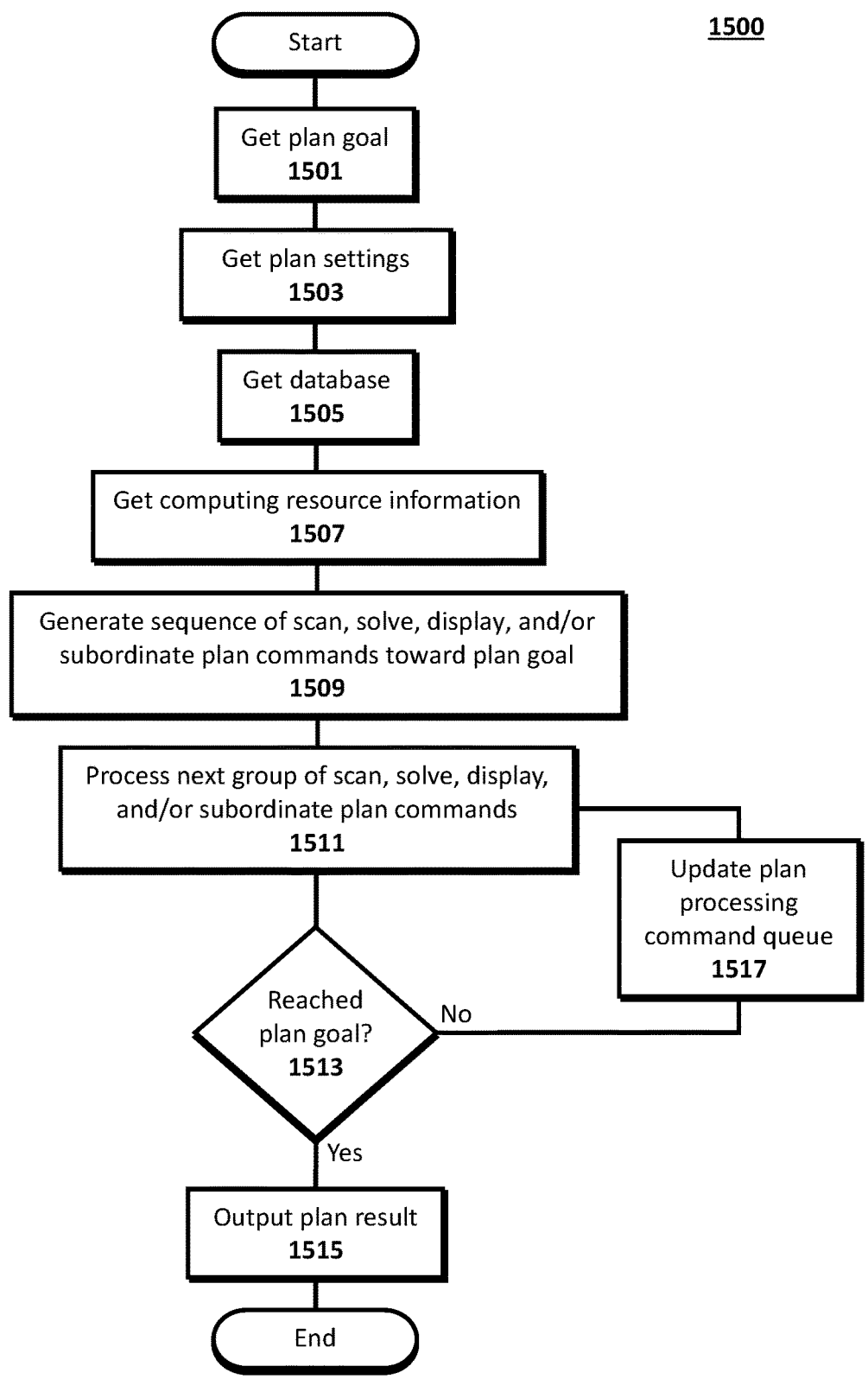
FIG. 15 is a functional flow diagram that shows plan processing, according to some example embodiments.

FIG. 15 is a flowchart of a plan processing process 1500, according to some example embodiments. Process 1500 may be performed by plan processing module 1103 of SRE 201. Process 1500 parses and executes plan commands toward a reconstruction goal. A plan command may comprise a plan goal and operating settings. In one example, a plan command initiates the reconstruction (including imaging), to within specified uncertainty ceilings, of the BLIFs and voxel-by-voxel mediel geometry of the flowers and glass jar in FIG. 1.

After process 1500 is entered, at operation 1501, a plan goal is obtained.

At operation 1503, plan settings are obtained. The plan settings comprise operating settings as described in reference to operating settings module 1217 above.

At operation 1505, database information is obtained from a connected database 209. The database information may include plan templates, prior scene models, and camera models.

At operation 1507, computing resource information is obtained. The computing resource information regards the availability and performance characteristic of local and remote CPUs, GPU computing cores, FPGA elements, data stores (e.g., core memory or disk) and/or special-purpose computing hardware (e.g., an ASIC that performs a specific function to accelerate incident to exitant light field processing 2005).

At operation 1509, a sequence of lower-level subcommands is generated comprising scan processing operations (e.g., scan processing module 1105), scene solving operations (e.g., scene solving module 1107), scene display (e.g., scene display module 1109), and/or subordinate plan processing. The plan goal, operating settings, accessible databases, and available computing resources inform the process of unfolding into subcommands. Satisfaction of the overall plan goal may include satisfaction of the subcommand goals plus any overall tests of reconstruction validity and/or uncertainty estimates at the plan level. In some embodiments, satisfaction of the overall plan goal may be specified as the satisfaction of a predetermined subset of subcommand goals. For more detail regarding the breakdown of a plan goal into the subordinate goals of subcommands, see the description of example process 1840 with reference to FIG. 18C below.

Pre-imaging operational checks and any needed sensor calibrations come before substantive imaging of the relevant scene entities. Scan processing operations are directed to the acquisition of input data for operational checks and sensor calibration. Scene solving operations involve computing the response models that result from certain calibrations.

Examples of sensor-oriented operational checks performed at this level are verification that the relevant sensors (e.g., such as camera 203) are powered on, that they pass basic control and data acquisition tests, and that they have valid current calibrations. In an example solving-oriented operational check, plan processing operations verify that inputs to a scene solving operation are scheduled to validly exist before the solving operation is invoked. Any missing or invalid calibrations are scheduled to occur before the scene sensing and/or solving actions that require them. A calibration involving physical adjustment to a sensor (hard calibration) must occur strictly before the sensing operations that rely on it. A calibration that discovers a sensor response model (soft calibration) must occur strictly before a scene solving operation that relies on it, but it may occur after the sensing of scene entities whose sensed data feeds into the scene solving operation.

Via connected databases, plan processing operations may access one or more libraries of subcommand sequence templates. These comprise generic subcommand sequences that achieve certain common or otherwise useful goals. A 360-degree reconstruction of the flowers and glass jar in FIGS. 1 and 5, for example, could be accomplished by the following approximate sequence template: Scan processing 1105 roughs-in the scene light field by guiding an "outward pan" scan 513 at a few positions in the vicinity of the object of interest. Scan processing 1105 then guides a "left-to-right short baseline" scan 515 of a small region of each different media type constituting the object of interest (flower, leaf, stem, jar). Scene solving 1107 next performs a reconstruction of the BLIF of each media type by maximizing a radiometric and polarimetric consistency metric, given the roughed-in model of the scene's light field. (Scan processing 1105 performs one or more additional BLIF scans if further observations are needed in order to reach a specified uncertainty ceiling.) Scan processing subsequently guides a high-resolution orbit (or partial orbit) scan 509 of the object of interest. Thereafter, scene solving 1107 reconstructs the detailed geometry (pose-related characteristics of the BLIF) of the object of interest by maximizing a consistency metric similar to the one used for BLIF discovery (but maximized over the geometry domain rather than the domain of pose-independent BLIF characteristics).

In general, certain lightweight scene solving operations 1107, usually involving spatially localized scene entities, may be performed within the scope of a single scan command. More-extensive scene solving operations 1107 are typically performed outside the scope of a single scan. These more extensive scene solving operations 1107 typically involve a wider spatiotemporal distribution of scene data, large amounts of scene data, especially tight limits on reconstruction uncertainty, reconciliation of existing scene models, and so on.

Following the generation of the subcommand sequence, at operation 1511, process 1500 iteratively processes each succeeding group of subcommands until reaching the plan goal (or encountering an error condition, exhausting a time and/or resource budget, and so on). After or during each iteration, if the plan goal is reached (at operation 1513), process 1500 outputs the result sought in the plan goal at operation 1515 and ceases iterating. If the plan goal is not reached at operation 1513, the plan processing command queue is updated at operation 1517. This update at operation 1517 may involve adjustment of goals and/or operating settings of the subcommands and/or plan command itself. New subcommands may also be introduced, existing subcommands may be removed, and the order of subcommands may be changed by the update operation 1517.

Figure 16:
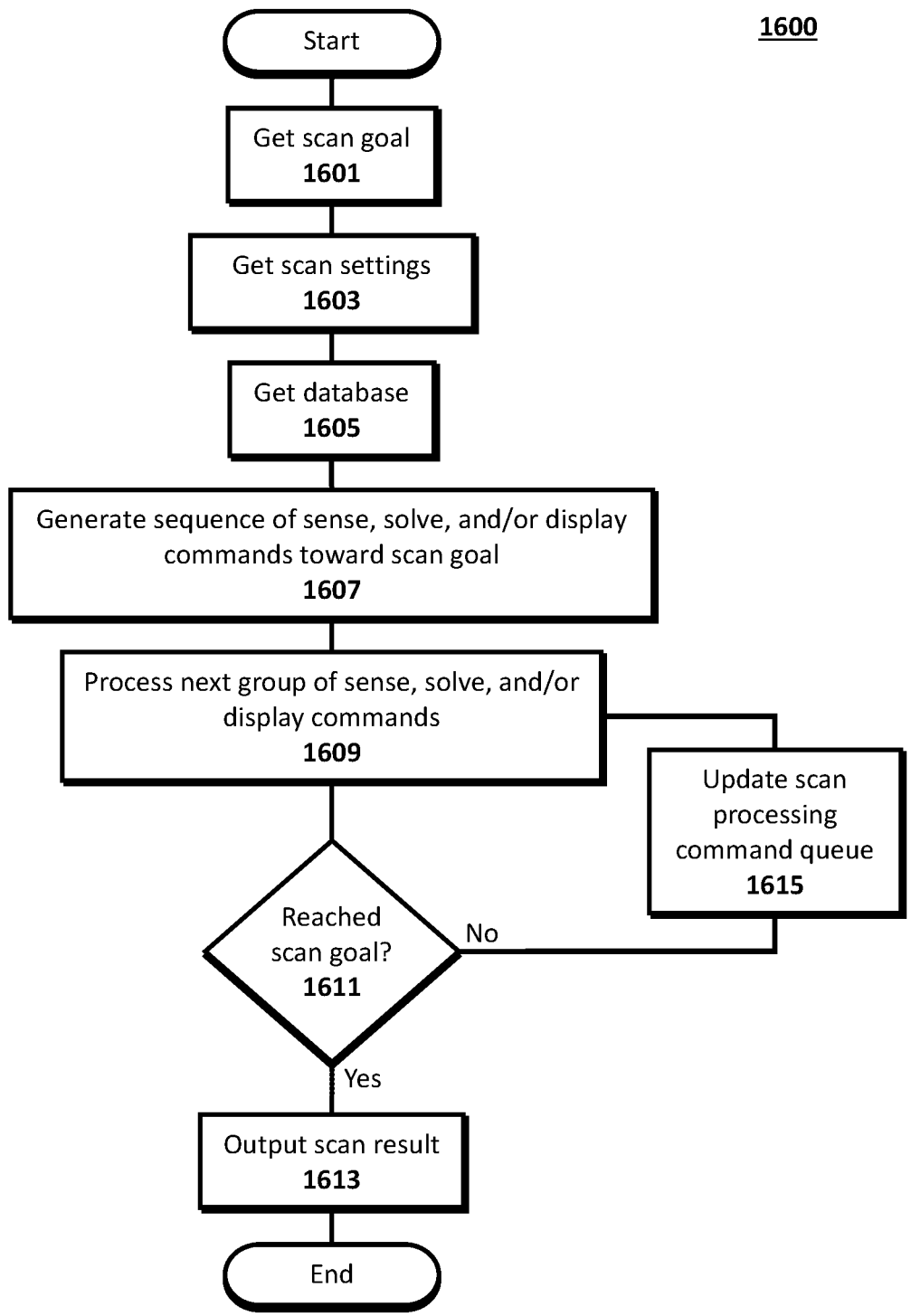
FIG. 16 is a functional flow diagram that shows scan processing, according to some example embodiments.

FIG. 16 is a flowchart of a scan processing process 1600, according to some example embodiments. Process 1600 may be performed by scan processing module 1105 of SRE 201. Scan processing process 1600 drives one or more sensors in scanning a scene, such as, for example, discussed above with reference to FIG. 11. A scan includes sensed data acquisition in a scene. A scan may also include optional scene solving operations (1107) and/or scene display operations (1109). A scan accomplishes some relatively atomic sensing and/or processing goal, as discussed in the above section regarding plan subcommand sequencing with reference to FIG. 15. Notably, scan processing process 1600 manages the acquisition of observations needed for operational checks and sensor calibration. See the description of example process 1840 with reference to FIG. 18C for examples of the operational scope of an individual scan.

As with plan processing commands, a scan processing command (a scan command) comprises a scan goal along with operating settings. Scan processing process 1600 generates a sequence of sensing operations as well as optional scene solving (1107) and/or scene display (1109) operations. The scan goal, operating settings, and accessible databases inform the generation of this sequence.

After process 1600 is entered, at operation 1601 a scan goal is obtained. For an example of a scan goal derived from a plan, see the description of example process 1840 with reference to FIG. 18C below.

At operation 1603, scan settings are obtained. The scan settings comprise operating settings as described in reference to operating settings module 1217 above.

At operation 1605, database information is obtained. The database information may include scan templates, prior scene models, and camera models.

At operation 1607, a subcommand sequencing function generates a sequence of subcommands as discussed above. The subcommand sequencing function is largely concerned with sensing operations, which are extensively discussed below with reference to FIG. 17.

Lightweight scene solving operations 1107 are also in the purview of the subcommand sequencing function. An example of such solving operations 1107 occurs in the feedback-guided acquisition of images for BLIF discovery in step 311 in the functional flow presented in FIG. 3. Scene solving 1107 is invoked one or more times as new groups of sensed images become available. The mathematical derivatives of BLIF model consistency versus camera pose are used to guide camera motion in a manner that reduces the reconstructed model's uncertainty. Once scene solving 1107 reports the satisfaction of specified consistency criteria, feedback is provided to terminate the incremental sensing operation.

Slight refinement of an existing sensor response model is achievable by a scene solving 1107 subcommand, but gross initialization (or reinitialization) of a response model falls outside the scope of scan processing 1105 and must be handled at a higher process level (plan processing 1103, for instance).

At operation 1609, the scan processing module 1105 executes the next group of queued subcommands. At operation 1611, satisfaction of the scan goal is evaluated 1611, typically in terms of an SMA reconstruction goal for some portion the imaged scene. If the goal is not met, operation 1615 updates the subcommand queue in a manner conducive to reaching the scan goal. For examples of updating 1615 the scan subcommand queue, see the description of example process 1840 with reference to FIG. 18C below. If the scan goal is successfully met, the scan result is output at operation 1613.

Figure 17:
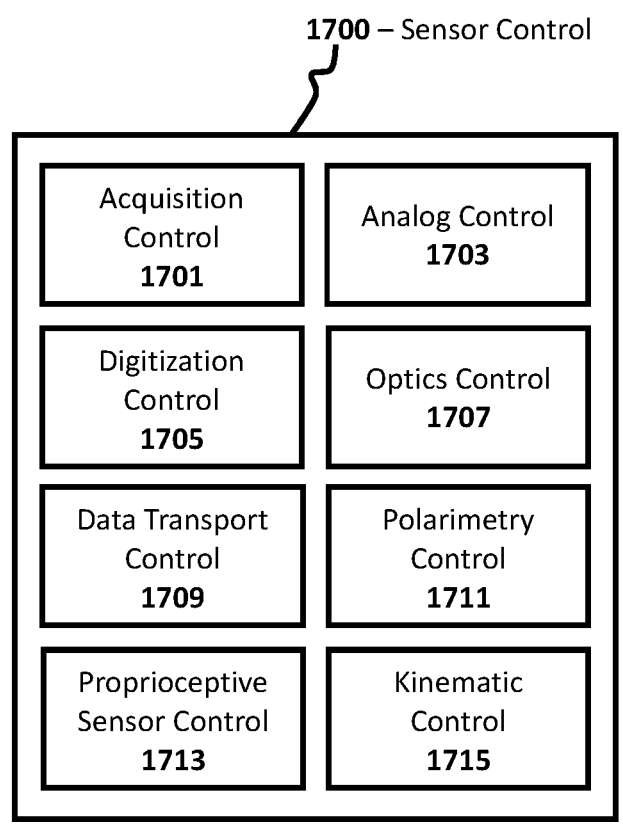
FIG. 17 is a schematic diagram that shows sensor control functions, according to some example embodiments.

FIG. 17 is a block diagram of a sensor control module 1700, according to some example embodiments. Sensor control module 1700 may, in some example embodiments, correspond to sensor control module 1111 of SRE 201 described above. In some example embodiments, sensor control module 1700 may be used by a scan processing module such as scan processing 1105 to record observations of a scene.

An acquisition control module 1701 manages the length and number of camera exposures used in sampling the scene light field. Multiple exposures are recorded and averaged as needed to mitigate thermal and other time-varying noise in the camera's photosites and readout electronics. Multiple exposure times are stacked for synthetic HDR imaging when demanded by the radiometric dynamic range the light field. The exposure scheme is dynamically adjusted to account for the flicker cycle of artificial light sources present in a scene. Acquisition control module 1701 time-synchronizes camera exposures to the different states of a polarizing filter when a division-of-time polarimetry scheme is employed. A similar synchronization scheme is used with other optics modalities when multiplexed in time. Examples of this are exposure at multiple aperture widths or at multiple spectral (color) filter wavebands. Acquisition control module 1701 also manages temporal synchronization between different sensors in a 3D imaging system 207. A camera mounted on a UAV might, for example, be triggered to expose at the same instant as a tripod-mounted camera observing the same OOI from another viewpoint. The two viewpoints could then be jointly input to a scene solving operation (for example, performed by scene solving module 1107) that reconstructs the characteristics of the OOI at that instant.

An analog control module 1703 manages various gains, offsets, and other controllable settings of the analog sensor electronics.

A digitization control module 1705 manages digitization bit depth, digital offsets, and other controllable settings of the analog-to-digital quantization electronics.

An optics control module 1707 manages the adjustable aspects of a camera lens, when available on a given lens. These comprise zoom (focal length), aperture, and focus. Optics control module 1707 adjusts the zoom setting to achieve the appropriate balance between the size of the FOV and the angular resolution of light field samples. When roughing-in a scene, for example, a relatively wide FOV may be used, and then optics control module 1707 may narrow the FOV significantly for high-resolution imaging of an OOI. The lens aperture is adjusted as needed in order to balance focus depth-of-field against recording sufficient radiance (e.g., when extracting a relatively weak polarization signal). When electromechanical control is not available, the optics control module 1707 may be fully or partially realized as guidance to a human user (via the software app's user interface).

A polarimetry control module 1711 manages the scheme used to record the polarization of the light field. When a division-of-time scheme is used, polarimetry control manages the sequence and timing of polarizing filter states. Polarimetry control also manages the different nesting orders that area feasible when interleaving exposure times, noise-mitigating multiple exposures, and polarization sampling states.

A kinematic control module 1715 manages the controllable degrees of freedom of a sensor's pose in space. In one example, kinematic control commands an electronic pan/tilt unit to the poses needed for comprehensive sampling of the light field in a region of space. In another example, a UAV is directed to orbit a car for hail damage imaging. As with optics control module 1707, this function may be fully or partially realized as guidance to a human user.

A data transport control module 1709 manages settings regarding the transport of sensed scene data over the data communication layer in a 3D imaging system 200. Data transport addresses policies on transport failure (e.g., retransmission of dropped image frames), the relative priority between different sensors, data chunk size, and so on.

A proprioceptive sensor control module 1713 interfaces with an inertial navigation system, inertial measurement unit, or other such sensor that provides information about its position and/or orientation and/or motion in the scene. Proprioceptive sensor control synchronizes proprioceptive sensor sampling with the sampling done by cameras and other relevant sensors as required.

Figure 18A:
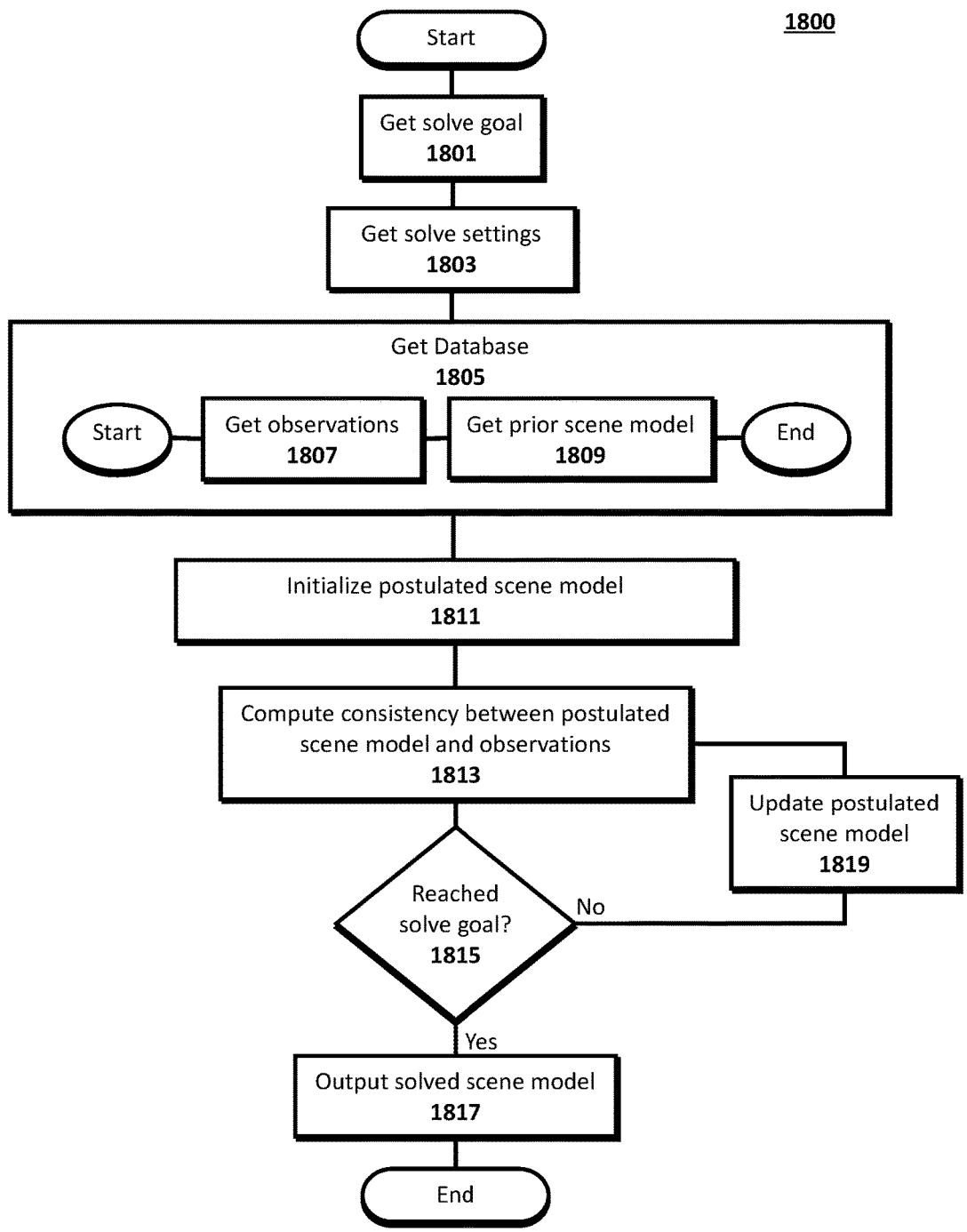
FIG. 18A is a functional flow diagram that shows scene solving, according to some example embodiments.

FIG. 18A is a flowchart of a scene solving process 1800, according to some example embodiments. Process 1800 may be performed by scene solving module 1107 of SRE 201. Scene solving process 1800 may provide for creating and/or refining a reconstructed scene model as directed by a scene solving command (solve command). Scene solving includes the principal steps of, at operation 1811, initializing the postulated scene model and then, at operation 1819, iteratively updating the model until reaching the goal specified in the solve command at operation 1815. Upon goal attainment, the resulting scene model is output at operation 1817.

After entering process 1800, at operation 1801, one or more goals for the scene are obtained. Each goal may be referred to as a solve goal.

At operation 1803, process 1800 obtains solve settings. The solve settings comprise operating settings as described in reference to operating settings module 1217 above. The solve settings also comprise information regarding the processing budget of underlying mathematical optimizers (e.g., a maximum allowed number of optimizer iterations) and/or the degree of spatial regional context considered in solving operations (e.g., weak expected gradients in the characteristics of a media region presumed homogeneous).

At operation 1805, the database is accessed. Process 1800 may, at operation 1807, load the relevant scene observations from the appropriate database, and at operation 1809 load a prior scene model from the appropriate database. The loaded observations are compared to predictions arising from the postulated model at operation 1813. The loaded prior model is used in initializing the postulated scene model at operation 1811.

Before engaging in iterative updates (at operation 1819) to the postulated scene model, process 1800 initializes the postulated scene model at operation 1811 to a starting state (configuration). This initialization depends on the solve goal retrieved and one or more prior (a priori) scene models retrieved (at operation 1809) from the relevant database. In some reconstruction scenarios, multiple discrete postulates are feasible at the initialization stage. In that case, the update flow (not necessarily at its first iteration) will explore the multiple postulates. See the discussion regarding creation and elimination (at operation 1833) of alternative possible scene models with reference to FIG. 18B below.

The iterative update at operation 1819 adjusts the postulated scene model so as to maximize its consistency with observations of the real scene. The scene model update at operation 1819 is further discussed below with reference to FIG. 18B. In the case of reconciliation between existing scene models, process 1800 instead computes 1813 the consistency between the models being reconciled. In an example of such model reconciliation, the model of a hail-damaged car hood is reconciled against a model of the same hood before the damage occurred. The consistency computation at operation 1813, in this reconciliation example, is based on deviations between the hood models' intrinsic mediel characteristics (e.g., BRDF, normal vector) rather than deviations between two models' exitant light fields.

Time may be naturally included in a scene model. Thus the temporal dynamics of an imaged scene may be reconstructed. This is possible when a time reference (e.g., timestamp) is provided for the observations fed into a solving operation. In one example scenario, a car drives through the surrounding scene. With access to timestamped images from the cameras observing the car (and optionally with access to a model of the car's motion), the car's physical characteristics may be reconstructed. In another example, the deforming surface of a human face is reconstructed at multiple points in time while changing its expression from neutral to a smile. Scene solving 1107 can generally reconstruct a scene model where the scene media configuration (including BLIFs) changes through time, subject to having observations from sufficiently many spatial and temporal observation viewpoints per spacetime region to be reconstructed (e.g., a voxel at multiple instants in time). Reconstruction may also be performed under a changing light field when a model (or sampling) of the light field dynamics is available.

At each scene solving iteration, a metric is computed at operation 1813 indicating the degree of consistency between the postulated model and the observations and/or other scene models against which it is being reconciled. The consistency metric may include a heterogeneous combination of model parameters. For example, the surface normal vector direction, refractive index, and spherical harmonic representation of the local light field at a postulated surfel could be jointly input to the function that computes the consistency metric. The consistency metric may also include multiple modalities (types) of sensed data observation. Polarimetric radiance (Stokes vector) images, sensor pose estimates from an inertial navigation system, and surface range estimates from a time-of-flight sensor could be jointly input to the consistency function.

In a general quotidian reconstruction scenario, model consistency is computed per individual voxel. This is accomplished by combining, over multiple observations of a voxel, a per-observation measure of the deviation between the voxel's predicted exitant light field 1007 (e.g., in a projected digital image) and the corresponding observation of the real light field (e.g., in a formed digital image). The consistency computation at operation 1813 may use any suitable method for combining the per-observation deviations, including but not limited to summing the squares of the individual deviations.

In the example of FIG. 8A, one or more cameras image a voxel 801 from multiple viewpoints. Each viewpoint 803, 805, 807, 809, 811, and 813 records the exitant radiance value (and polarimetric characteristics) for a particular radiel of the light field exiting the voxel 801. Media is presumed to occupy the voxel 801, and scene solving 1107 must compute the model consistency for one or more BLIF 1005 postulates (the light field model is held constant in this example). For each viewpoint, a given BLIF 1005 postulate, by operating on the incident light field 1001, predicts (models) the exitant radiance value expected to be observed by each viewpoint. Multiview consistency is then calculated between the postulated BLIF 1005 and the camera observations as described above. The evaluated BLIF 1005 postulates may fall into two or more discrete classes (e.g., wood, glass, or metal).

Note that at this algorithmic level, scene solving module 1107 operations may not explicitly deal with geometric characteristics of the voxel 801. All physical information input to the consistency computation 1813 is contained in the voxel's 801 BLIF and the surrounding light field. Classification as surfel, bulk media, and so on does not affect the fundamental mechanics of computing the radiometric (and polarimetric) consistency of a postulated BLIF.

Figure 18B:
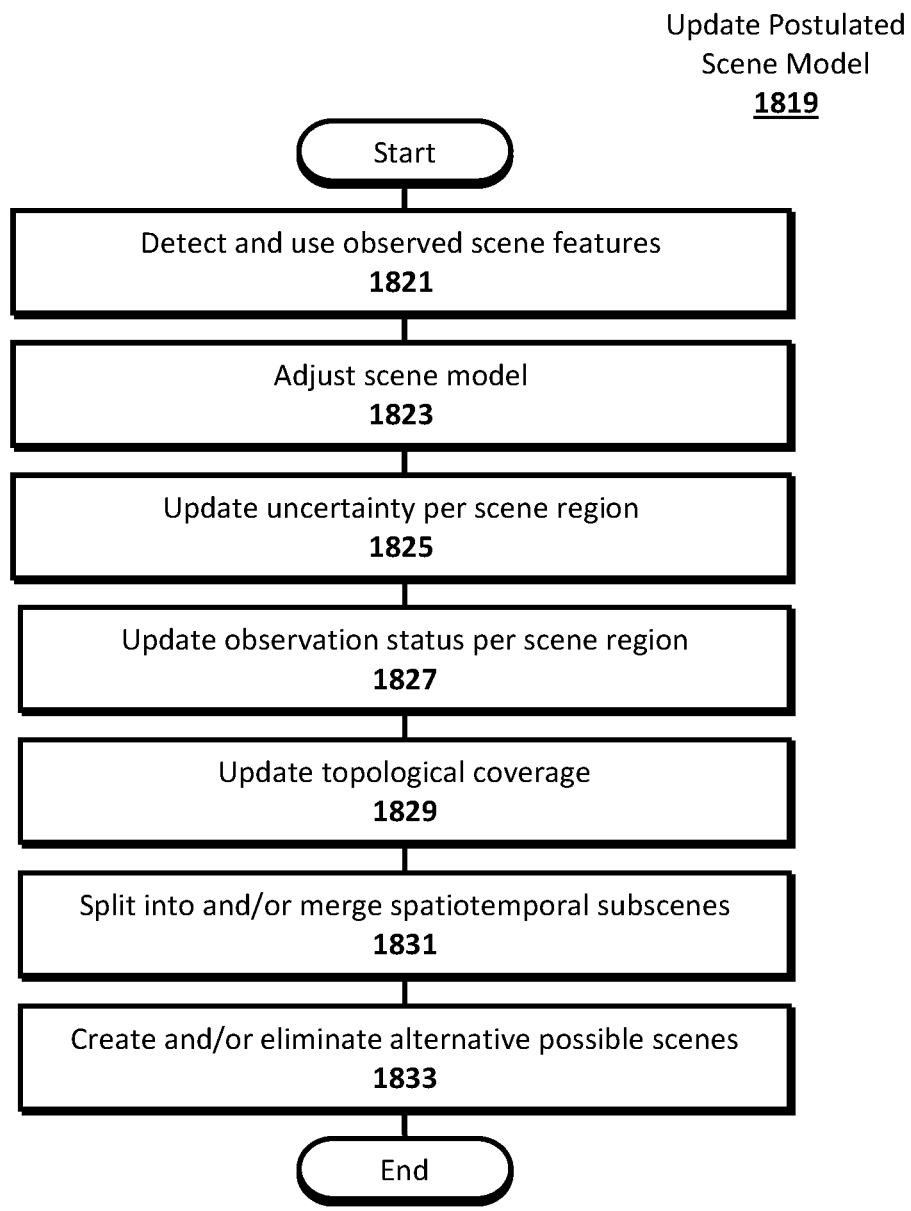
FIG. 18B is a functional flow diagram that shows the process used to update a postulated scene model, according to some example embodiments.

FIG. 18B is a flowchart of a postulated scene update process 1819, according to some example embodiments. In some example embodiments, process 1819 may be performed by the update postulated scene model operation 1819 described in relation to FIG. 18A. Postulated scene update process 1819 represents detail of the update 1819 operation performed on the postulated scene model at each scene solving iteration. The scene update 1819 comprises one or more of the internal functions shown in FIG. 18B. The internal functions may be performed any suitable order.

Process 1819, at operation 1821, detects and uses observed features of scenes. Such features typically occur sparsely in observations of a scene (i.e. many fewer features than pixels, in the case of imaging). Features are detectable in a single observation (e.g., an image from a single viewpoint). Feature detection and characterization is expected to have much lower computational complexity than full physics-based scene reconstruction. Features may bear a unique signature, resilient to changes in viewpoint, that is useful for inferring the structure of the scene, especially the sensor viewpoint pose at the time an observation was recorded. In some examples, tightly positionally localized (point-like) features in the domain of total radiance (exitant from regions of scene media) are used for 6-DOF viewpoint localization.

When polarimetric image observations are input to the scene solving module 1107, two additional types of feature become available. The first is point-like features in the domain of polarimetric radiance. In many example scenarios, these point-like features of polarimetric radiance increase the total number of detected features non-negligibly, as compared to point-like features of total radiance alone. In some examples, the point-like features of polarimetric radiance may arise from the gradient formed from adjacent surfel normal vectors and may be used as localized feature descriptors for labeling corresponding features across two polarimetric images. The second type of feature that becomes available with polarimetric imagery is plane-like features in the domain of polarimetric radiance. If the point-like features are said to be features of position (they convey information about relative position), then the plane-like features may be said to be features of orientation (they convey information about relative orientation). In a prime example, a user of a 3D imaging system performs a polarimetric scan of a blank wall in a typical room. The wall completely fills the imaging polarimeter's field of view. Even though no features of position are detected, the polarimetric radiance signature of the wall itself is a strong feature of orientation. In the example, this polarimetric feature of orientation is used to estimate the polarimeter's orientation relative to the wall. The estimated orientation by itself or in conjunction with position and/or other orientation information then feeds into the general scene model adjustment module 1823 operations. Both of the above polarimetry-enabled feature types may be detected on reflective surfaces that are featureless when observed with a non-polarimetric camera.

Process 1819, at operation 1823, may adjust the scene model in a way that increases some metric of goal satisfaction. In a common example, least-squares consistency between the postulated model and observations is used as the sole metric. The adjustment may be guided by derivatives of the satisfaction metric (as a function on the model solution space). The adjustment may also proceed by a derivative-free stochastic and/or heuristic method such as pattern search, random search, and/or a genetic algorithm, for example. In some cases, machine learning algorithms may guide the adjustment. Derivative-free methods may be particularly beneficial in real-world scenarios involving sampled and/or noisy observations (the observation data exhibits jaggedness and/or cliffs). For an example of derivative-free adjustment via hierarchical parameter search, see the description of process 1880 with reference to FIG. 18D below.

Any suitable model optimizer may be used to realize the above adjustment schemes. In some embodiments, spatial processing operations (e.g., operations described in relation spatial processing module 1113) may be employed to rapidly explore the solution space under a suitable optimization framework. In addition to adjusting the postulated scene model itself, subgoals (of the solve goal) and solve settings may also be adjusted.

Uncertainty estimates for various degrees of freedom of the scene model are updated at operation 1825 per scene region as appropriate. The observation status of scene regions is updated at operation 1827 appropriately. The observation status of a region indicates whether light field information from the region has been recorded by a camera involved in the reconstruction. A positive observation status does necessarily indicate that a direct line-of-sight observation (through the default media) took place. A positive observation status indicates that non-negligible radiance observed by a camera can be traced back to the region in question via a series of BLIF interactions in regions that have already been reconstructed with high consistency. Topological coverage information regarding reconstruction and/or observation coverage of scene regions is updated at operation 1829.

Process 1819 may, at operation 1831, split and/or merge the postulated scene model into multiple subscenes. This is typically done in order to focus available computing resources on regions of high interest (the high-interest region is split into its own subscene). The splitting may be done in space and/or time. Conversely, two or more such subscenes may be merged into a unified scene (a superscene of the constituent subscenes). A bundle-adjusting optimizer or any other suitable optimization method is employed to reconcile the subscenes based on mutual consistency.

Process 1819 may, at operation 1833, form and/or eliminate alternative possible scene models. The alternatives may be explored in series and/or in parallel. At suitable junctures in the iterative solving process, alternatives that become highly inconsistent with the relevant observations and/or other models (when reconciling) may be eliminated. In the example of FIGS. 8A to 8E, the four lower diagrams show postulated mediels to which postulated voxel 801 may resolve. These postulates define discrete BLIF alternatives. The four BLIFs differ in type (structure). This stands in distinction to BLIF postulates that are of the same type (e.g., "metal surfel") while differing in the values of parameters particular to that type (e.g., two postulated metal surfels that differ only in their normal vector direction). As stated above, the four discrete postulates may be explored in series and/or in parallel by the solving 1107 function's underlying mathematical optimization routines.

The above scene solving operations may be expressed in succinct mathematical form. The general scene solving operation at a single mediel, using the symbols introduced above with reference to the light field physics 1301 function, is the following:

$$\operatorname*{argmin}_{f_r(x \to \omega, X' \leftarrow \Omega'_{4\pi}), L(X' \leftarrow \Omega'_{4\pi})} \sum_{observed\ x \to \omega} \operatorname{error}(L_{predicted}(x \to \omega, f_r, L(X' \leftarrow \Omega'_{4\pi})) - L_{observed}(x \to \omega)) \quad [\text{Eq. 4}]$$

where:

$f_r(x \to \omega, X' \leftarrow \Omega'_{4\pi})$ is the BLIF, with light hopping, applied to all saels $X' \leftarrow \Omega'_{4\pi}$ that contribute to the responsive light field sael $x \to \omega$.

$L(X' \leftarrow \Omega'_{4\pi})$ is the radiance of each radiel at saels $X' \leftarrow \Omega'_{4\pi}$.

$L_{predicted}(x \to \omega, f_r, L(X' \leftarrow \Omega'_{4\pi}))$ is the radiance of the exitant radiel at sael $x \to \omega$ predicted by BLIF $f_r$ and incident light field $L(X' \leftarrow \Omega'_{4\pi}$.

$L_{observed}$ is the radiance recorded by a camera observing a single voxel x or voxels X.

error ($L_{predicted}$-$L_{observed}$) is a function, including robustification and regularization mechanisms, that yields an inverse consistency measure between predicted and observed radiels of the scene light field. An uncertainty-based weighting factor is applied to the difference (deviation, residual) between predicted and observed radiance.

When applied to a volumetric region (multiple mediels), the solving operation is extended as follows:

$$\underset{f_l(X \to \omega, X' \leftarrow \Omega'_{4\pi}), observed\ X \to \omega}{\operatorname{argmin}} \sum_{L(X' \leftarrow \Omega'_{4\pi})} \operatorname{error}(L_{predicted}(X \to \quad\quad [\text{Eq. 5}]$$
$$\omega, f_l, L(X' \leftarrow \Omega'_{4\pi})) - L_{observed}(X \to \omega))$$

where:

$L_{predicted}(X''\omega, f_l, L(X'\leftarrow\Omega'_{4\pi}))$ is the radiance of the exitant radiels at all saels $X \to \omega$ predicted by BLIF $f_l$ and incident light field $L(X' \leftarrow \Omega'_{4\pi})$.

X is the regions of observed mediels.

In the useful case where the incident light field has been estimated to high confidence, the solving operation may be restricted to solve for the BLIF, while holding the incident light field constant (shown for a single mediel, with hopping):

$$\underset{f_l(x \to \omega, X' \leftarrow \Omega'_{4\pi}), observed\ x \to \omega}{\operatorname{argmin}} \sum \operatorname{error}(L_{predicted}(x \to \quad\quad [\text{Eq. 6}]$$
$$\omega, f_l, L(X' \leftarrow \Omega'_{4\pi})) - L_{observed}(x \to \omega))$$

Conversely, when the BLIF has been estimated to high confidence, the solving operation may be restricted to solve for the incident light field, while holding the BLIF constant (shown for a single mediel, with hopping):

$$\underset{L(X' \leftarrow \Omega'_{4\pi}), observed\ x \to \omega}{\operatorname{argmin}} \sum \operatorname{error}(L_{predicted}(x \to \omega, f_l, L(X' \leftarrow \Omega'_{4\pi})) - \quad [\text{Eq. 7}]$$
$$L_{observed}(x \to \omega))$$

The sub-operations involved in computing the individual error contributions and in deciding how to perturb the model at each argmin iteration are complex and are discussed in the text, preceding the equations, regarding scene solving 1107.

Figure 18C:
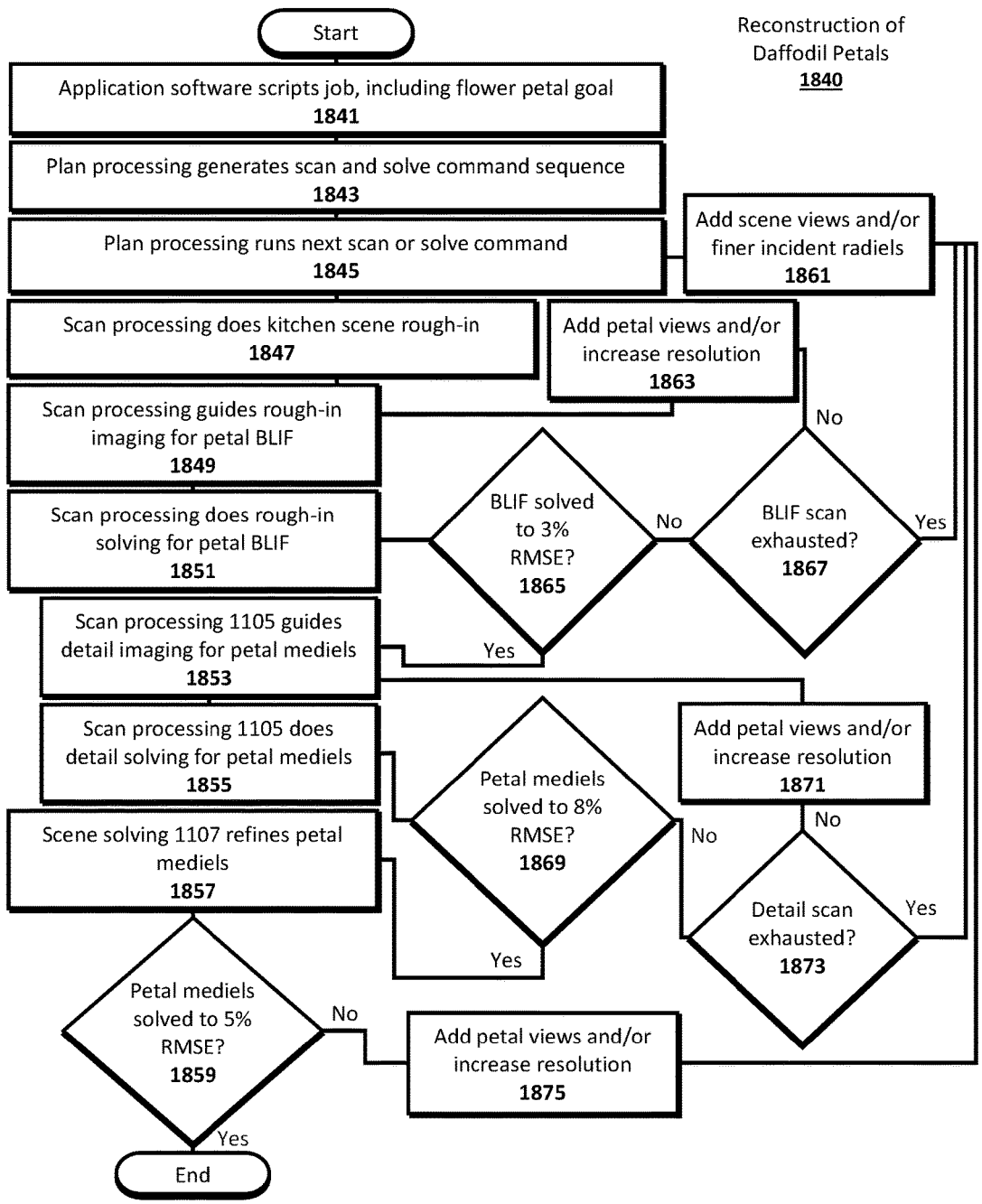
FIG. 18C is a functional flow diagram that shows the process used to reconstruct the daffodil petals in the scene of FIG. 1, according to some example embodiments.

FIG. 18C is a flowchart of a goal-driven SRE job, according to some example embodiments, for the kitchen scene reconstruction scenario presented in FIGS. 1, 5, and 7. FIG. 18C complements the general flowchart of FIG. 3 by presenting more insight into the operations and decision points an SRE follows in a reconstruction job. The example job goal of FIG. 18C is also narrowly specified in order to yield numerically quantitative goal criteria in the following description. Descriptions of common "boilerplate" operations, such as operational checks and standard camera calibrations, can be found in previous sections and are not repeated here.

The reconstruction process 1840 begins in this example scenario begins at operation 1841, where the application software 205 scripts the job (forms a script of SRE commands) with a goal of reconstructing the petals of the daffodil (narcissus) flowers to a desired spatial resolution and level of scene model accuracy (SMA). The desired spatial resolution may be specified in terms of angular resolution relative to one or more of the viewpoints at which images were recorded. In this example, the goal SMA is specified in terms of the mean squared error (MSE) of light field radiels exitant from those mediels postulated to be of type "daffodil petal" in the reconstructed model. A polarimeter capable of characterizing the full polarization ellipse is used in this example. The polarization ellipse is parameterized as a Stokes vector [$S_0$, $S_1$, $S_2$, $S_3$], and the MSE takes the form (referring to equations [1]-[7]):

$$\Sigma_{observed\ x \to \omega} \operatorname{error}(S_{predicted}(x \to \omega, f_l, L(x \leftarrow \Omega'_{4\pi})) - S_{observed}(x \to \omega))) \quad\quad [\text{Eq. 8}]$$

where:

$S_{predicted}$ is the Stokes vector of radiances of the exitant radiel at a postulated mediel's sael $x \to \omega$ with postulated BLIF $f_l$ and incident light field $L(x \to \Omega'_{4\pi})$. The incident light field's model may include polarimetric characteristics. "Light hopping" is not modeled in this example scenario.

$S_{observed}$ is the Stokes vector of radiances recorded by the polarimeter observing the corresponding mediel in the real scene.

error is a function yielding an inverse consistency measure between predicted and observed radiels. In the polarimetric case of this example, the function may be realized as a squared vector norm (sum of the squares of the components) of the deviation (difference) between the predicted and observed Stokes vectors.

The desired SMA in this example scenario is a polarimetric radiance RMSE (square root of MSE) of 5% or less, calculated over the radiels exiting daffodil petal mediels in the postulated scene model, relative to the corresponding observed radiels' radiances in Watts per steradian per square meter. Equation [8] above yields the MSE for a single postulated mediel. The MSE for a set of multiple mediels, such as a postulated arrangement of mediels composing a flower petal, is calculated by summing the predicted-vs.-observed polarimetric radiance deviations over the mediels in the set.

Also in operation 1841, the application software 205 specifies a database whose contents include a polarimetric camera model of the polarimeter used for imaging, a prior (a priori) model of a generic kitchen in a single-family home during daytime, and a prior model of daffodil petals. The prior models, which include an approximate BLIF of generic daffodil petals, are adjusted during rough-in operations 1847 and 1851 in a way that maximizes their initial consistency versus the real scene. An example adjustment operation is to populate a mediel in the prior model with observed radiance values for its sphere of exitant radiels. The observed radiance values are measured by the polarimeter that performs rough-in imaging in the real scene.

At operation 1843, the plan processing module 1103 generates a sequence of scan and solve commands toward the 5% RMSE goal specified in the job script. Given the daffodil petal OOI reconstruction goal, plan processing 1103 retrieves a suitable plan template from a connected database. The template is "General Quotidian OOI Plan" in this example. The template specifies the sequence of subordinate operations 1847, 1849, 1851, 1853, 1855, and 1857. Based on the overall job goal, the template also specifies a subordinate goal for some of the operations. These subordinate goals are detailed in the following paragraphs and determine conditional logic operations 1859, 1865, 1867, 1869, and 1873 and the associated iterative adjustment operations

1861, 1863, 1871, and 1875 that occur along some of the conditional flow paths. SMA targets in the subordinate goals are customized according to the 5% RMSE goal of the overall job.

At operation 1845, plan processing 1103 begins an iterative cycle through the subordinate steps. At operation 1847, scan processing 1105 guides an initial "outward pan" sequence of scene rough-in imaging (e.g., camera poses in item 513 in FIG. 5) and then populates the exitant point light field of scene mediels as described above in reference to prior model initialization. The subordinate goal of operation 1847 in this example is to estimate (reconstruct) incident light field radiels at 3° angular resolution for every mediel in the postulated region occupied by daffodil petals. Scan processing 1105 decides on the 3° goal for incident radiel resolution based on mathematical models (e.g., simulated reconstruction) and/or historical reconstruction performance involving the (estimated) BLIF of daffodil petals contained in prior models in the database.

At operation 1849, scan processing 1105 guides an initial sequence of BLIF rough-in imaging of the daffodil petals (e.g., the camera poses in item 515 in FIG. 5). The BLIF rough-in imaging is guided toward regions of petal that are presumed homogeneous in media composition and/or spatial arrangement (shape). In the example case of flower petals, homogeneity in this regard may require that the imaged "patch of petal" be of approximately constant color and thickness and that the patch be of negligible or approximately constant curvature. Scan processing 1105 then commands 1851 scene solving 1107 to estimate BLIF parameters as conveyed in Equation [6], applied to the mediels of the petal patch. A subordinate SMA goal of 3% relative RMSE is set for the BLIF solving operation. Similar to the 3° radiel goal in the preceding paragraph, this 3% BLIF reconstruction goal is decided based on mathematical models and/or historical performance data. If scene solving 1107 fails 1865 to meet the 3% goal, then scan processing 1105 updates 1863 its internal command queue to image the petal patch from additional viewpoints and/or with increased image resolution (e.g., zoom in to narrow the field of view). If the 3% goal is not met and scan processing 1105 has exhausted some imaging and/or processing budget, then plan processing 1103 updates 1861 its internal command queue to more precisely rough-in the scene by guiding additional "outward pan" imaging sequences and/or by reconstructing the incident light field (at the petal patch) with finer angular resolution of radiels. If the 3% goal is met, then control proceeds to operation 1853.

At operation 1853, scan processing 1105 guides a sequences of detail imaging of the daffodil petals (e.g., camera poses 509 in FIG. 5). Scan processing 1105 then commands 1855 scene solving 1107 to refine the roughed-in reconstruction of petal mediels. A subordinate goal of 8% relative RMSE is set for the refinement operation. The 8% goal applies to the all petal mediels, not only the (more easily reconstructed) homogeneous patches that were assigned a 3% goal in the preceding description of operation 1851. The 8% goal is decided based on mathematical models and/or historical data on reconstruction performance. The SRE has predicted that an 8% RMSE goal when solving for petal mediels, while holding the BLIF (BRDF portion of the BLIF) and light field parameters constant, will reliably yield a 5% final RMSE when the BLIF and/or light field parameters are allowed to "float" in the final whole-scene refinement operation 1857. If scene solving 1107 fails 1869 to meet the 8% goal, then scan processing 1105 updates 1871 its internal command queue to image the petal patch from additional viewpoints and/or with increased resolution. If the 8% goal is not met and scan processing 1105 has exhausted some imaging and/or processing budget, then control proceeds to operation 1861 as in the above description of BLIF rough-in operations 1849 and 1851. If the 8% goal is met, then control proceeds to operation 1857.

At operation 1857, scene solving 1107 performs a full refinement of the scene model (e.g., a large-scale bundle adjustment in some embodiments). Solving operation 1857 generally involves more degrees of freedom than rough-in solving operations 1851 and 1855. The BLIF parameters (BRDF portion of the BLIF) and pose parameters (e.g., petal surfel normal vector) are allowed to vary simultaneously, for example. In some scenarios, parts of the scene light field, parameterized using standard radiels and/or other basis functions (e.g., spherical harmonics) are also allowed to vary during final refinement operation 1857. If operation 1857 fails 1859 to meet the controlling job's SMA goal of 5% RMSE on petal mediels is not met, then plan processing updates 1875 its internal command queue to acquire addition petal images and/or updates 1861 its internal command queue as described above in reference to operations 1849 and 1851. If the 5% goal is met, then process 1840 exits successfully, and the application software uses the reconstructed model of the daffodil petals for some suitable purpose.

Figure 18D:
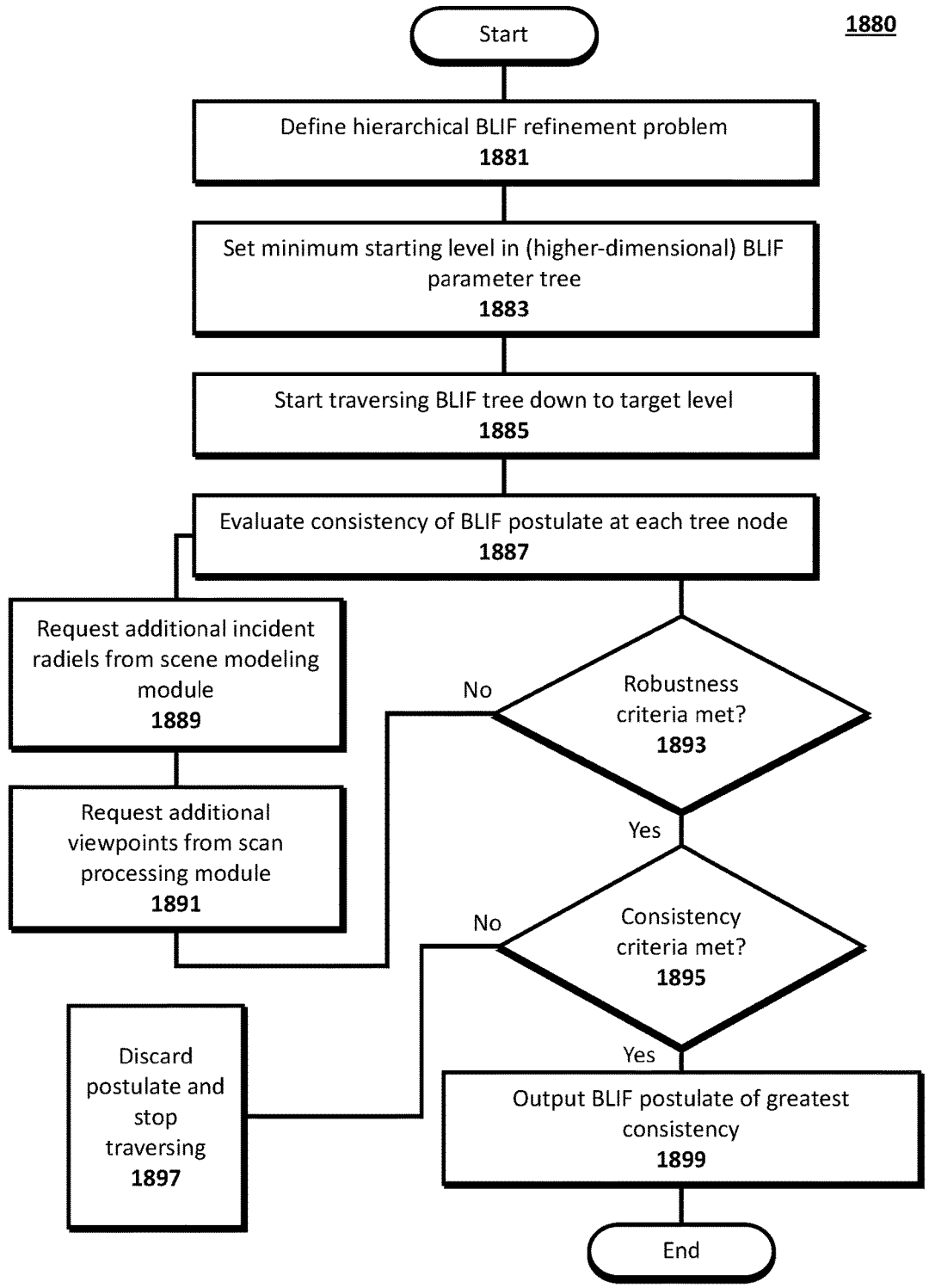
FIG. 18D is a functional flow diagram that shows the process used to directly solve for the BLIF one mediel of the daffodil petals reconstructed in FIG. 18C, according to some example embodiments.

FIG. 18D is a flowchart, according to some example embodiments, of the operations involved in detail solving for mediels of the daffodil petals as described in reference to operation 1855 in the description of FIG. 18C above. A hierarchical, derivative-free solving method is employed in this example scenario. Process 1880 gives the BLIF solution for a single mediel (and/or its incident and/or exitant radiels) at some desired spatial resolution. In the preferred embodiment, instances of process 1880 are run in parallel for many postulated mediels (voxels) in the daffodil petal OOI region.

At operation 1881, a hierarchical BLIF refinement problem is defined. The BLIF parameters of the postulated mediel are initialized to the values discovered in BLIF rough-in solving operation 1851. Also initialized is a traversable tree structure that represents hierarchical subdivisions of the numerical range of each BLIF parameter (e.g. a binary tree in each BLIF parameter). At operation 1883, a minimum starting level (depth) in the tree is set, to prevent premature failure in the tree traversal due to overly coarse quantization of the parameter ranges. At operation 1885, parallel traversal of the tree begins at each of the minimum-depth starting nodes determined in operation 1883. Each branch of the tree is traversed independently of the others. Large-scale parallelism could be realized in an embodiment that uses, for example, many simple FPGA computing elements to perform the traversal and node processing.

At operation 1887, the consistency of the BLIF postulate is evaluated at each tree node. In accordance with the parallel traversal, each node's consistency is evaluated independently of other nodes. The consistency evaluation proceeds according to equation [8]. The consistency evaluation in operation 1887 requires that certain robustness criteria be satisfied 1893. In this example, one such criterion is that the daffodil petal observations provided by scan processing 1105 yield sufficient coverage (e.g., 3° angular resolution in a cone of 45° about the postulated BLIF's principal specular lobe). Another example criterion is that the modeled scene radiels entering (incident to) the mediel satisfy similar resolution and coverage requirements. The robustness criteria regarding observed radiels and modeled incident radiels both depend on the postulated BLIF (e.g., profile of specular lobe(s)) to a great extent. When the criteria are not satisfied 1893, operation 1891 requests the additional needed imaging viewpoints from the scan processing 1105 module. When so indicated, operation 1889 requests the availability of additional incident radiel information from the scene modeling 1203 module. These requests may take the form of adding entries to a priority queue. The request for additional incident radiel information generally initiates a chain of light transport requests serviced by the light field operations module 1923.

If after robustness criteria have been satisfied 1893, the consistency criteria are not satisfied 1895, then tree traversal stops 1897, and the BLIF postulate for the node is discarded 1897. If the consistency criteria are satisfied 1895, the node's BLIF postulate is added to a list of valid candidate BLIFs. Once the tree has been exhaustively traversed, the candidate with the greatest consistency (lowest modeling error) is output at operation 1899 as the likeliest BLIF for the mediel. If the candidate list is empty (no tree node satisfied the consistency criteria), then the voxel fails to satisfy the postulate that it is of media type "daffodil petal".

Figure 19:
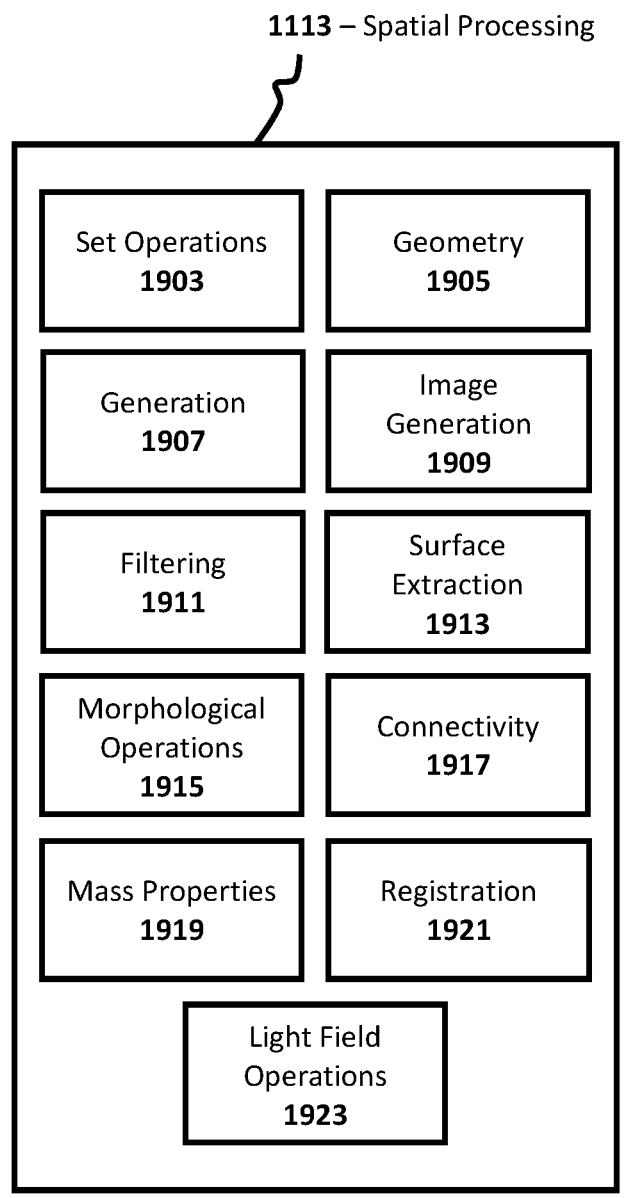
FIG. 19 is a schematic diagram that shows spatial processing operations, according to some example embodiments.

FIG. 19 is a block diagram showing a spatial processing module 1113 of an SRE, according to some example embodiments. Spatial processing module 1113 may include a set operations module 1903, a geometry module 1905, a generation module 1907, an image generation module 1909, a filtering module 1911, a surface extraction module 1913, a morphological operations module 1915, a connectivity module 1917, a mass properties module 1919, a registration module 1921 and a light field operations module 1923. The operation of spatial processing modules 1903, 1905, 1907, 1911, 1913, 1915, 1917, 1919 are generally known and those skilled in the art understand that they may be implemented in many ways. This includes software and hardware.

In some example embodiments, media in a scene are represented using octrees. A basic implementation is described in U.S. Pat. No. 4,694,404 (see e.g., including FIGS. 1a, 1b, 1c and 2), which is hereby incorporated in its entirety. Each node in an octree can have any number of associated property values. A storage method is presented in U.S. Pat. No. 4,694,404 (e.g., including FIG. 17). It will be understood by those skilled in the art that equivalent representations and storage formats can be used.

Nodes can be added to an octree at the bottom, including during a processing operation, to increase resolution and at the top to increase the size of the represented scene. Separate octrees may be combined to represent larger datasets using the UNION Boolean set operation. Thus, a set of spatial information that can be handled as a group (e.g., 3D information from one scan or set of scans) can be represented in a single octree and processed as part of a combined set of octrees. Changes can be independently applied to individual octrees (e.g., fine-tuning alignment as processing progresses) in a larger set of octrees. One skilled in the art understands that they can be combined in multiple ways.

Octrees can also be used as masks to remove some part of another octree or set of octrees using INTERSECT or SUBTRACT Boolean set operations or other operations. A half-space octree (all space on one side of a plane) can be geometrically defined and generated as needed to remove, for example, half of a sphere such as the hemisphere on the negative side of a surface normal vector at a point on a surface. The original dataset is not modified.

Images are represented in example embodiments in any one of two ways. They can be a conventional array of pixels or a quadtree as described in U.S. Pat. No. 4,694,404 (e.g., including FIGS. 3a and 3b). One skilled in the art will understand that there are equivalent alternative representations and storage methods. A quadtree that contains all nodes down to a particular level (and none below) is also called a pyramid.

Example embodiments represent the light exitant from a light source, the passage of light through space, the light incident on media, the interaction of light with media including the light reflected from a surface, and the light exitant from a surface or media. A "solid-angle octree" or SAO is used for this in some example embodiments. In its basic form a SAO uses an octree representing a hollow sphere to model the directions that radiate outward from the center of the sphere which is also the center of the SAO's octree universe. The SAO represents the light entering or exiting the point. It may, in turn, represent the light entering or exiting a surrounding region. While this center may coincide with a point in another dataset (e.g., a point in a volumetric region of space such as the center of an octree node), their coordinate systems are not necessarily aligned.

Figure 21:
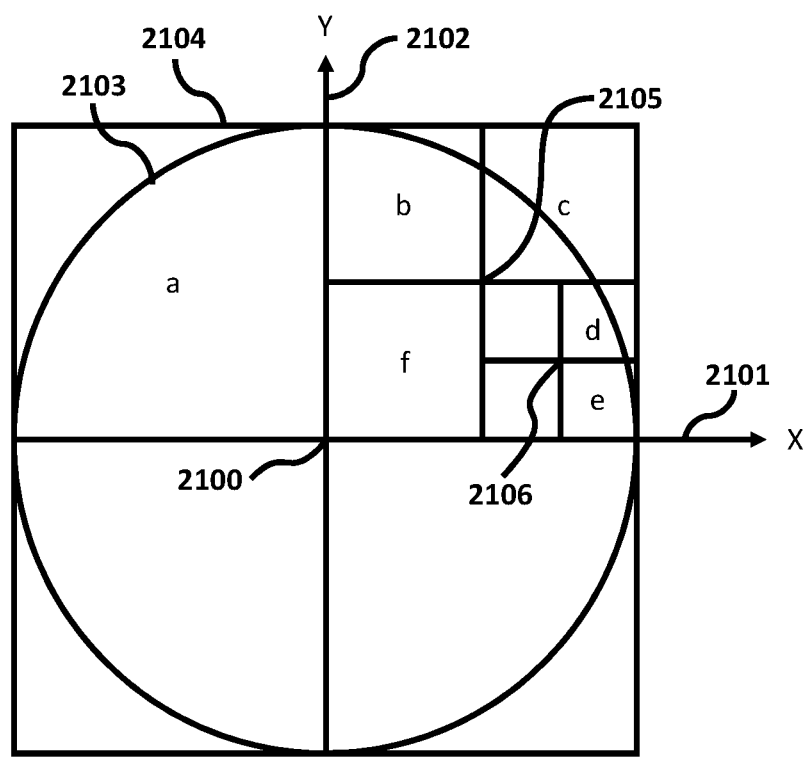
FIG. 21 is a geometric diagram that shows a solid-angle octree (SAO) (in 2D), according to some example embodiments.

Solid-angles are represented by nodes in an octree that intersect the surface of a sphere centered on the center point. Here intersection can be defined in multiple ways. Without loss of generality, the sphere will be considered to have a unit radius. This is illustrated in FIG. 21, shown in 2D. Point 2100 is the center, vector 2101 is the X axis of the SAO and 2102 is the Y axis (the Z axis is not shown). Circle 2103 is the 2D equivalent of the unit sphere. The root node of the SAO is square 2104 (cube in 3D). The SAO universe is divided into four quadrants (8 octants in 3D), node a and its three siblings in the diagram (or 7 for a total of 8 in 3D). Point 2105 is the center of a node at this level. They are, in turn, subdivided into child nodes at the next level (nodes b, c and f are examples). Point 2106 is a node center at this level of subdivision. Subdivision continues to whatever level needed as long as the node intersects the circle (sphere in 3D). Nodes a through e (and others) intersect the circle (sphere in 3D) and are P (Partial) nodes. Non-intersecting nodes, such as f, are E (Empty) nodes.

Nodes intersecting the circle for which light passes through both it and the center point (or, in some formulations, a region around the point) remain P nodes and are given a set of properties characterizing that light. Nodes without intersecting light (or not of interest for some other reason) are set to E. SAOs can be built from the bottom up from, for example, sampled information (e.g., images) or generated from the top down from some mathematical model or built as needed (e.g., from a projected quadtree).

While there may be terminal F (Full) nodes, operations in the invention typically operate on P nodes, creating them and deleting them as needed. The lower-level nodes contain solid angles represented to a higher resolution. Often some measure of the differences of the property values contained in the child nodes will be stored in the parent node (e.g., min and max, average, variance). In this way the immediate needs of the operating algorithm can decide on-the-fly if it is necessary to access and process the child nodes. In some cases, lower level nodes in octrees, SAOs and quadtrees are generated on-the-fly during processing. This can be used to support adaptive processing where future operations depend on the results of previous operations when performing some task. In some cases accessing or generating new information such as the lower levels of such structures for higher resolution would be time consuming or performed by a different process, perhaps remotely such as in the Cloud. In such cases the operating process may generate a request message for the new information to be accessed or generated for a later processing operation while the current operation uses the available information. Such requests may have a priority. Such requests are then analyzed and, on a priority basis, they are communicated to the appropriate processing units.

Individual rays can be represented in example embodiments. For example, the nodes that intersect the unit sphere may contain a property with a high-precision point or list of points on the sphere. They can be used to determine children containing ray intersections when lower-level nodes are created, perhaps on-the-fly, to whatever resolution is needed.

Starting with the octants of a SAO, the status of a node (does it intersect a unit sphere) can be determined by calculating the distance (d) from the origin to the near and far corners of the node. There will be 8 different pairs of near/far corners in the 8 octants of the universe. The value $d2=dx^2+dy^2+dz^2$ can be used since the sphere has a unit radius. In one formulation, if the value for the near corner is <1 and for the far corner is ≥1, the node intersects the unit sphere. If it does not intersect the sphere, it is an E node. Another method is to compute the d2 value for the center of the node and then to compare it to minimum and maximum radius2 values. Because the distance increments for a PUSH operation are powers of two, the $dx^2$, $dy^2$ and $dz^2$ values can be efficiently computed with shift and add operations (explained below with FIG. 25A).

Figure 22:
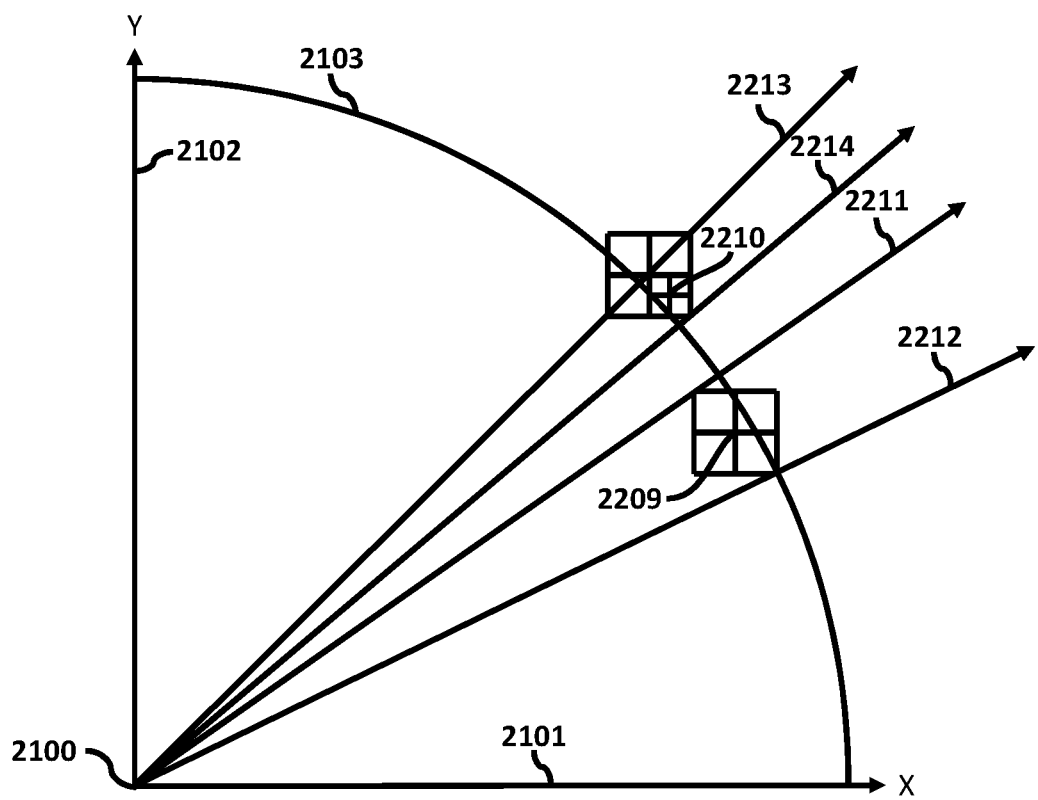
FIG. 22 is a geometric diagram that shows solid-angle octree subdivision along an arc, according to some example embodiments.

In the preferred embodiment, a more complex formula is used to select P nodes for a better node distribution (e.g., more equal surface area on unit sphere). The density of nodes can also be decreased to reduce or prevent overlap. For example, they could be constructed so there is only one node in a solid angle at a level. In addition, exactly four child nodes could be used, simplifying the distribution of illumination by dividing by 4, in some methods. Depending on the arrangement of nodes, gaps may be allowed between non-E nodes containing illumination samples and, perhaps, other properties. SAOs can be pre-generated and stored as templates. One skilled in the art will understand that a plethora of other methods can be employed. (FIG. 22 shows a 2D example of a SAO with light rays.)

In the set operations processing module 1903 octrees and quadtrees are combined using the Boolean set operations of UNION, INTERSECTION, DIFFERENCE (or SUBTRACTION) and NEGATION. The handling of property information is specified in such operations by the calling function.

In geometry processing module 1905 geometric transformations are performed on octrees and quadtrees (e.g., rotation, translation, scaling, skewing).

Octrees and quadtrees are generated from other forms of geometric representations in generation processing module 1907. It implements a mechanism to determine the status of a node (E, P or F) in the original 3D representation. This can be performed at one time to create an octree or incrementally as needed.

Figure 36A:
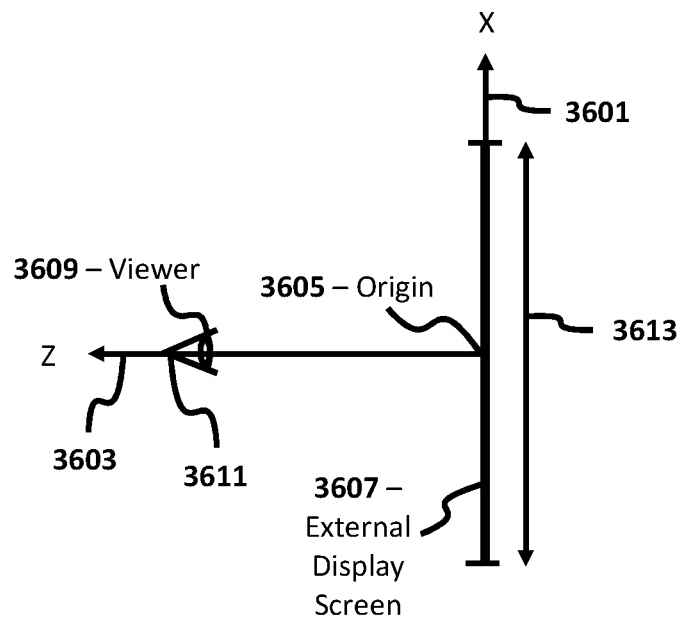
FIG. 36A is a geometric diagram that shows an external view of a coordinate system of a display (a device that stimulates human senses to create notions of entities such as objects and scenes), according to some example embodiments.

The image generation processing module 1909 computes images of octrees, either as conventional arrays of pixels or as quadtrees. FIG. 36A shows the geometry of image generation in 2D. The display coordinate system is X axis 3601 and Z axis 3603 meeting at the origin point 3605. The Y axis is not shown. External display screen 3607 is on the X axis (plane formed by the X and Y axes in 3D). Viewer 3609 is located on the Z axis with viewpoint 3611. The size of external display screen 3607 in X is length 3613, measured in pixels, and can be of any size.

Figure 36B:
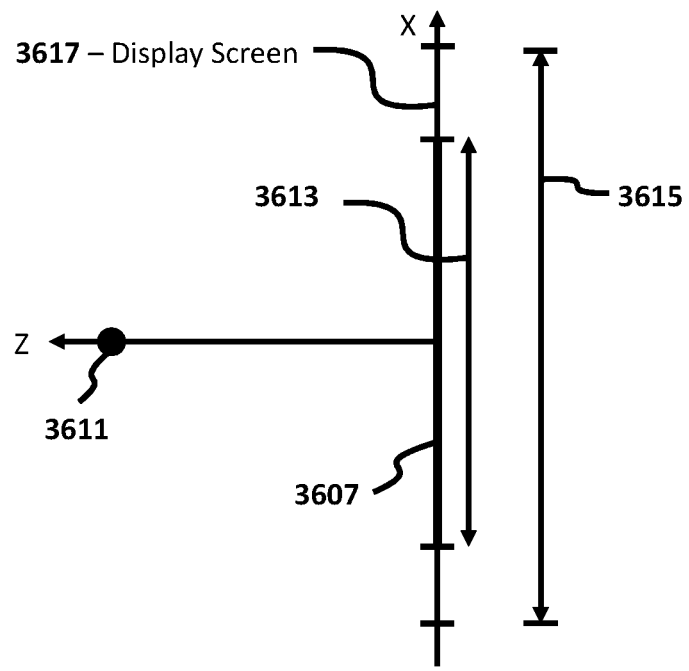
FIG. 36B is a geometric diagram that shows an internal view of a display coordinate system, according to some example embodiments.

FIG. 36B shows an internal view of the geometry where the size, in X, of the external display screen 3613 has been increased to the next larger power of 2 to define display screen 3617, used internally, with size 3615. For example, if external display screen 3607 has width 3613 of 1000 pixels, display screen 3617 will have size 3615 of 1024. Someone normally skilled in the art could utilize an alternative method to represent the geometry.

Figure 36C:
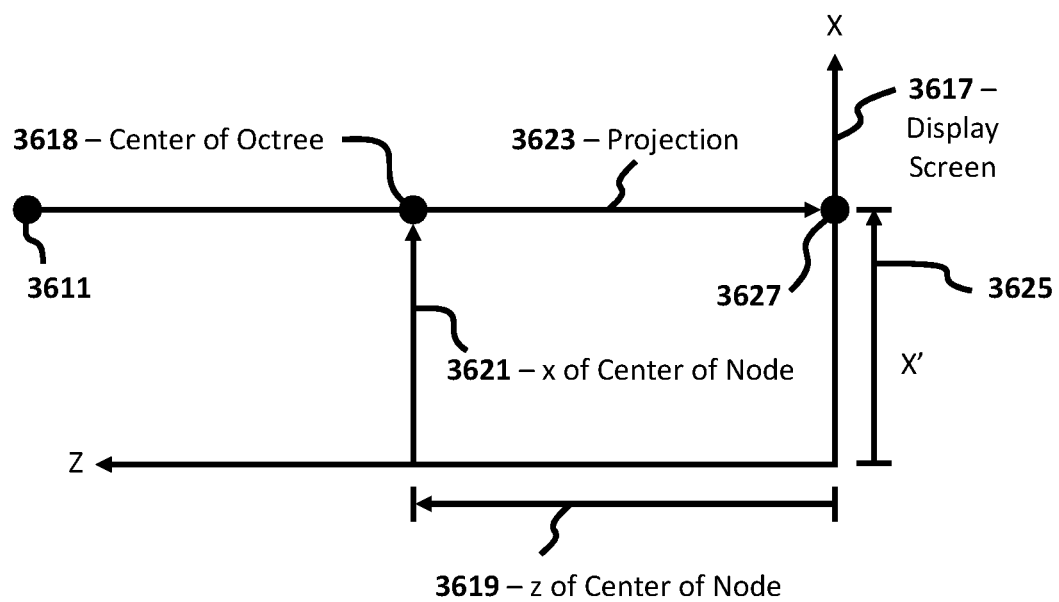
FIG. 36C is a geometric diagram that shows an orthographic view in a display coordinate system, according to some example embodiments.

FIG. 36C shows orthographic projection 3623 of octree node center 3618 onto display screen 3617 from viewpoint 3611. Node center 3618 has x value 3621 and z value 3619 and it projects on to point 3627 on display screen 3617 with a value on the X axis of x' 3625. Since projection 3623 is orthographic, the value of x' 3625 is equal to x 3621.

Figure 37:
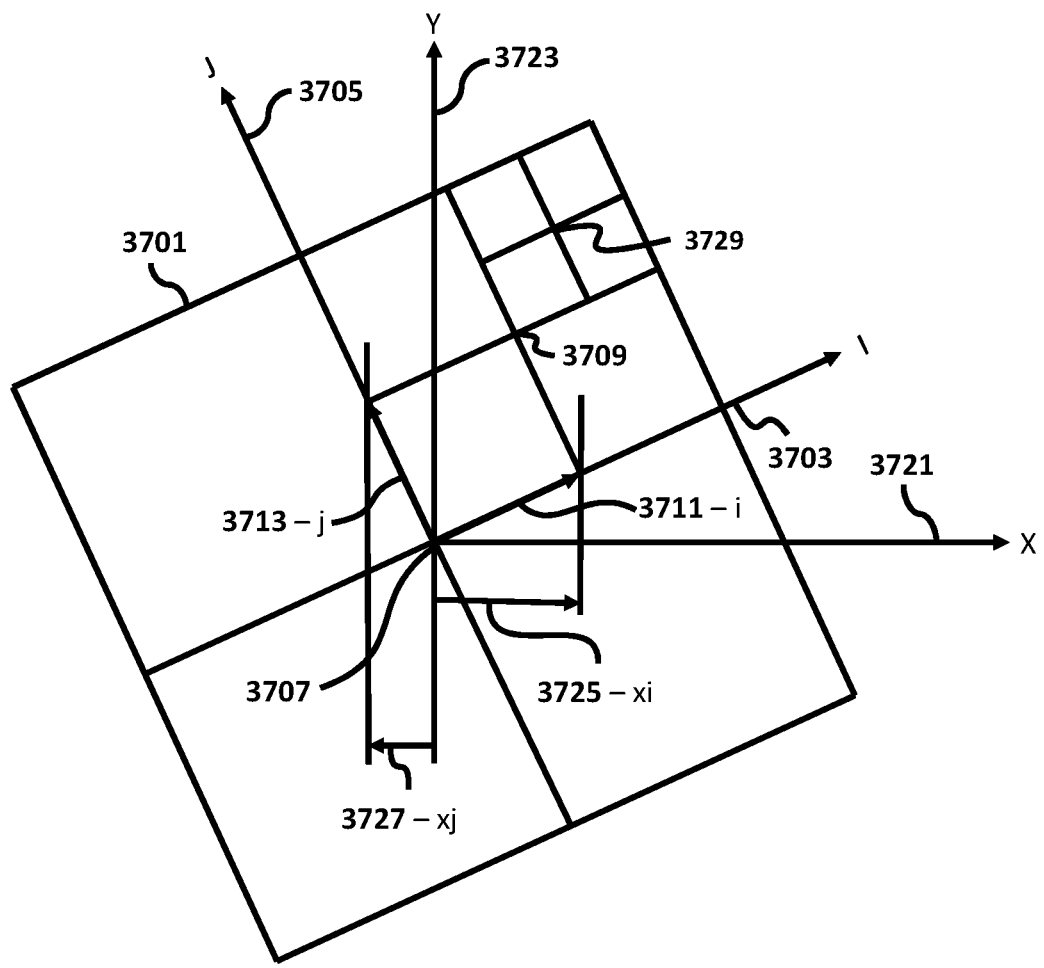
FIG. 37 is a geometric diagram that shows a geometric movement of the node center from a parent node to a child node in the X direction, according to some example embodiments.

FIG. 37 shows the geometry of octree node centers in 2D and how a geometric transformation is performed to, for example, compute node center x value 3709 from the node center of its parent node, node center 3707. This is shown for a general rotation in the X-Y plane where axis 3721 is the X axis and axis 3723 is the Y axis. This mechanism is used for general 3D rotation for image generation where the node center x and y coordinates are projected on to the display screen and the z value may be used as a measure of the depth from the viewer in the direction of the screen. In addition to display, it is used in 3D for general geometric transformations. The parent node 3701 with its center at node center point 3707, is subdivided to its 4 children (8 in 3D), typically as a result of a PUSH operation to one of the children. The coordinate system of the octree containing node 3701 is the I-J-K coordinate system to distinguish it from the X-Y-Z coordinate system. The K axis is not shown. The I direction is I axis 3703 and the J direction is J axis 3705. The move from node center 3707 to the node centers of its children is a combination of movements by two vectors (three in 3D) in the directions of the axes in the octree's coordinate system. In this case the vectors are i vector 3711 in the I direction and j vector 3713 in the J direction. In 3D, a third vector k would be used in the K direction but it is not shown here. Moving to one of the four children (8 in 3D) involves adding or subtracting each of the vectors. In 3D the selection of addition or subtraction is determined by the three bits of the three-bit child number. For example, a 1 bit could indicate an addition for the associated i, j or k vector and a 0 bit indicate a subtraction. As shown, the move is in the positive direction for both i and j, moving to the child node with a node center at 3709.

The geometric operation shown is a rotation of the node center in the octree's I-J coordinate system into a rotated X-Y coordinate system with X axis 3721 and Y axis 3723. To accomplish this, the distances from the parent node center to the child node centers in the X and Y coordinate system (and Z in 3D) are precomputed for the vectors i and j (and k in 3D). For the case shown, the movement in the X direction for the i vector 3711 is distance xi 3725. For the j vector the distance is xj distance 3727. In this case xi is a positive distance and xj is in the negative direction. To compute the x value of child node center 3709, the values or xi and xj are added to the x value of parent node center 3707. Likewise, the x movement to the centers of other child nodes would be the various combinations of addition and subtraction of xi and xj (and xk in 3D). Similar values are computed for the distances from the parent node center in the Y (and Z in 3D) directions, providing for a general 3D rotation. Operations such as the geometric operations of translation and scaling can be implemented in a similar way by one normally skilled in the art.

Of importance, the length of i vector 3711 used to move in X, from parent node center 3707 to child node center 3709 is exactly double that of the vector in the I direction used to move to children in the next level of subdivision such as node center 3729. This is true for all levels of subdivision and is true for the j vector 3713 (and k vector in 3D) and for Y and Z. The difference values xi 3725, xj 3727 and the other values can thus be computed once for the universe of the octree for a particular geometric operation and then divided by 2 for each additional subdivision (e.g., PUSH). Then, on a POP, the center can be restored by multiplying the difference by 2, and reversing the addition or subtraction, when returning to the patent node. Thus the values can be, for example, entered into a shift register and shifted right or left as needed. These operations can be accomplished in other ways such as precomputing the shifted values, precomputing the 8 different sums for the 8 children and using a single adder per dimension, and using stacks to restore values after a POP.

Figure 38:
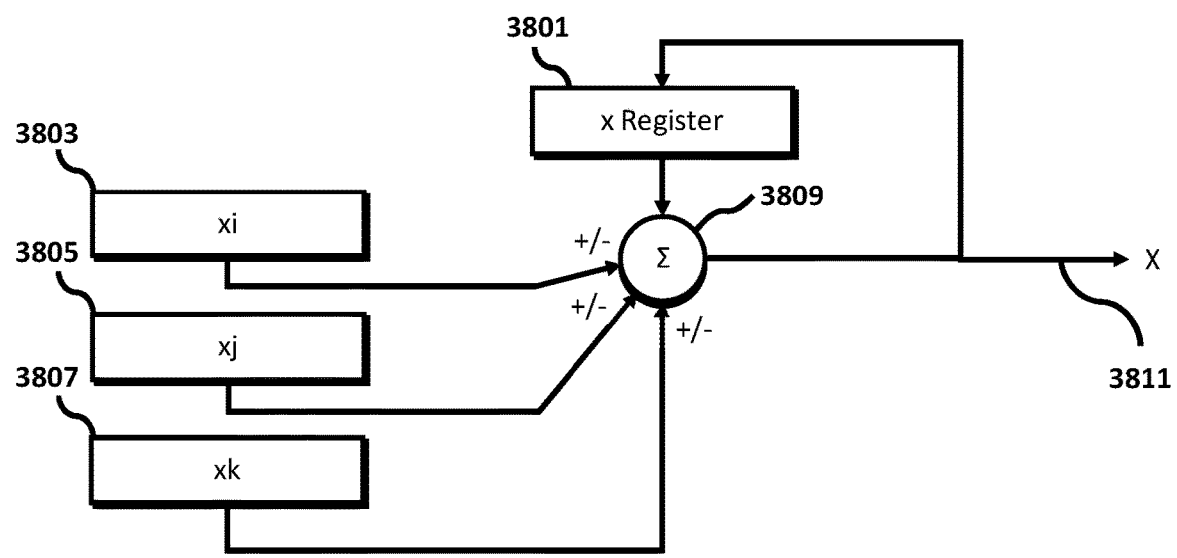
FIG. 38 is a schematic diagram that shows an implementation of a geometric transformation of an octree in the X dimension, according to some example embodiments.

This is illustrated in FIG. 38 where registers are used to compute the x value of node centers as a result of octree node subdivisions. Similar implementations are used for y and z. The starting x position of the center of the node is loaded into x register 3801. This could be the octree universe or any starting node. The xi value is loaded into shift register xi 3803. Likewise, xj is loaded into shift register xj 3805 and, in 3D, xk is loaded into shift register xk 3807. On a move to a child node such as with a PUSH, the value in the x register 3801 is modified by adding or subtracting the values in the three shift registers with adder 3809. The combination of addition or subtraction for the three registers appropriately corresponds to the three bits of the child number. The new value is loaded back into x register 3801 and is available as the transformed output x value 3811. To return to the parent value such as with a POP operation the add and subtract operations can be undone. Of course, enough space must be allocated on the right side of each shift register to prevent the loss of precision. The child node sequence used in the subdivide operations must, of course, be saved. As an alternative, the x value can be saved in a stack or another mechanism can be used.

Figure 39:
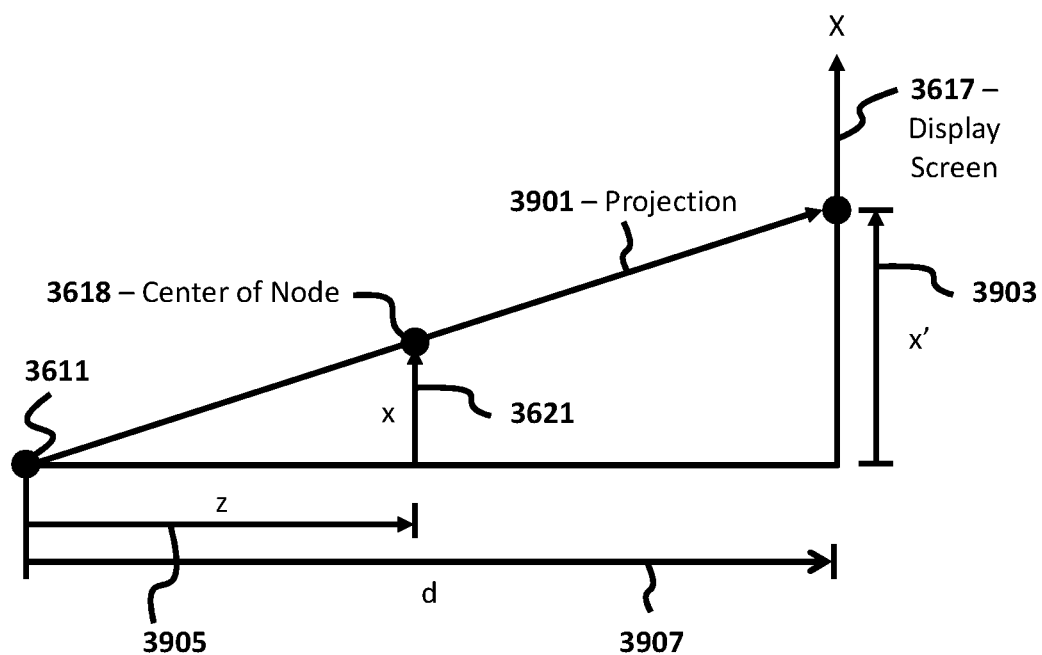
FIG. 39 is a geometric diagram that shows a perspective projection of an octree node center on to a display screen, according to some example embodiments.

Extending this to a perspective projection is shown in FIG. 39. The node center 3618 is now projected along projection vector 3901 to display screen 3617 to the point on the display screen with X value x' 3903. The value of x' will not, in general, be equal to x value 3621. It will be a function of the distance from viewpoint 3611 to the display screen in the Z direction, distance d 3907 and from the viewpoint to the node center 3618 in the Z direction, distance z 3905. The value of x' can be computed using similar triangles as follows.

$$x'/d = x/z \text{ or } x' = xd/z \quad [\text{Eq. 9}]$$

This requires a general purpose divide operation which requires considerably more hardware and clock cycles than simpler mathematical operations such as integer shifts and additions. It is thus desirable to recast the perspective projection operation into a form that can be implemented with simple arithmetic.

Figure 40A:
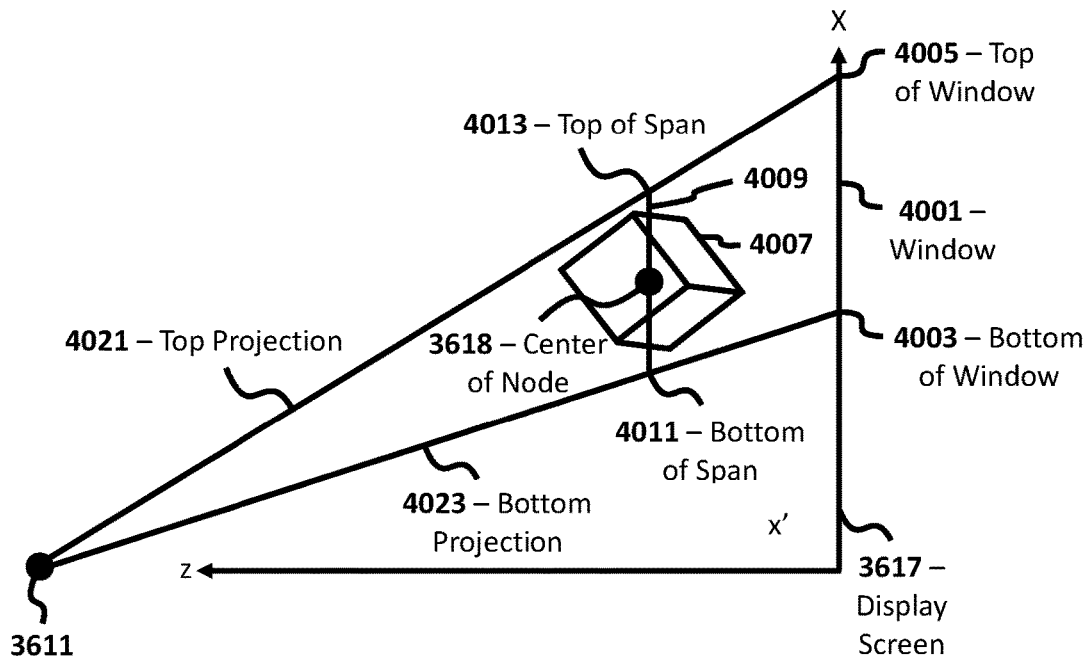
FIG. 40A is a geometric diagram that shows a span and a window in a perspective projection, according to some example embodiments.

As shown in FIG. 40A, the invention uses a "span" to perform the perspective projection. On display screen 3617, window 4001 is defined. It extends from the X value at bottom of window 4003 to the X value at top of window 4005. As noted above, the size of display screen 3617, in pixels, is a power of two. Window 4001 starts out as the entire screen and thus starts as a power of two. It is then subdivided into one-half-sized sub-windows as needed to enclose the node projection. Every window thus has a size that is a power of two. Window 4001 is shown in 2D but, in 3D is a 2D window of display screen 3617 where the window size in each dimension, X and Y, is a power of 2. For display, the window size can be the same in X and Y. In other uses they could be maintained independently.

Ray 4021 is from viewpoint 3611 to top of window 4005. In 3D this is a plane that extends into the Y direction forming the top edge of the window in the X-Y plane. Ray 4023 is from the viewpoint to the bottom of window 4003. The line segment in the X direction that intersects node center 3618 and is between the intersection point bottom of span 4011 with ray 4023 and intersection point top of span 4013 with ray 4021 is span 4009.

If the span is translated in the z direction by a specified amount, span 4009 will increase or decrease by an amount that only depends on the slopes of top projection ray 4021 and bottom projection ray 4023, not the z location of the node center 3618 of node 4007. In other words, the size of the span will change by the same amount for the same step in z no matter where it occurs in Z. Thus, as a step is made from a parent node, the change in the span will be the same wherever the node is located. If the child node is then subdivided again, the change in the span will be half that from the parent to the child.

Figure 40B:
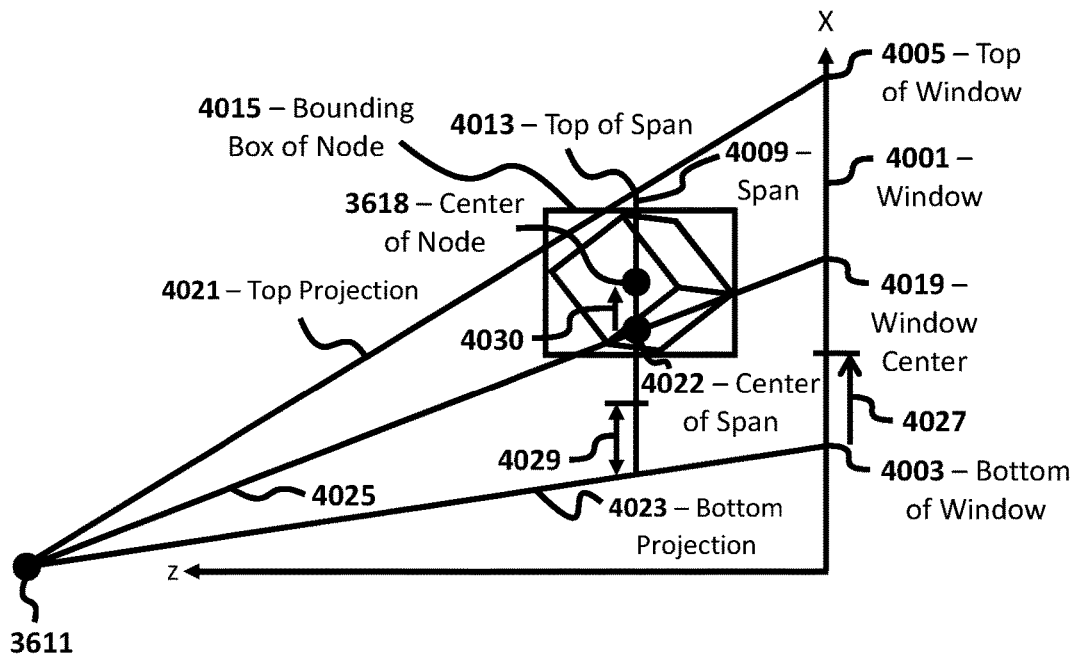
FIG. 40B is a geometric perspective diagram that shows the origin ray and center of span, according to some example embodiments.

FIG. 40B extends the concept with window center ray 4025 from viewpoint 3611 to the center of window 4001, window center 4019 which divides window 4001 into two equal parts. Likewise, the point that divides the span into two equal parts is center of span 4022. This is used as the reference point to determine the X value of the center of node 3618 which is offset from center of span 4022 by node center offset 4030. Thus, knowing the location of the point center of span 4022 and node center offset 4030 gives the location in X of the node center.

As noted above for the size, in X, of the span as it is translated in the z direction, the center of span 4022 can be likewise determined by a step in Z, regardless of the location in Z. Combined with the changes in X, Y and Z when moving from the center of a parent node to the center of a child as shown in FIG. 37, the change in the size, in X, of the span can be computed for each subdivide. Likewise, the center of span 4022 can be recomputed for an octree subdivision by adding the difference, regardless of the location in Z. Knowing the center of span 4022 and the center movement in X after a subdivision gives the new location of the center of the child, relative to the center ray 4025, with just an addition or subtraction operation. In a similar fashion, the intersection of bounding box of node 4015 with the span can also be computed with an addition because it is a fixed distance in X from the node center 3618.

Since, as seen above, the offsets added or subtracted to move from a parent center point to a child center point divides by two after each subdivision. Thus, the location of the center of span 4022, the center of node 3618 and the top and bottom X locations of the bounding box can be computed for PUSHes and POPs with shift and add operations. Two measures that are routinely used in the calculations below are a quarter of the size of the span or QSPAN 4029 and a quarter of the window or QWIN 4027

Figure 40C:
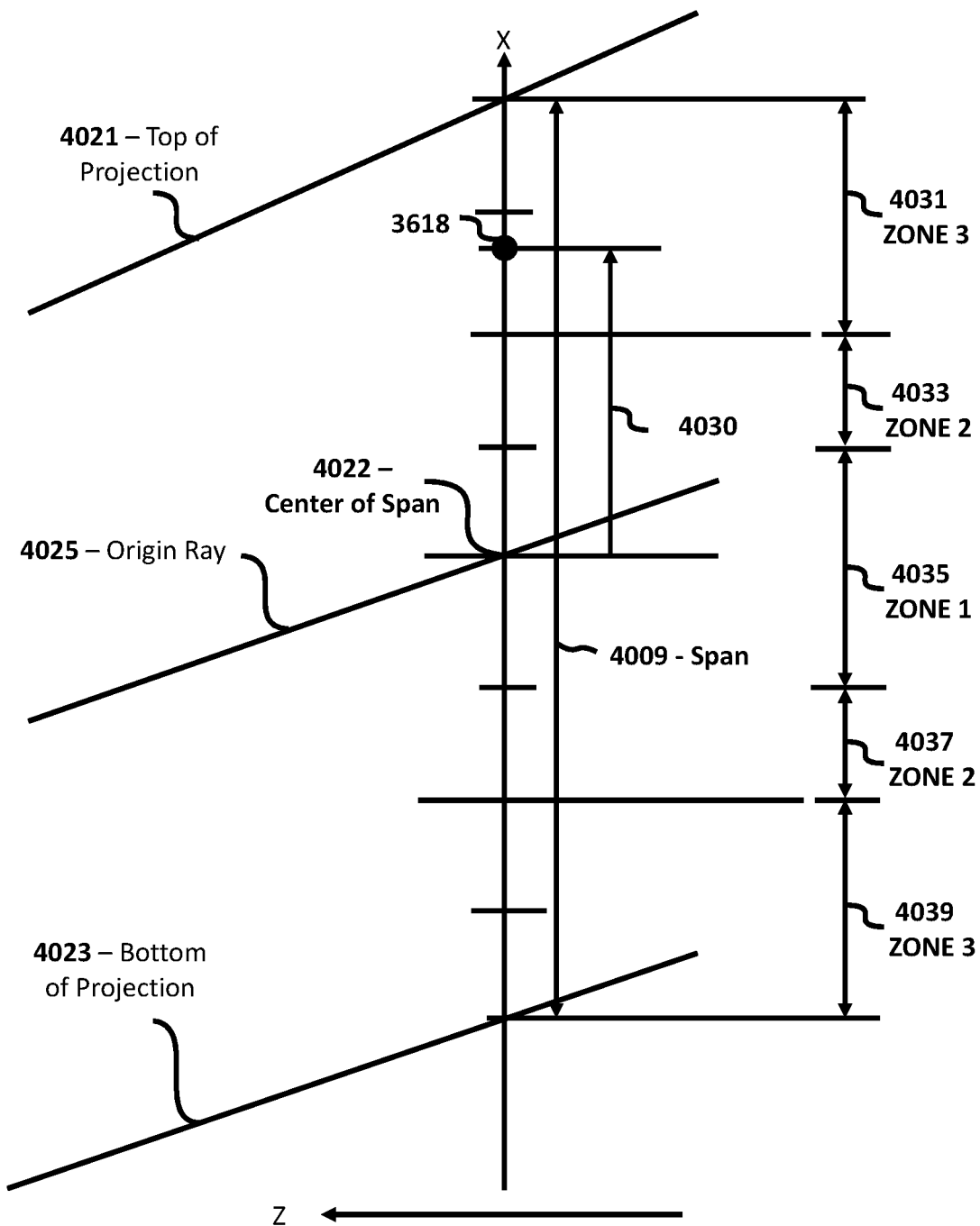
FIG. 40C is a geometric diagram that shows the span zones when subdividing a node.

The perspective projection process operates by traversing the octree with PUSH and POP operations and simultaneously determining the position of the center of the current node, on the span, relative to the center of span 4022. Together with the limits of its bounding box on the span, the window is subdivided and the center ray moved up or down as needed to keep the node within the window. The process of subdividing a span is illustrated in FIG. 40C. The origin ray 4025 intersects the span with extent 4009 at center of span 4022. The span goes through the node center 3618 and intersects the top of projection ray 4021 at the top of the span and intersects the bottom of projection ray 4023 at the bottom. If, on a PUSH to a child, the span needs to be subdivided, a new origin ray 4025 and center of span 4022 may be needed. There are three choices for the new origin ray 4025. First it could stay the same. Second, it could move up to the middle of the upper half of the original span. Or third, it could move down to the center of the lower half of the original span.

To determine the new span and the new center, zones are defined. The zone where the node center 3618 will reside after the PUSH determines the movement of the origin ray. As shown, ZONE 1 4035 is centered on the current span center. Then there are two up and two down zones. ZONE 2 4033, in the up direction, is the next step in the positive X direction. ZONE 3 4031, in the up direction is above that Similar zones, ZONE 2 4037 and ZONE 3 4039, are defined in the negative X direction.

The location of the new node center is known from the newly-computed X node offset, in this case, distance NODE_A 4030. Two comparisons are performed to determine the zone. If the new node value, NODE_A, is positive, the movement, if any, is in the positive X direction and the value of QSPAN is subtracted from it. If NODE A is negative, the movement, if any, is in the negative X direction and the value of QSPAN is subtracted from it. The result is called NODE_B. There are, of course, two sets of values in 3D, one for the X direction and one for the Y direction.

To determine the zone, only the sign of NODE_B is needed. It is actually not necessary to perform the addition or subtraction. A magnitude comparison would be sufficient. In this embodiment it is computed because NODE_B becomes the next NODE value in some cases.

The second comparison is between NODE_A and one eighth of the span (QSPAN/2). It is compared to QSPAN/2 if NODE_A is positive and −QSPAN/2 if negative. The results are as follows:

| NODE_A | NODE_B | NODE_A:QSPAN/2 | Resulting Zone |
| --- | --- | --- | --- |
| ≥0 | ≥0 | (any) | ZONE = 3 |
| ≥0 | <0 | NODE_A ≥ QSPAN_N/2 | ZONE = 2 |
| ≥0 | <0 | NODE_A < QSPAN_N/2 | ZONE = 1 |
| <0 | <0 | (any) | ZONE = 3 |
| <0 | ≥0 | NODE_A ≥ −QSPAN_N/2 | ZONE = 1 |
| <0 | >0 | NODE_A < −QSPAN_N/2 | ZONE = 2 |

Figure 40D:
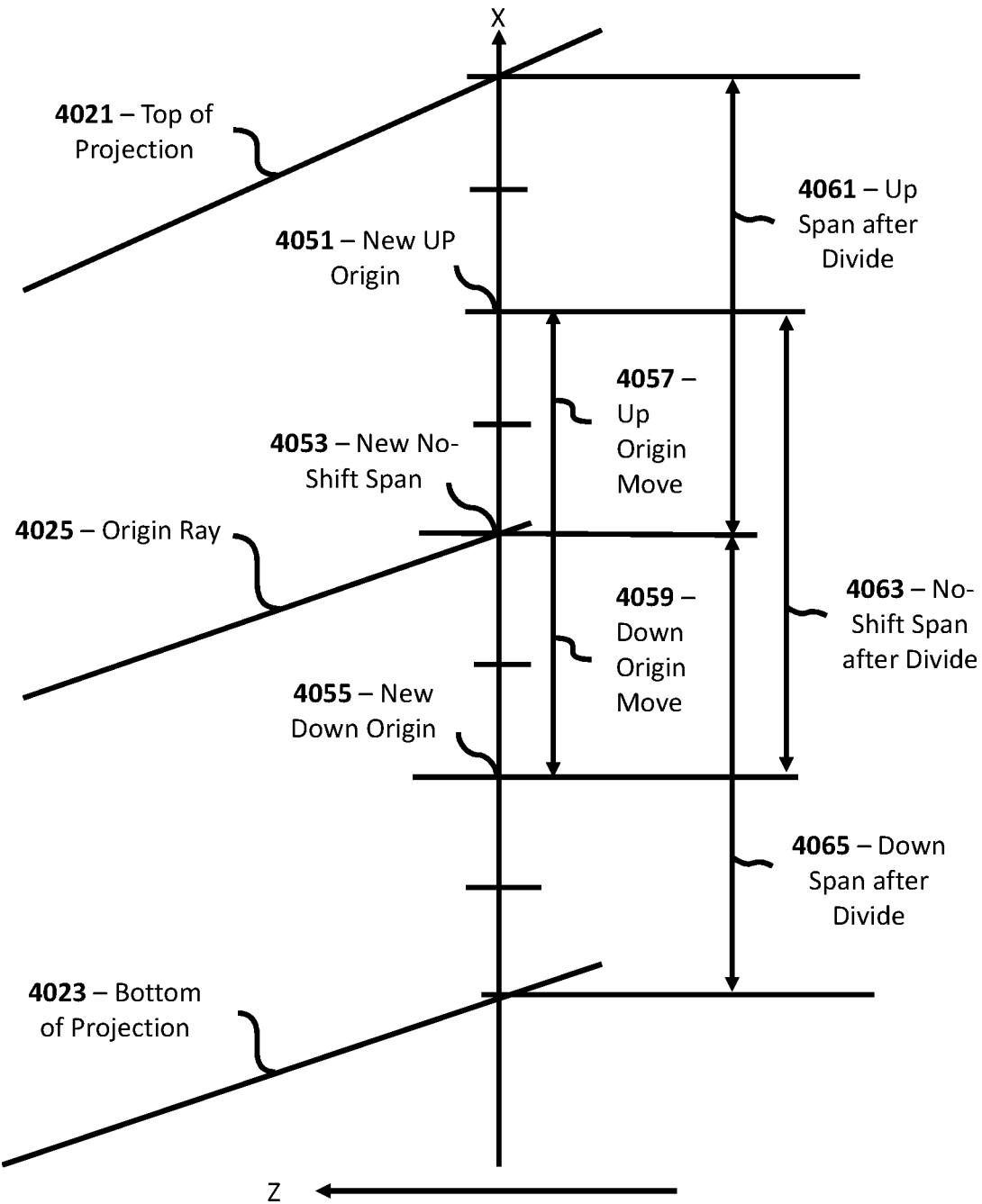
FIG. 40D is a geometric diagram that shows the spans and origins after subdividing a node.

A node center beyond the span will result in a zone 3 situation. The results of the span subdivision are illustrated in FIG. 40D. The origin can be moved up 4057 to new up origin 4051 by subtracting QSPAN_N from NODE_A or moved down 4059 to new down origin 4055 by adding QSPAN_N to NODE_A. Independent of this, the span can be divided into a half-size span resulting in one of the three new spans, up span after divide 4061, no-shift span after divide 4063 to new no-shift center 4053 or down span after divide 4065. The following actions are performed based on the zone:

| CASE | SHIFT | DIVIDE |
| --- | --- | --- |
| ZONE = 1 | NO | YES |
| ZONE = 2 | YES | YES |
| ZONE = 3 | YES | NO |

Thus, for the zone=3 situation a centering operation is performed without dividing the upper and lower half-spans. For zone=2, a divide is performed and the resulting span and window are re-centered. For zone=0, the span (or window) are divided but no centering is necessary.

There are a few additional factors that control the subdivision and centering process.

First, a quarter of the distance of the edge of the bounding box, in X, from the node center is maintained. This is called QNODE. It is a single number (in X) because the node center is always the center of the bounding box. Separate positive and negative offsets are not needed. This is compared to some fraction of QSPAN_N (usually one-half or one-quarter). If QNODE is larger than this, the bounding box is considered to already be large relative to the span (in that dimension). The span subdivision is not performed (the NO_DIVIDE situation). For a display window subdivision, no centering is performed if the window would move beyond the display screen (the NO_SHIFT situation).

Sometimes additional divide and/or centering operations are needed for a PUSH. This is called a repeat cycle. It is triggered after a zone 3 situation (centering only) or when the span is large relative to the bounding box (QSPAN_N/ 8>QNODE). Another comparison inhibits repeat cycles if the window becomes too small (e.g., less than a pixel for a display window).

The subdivision process may continue until, in the case of image generation, the window is a pixel or some level in a quadtree. At this point the property values in the octree node will be used to determine the action to be taken (e.g., write a value into the pixel). If, on the other hand, a terminal octree node is encountered first, its property values could be used to write a value into the window. This could involve writing into the pixels that make up the window or nodes at the appropriate levels in a quadtree. As an alternative, a "full-node push" or FNP could be initiated in which the terminal node is used to create new children at the next level down with the appropriate properties inherited from its parent. In this way the subdivision process is continued to some level of subdivision of the window with perhaps property modification as the new octree nodes are generated in the FNP. Because of the geometry involved in a perspective projection, sometimes a subdivision of the octree will not cause a subdivision of the window or the window may need to be divided more than once. The appropriate subdivision will be suspended for that operation (e.g., PUSH).

Figure 41A:
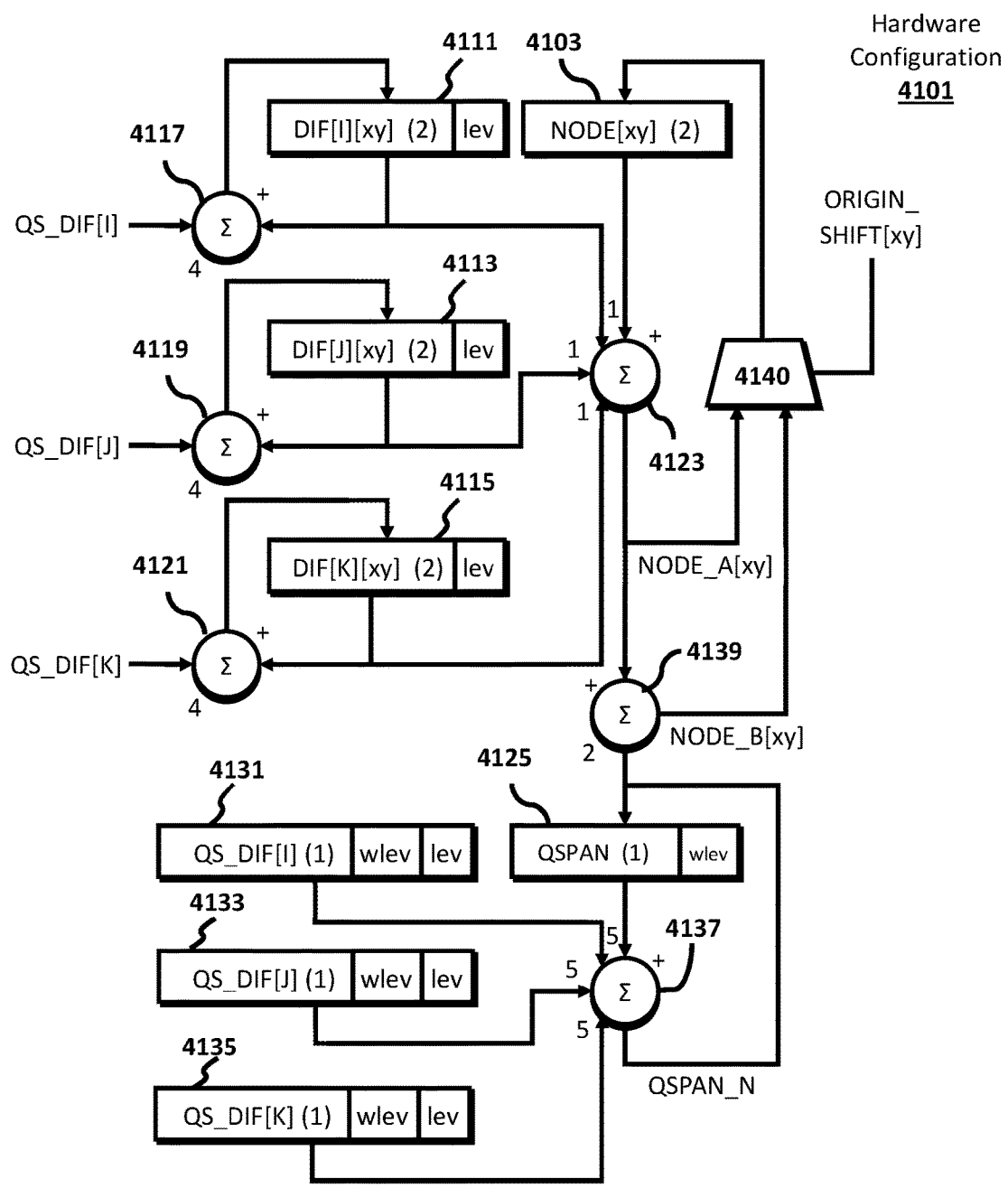
FIG. 41A is a schematic diagram that shows the computation of the span and node center values resulting from a PUSH operation, according to some example embodiments.

FIG. 41 is a schematic of an implementation for one dimension (X or Y with X shown). The values contained in the registers are shown to the left inside each register. The name may be followed by one or two items in brackets. One item in brackets may be I, J or K, indicating the dimension of the octree coordinate system of its value. The value J, for example, indicates that it holds the value for a step in the J direction from parent to child. Another may have "xy" in brackets. This indicates that there will actually be two such registers, one for the X dimension and one for the Y dimension. Items in brackets are then followed by a number in parenthesis. This indicates the number of such registers. A two indicates one for the X dimension and one for the Y dimension. A value of 1 indicates that the register may be shared by both the X and Y parts of a 3D system.

Many registers have one or two sections separated to the right. These registers are shift registers and the space is used to store the least-significant bits when the value in the register is shifted to the right. This is so the value does not lose precision after doing PUSH operations. This section may contain "lev" indicating one bit location for each of the octree levels that could be encountered (e.g., maximum level to PUSH to) or "wlev" for the number of window levels that may be encountered (e.g., number of window subdivisions to reach a pixel or the maximum number of quadtree subdivisions). Some registers require room for both. The wlev value is determined by the size of the display screen in that dimension. A 1024 pixel screen, for example, will require 10 extra bits to prevent a loss of precision.

The perspective projection process begins by transforming the universe of the octree (I, J & K) into the display coordinate system (X, Y & Z). This is the node center 3618. The values are stored in the NODE registers 4103 for X (and, in a second register, Y). The Z value uses the implementation shown in FIG. 38 and is not shown here. The vectors from the node center of the octree universe, or the starting node, to a child in the coordinate system of the octree is i, j and k. The differences in X, Y and Z from a step in i, j and k are computed for the first step, according to the method outlined in FIG. 37, and placed in the DIF registers 4111, 4113 and 4115. Note that, in isolation, these three registers and adder 4123 could be used to update the NODE register 4103 upon a PUSH in an orthographic projection, as shown in FIG. 38. The additional set of adders 4117, 4119 and 4121 will compensate for the perspective projection.

The initial span value 4009 is computed at the node center for the starting node. A quarter of this value, qspan 4029, is placed in the QSPAN ("quarter span") register 4125. The difference in the length of the span for the initial steps of the i, j and k vectors are computed for the starting node to its children. A quarter of these difference values are placed into the QS_DIF ("quarter span difference") registers 4131, 4133 and 4135. Similar to FIG. 38, the QS-DIF registers can be used with adder 4137 to update the QSPAN register on a PUSH. The QS_DIF values are also added or subtracted to the associated DIF values using adders 4117, 4119 and 4121 to account for the changes in the location where the span intersects center ray 4025 with octree PUSH movements in the i, j and k directions.

When the window is subdivided and the new window is one-half the size of the original, the center ray 4025 may remain the same, with the half-windows above and below reduced in size by half. Or, the center ray may be moved to the center of the upper half or the center of the lower half. This is accounted for by selector 4140. If the origin ray is not changed, the existing center ray is retained, NODE_A. If it is shifted, the old center ray 4025 is moved by adding the new QSPAN value, QSPAN_N, with adder 4139 forming NODE_B.

Figure 41B:
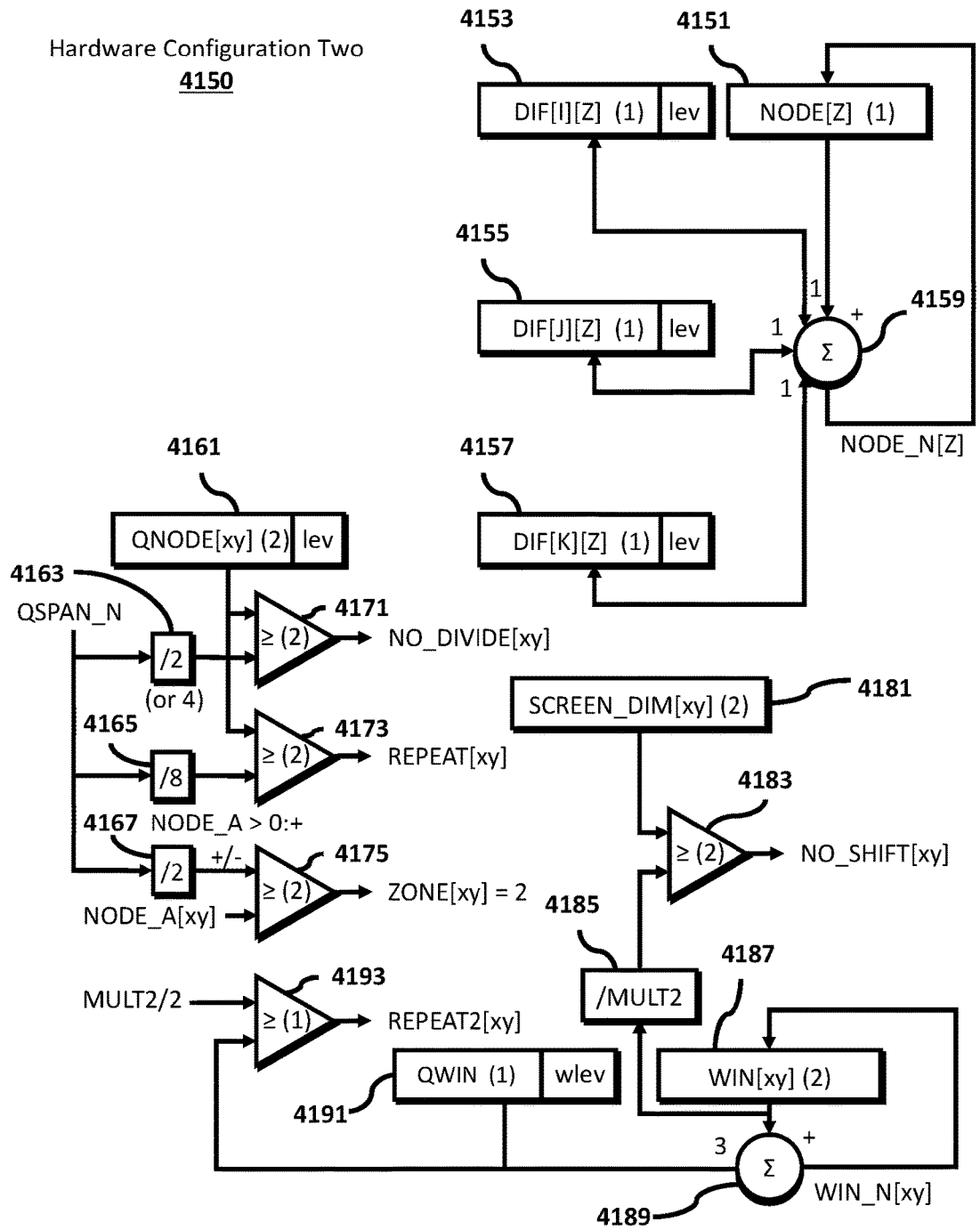
FIG. 41B is a continuation of FIG. 41A.

The configuration is continued in FIG. 41B, hardware configuration two 4150. The node center offset 4030 from the center of span 4022, value NODE, is computed and loaded into register 4151. The difference values to move from a parent node center to a child in Z are computed and loaded into shift registers 4153, 4155 and 4157. They are used with adder 4159 to compute the next value of NODE, NODE_N for Z.

The QNODE values are computed and placed in shift register QNODE 4161. It is a fixed value that is divided by two on every PUSH (shifted to the right one place). It is compared to one-half of QSPAN_N using one-bit shifter 4163 and comparator 4171 to determine if no divide should occur (NO_DIVIDE signal). It is also compared to one-eighth of QSPAN_N using 3-bit shifter 4165 and compared using comparator 4173 to determine if the divide should be repeated (REPEAT signal). Shifter 4167 is used to divide QSPAN_N by two and comparator 4175 is used to compare it to NODE_A. As shown, if NODE_A is >0, the positive value of QSPAN_N is used. Otherwise its sign is reversed. The output sets the Zone=2 signal.

For a display situation, the situation is much simpler because it does not move in the Z direction. The location on the screen of the center of the window is initialized in WIN register 4187 (one for X and one for Y). The quarter of the window value, QWIN, is loaded into shift register 4191. It is use with adder 4189 to maintain the window center. The diameter of the screen (in X and Y) is loaded into register 4181. This is compared to the center of the window by comparator 4183 to prevent a shift of the center beyond the edge of the screen. This occurs when the projection of a node is off screen. The value of MULT2 is a power of 2 that is used to maintain subpixel precision in register 4187. A similar value MULT, also a power of 2, is used to maintain precision in the span geometry registers. Since the screen diameter in register 4181 is in pixels the WIN value is divided appropriately by shifter 4185 to properly scale it for comparison. The comparator 4193 is used to compare the current window size to a pixel in order to inhibit any window subdivision below a pixel or the appropriate size. Since QWIN is scaled, it must be scaled by MULT2.

The numbers next to the adders indicate the action to be taken in different situations. They are as follows:

Adder Operation 1
PUSH: if child number bit (for i, j & k) is 1, add; otherwise subtract
POP: opposite of PUSH
Otherwise (not PUSH or POP, window-only subdivision): no operation
Adder Operation 2
If NODE_A>0 subtract; otherwise add
Adder Operation 3
UP: +
DOWN: −
Otherwise (not UP or DOWN): no operation
Adder Operation 4
Center ray 4025 shifts to upper half, add
Center ray 4025 to lower half, subtract
Adder Operation 5
PUSH: if child number bit (for i, j & k) is 1, subtract; otherwise add
POP: opposite of PUSH
Otherwise (not PUSH or POP): add 0 (i, j &k)
The shift registers are to be shifted as follows:
Registers 4111, 4113, 4115
shift right at end of cycle by 1 if PUSH (into lev bits)
shift left at start of cycle by 1 if POP (from lev bits)
Register 4125
shift right at end of cycle by 1 if window divides (into wlev bits)
shift left at start of cycle by 1 if windows merge (from wlev bits)
Registers 4131, 4133 and 4135 (may shift two bits in one cycle)
shift right at end of cycle by 1 if PUSH (into wlev bits)
shift right at end of cycle by 1 if window divides (into wlev bits)
shift left at start of cycle by 1 if POP (from lev bits)
shift left at start of cycle by 1 if windows merge (from wlev)

In summary, an orthographic projection can be implemented with three registers and an adder for each of the three dimensions The geometric computation for a perspective projection can be implemented using 8 registers plus six adders for one dimension. In use, this performs the perspective transformation for two of the three dimensions (X and Y). The total for X and Y is actually 12 registers since the QSPAN and the three QS_DIF registers do not need to be duplicated. Three registers plus one adder are used for the third dimension (Z). The total for a full 3D implementation is thus 15 registers and 12 adders. Using this method, the geometric computations for an octree PUSH or POP can be performed in one clock cycle.

To generate images of multiple octrees in different locations and orientations they can be geometrically transformed into a single octree for display or the concept of a z-buffer can be extended to a quadtree-z or qz buffer where a z value is contained in each quadtree node to remove hidden parts when a front-to-back traversal cannot be enforced. One skilled in the art can devise variations of this display method.

For display, this method uses a span that moves with the center of the octree nodes during PUSH and POP operations. The display screen can be thought of as having a fixed span in that it doesn't move in Z. This makes it convenient for a display using a pixel array or a quadtree where the window sizes are fixed. For other projection uses such as those described below, a fixed display may not be needed. In some cases multiple octrees, including SAOs, are tracked simultaneously and may subdivide independently as needed to keep the current node within the span limits. In such cases, multiple spans are tracked, such as one for each octree. In some implementations multiple spans can be tracked for one octree such as for multiple children or descendants to improve the speed of operations.

Image processing operations on quadtrees and the equivalent for octrees are performed in filtering processing module 1911. Neighbor-finding can be implemented with a sequence of POPs and PUSHes or multiple paths can be tracked during a traversal to make neighbor information continuously available without backtracking.

Surface extraction processing module 1913 extracts a set of surface elements such as triangles from octree models for use when needed. Many methods are available to perform this, including the "marching cubes" algorithm.

Morphological operations processing module 1915 performs morphological operations (e.g., dilation and erosion) on octrees and quadtrees.

Connectivity processing module 1917 is used to identify those octree and quadtree nodes that spatially touch under some set of conditions (e.g., common set of properties). This can be specified to include touching at a point (corner in octree or quadtree), along an edge (octree or quadtree) or on a face (octree). This typically involves the marking of nodes in some manner starting with a "seed" node and then traversing to all connected neighbors and marking them. In other cases, all nodes are examined to separate all connected components into disjoint sets. The mass properties processing module 1919 computes the mass properties (volume, mass, center of mass, surface area, moment of inertia, etc.) of datasets.

The registration processing module 1921 is used to refine the location of 3D points in a scene as estimated from 2D locations found in multiple images. This is discussed below with FIG. 23B. The light field operations module 1923 is further described below in relation to FIG. 20.

Light that enters a voxel that contains media interacts with the media. In the invention, discrete directions are used, and the transport equation [2] becomes a summation rather than an integration and is described by the following equation:

$$L(x \rightarrow \omega) = L_e(x \rightarrow \omega) + \Sigma_X \Sigma_{\Omega'4\pi^2} f_r(x \rightarrow \omega, x' \leftarrow \omega') L(x' \leftarrow \omega')$$
$$\Delta\omega' \Delta x' \qquad \text{[Eq. 10]}$$

Figure 20:
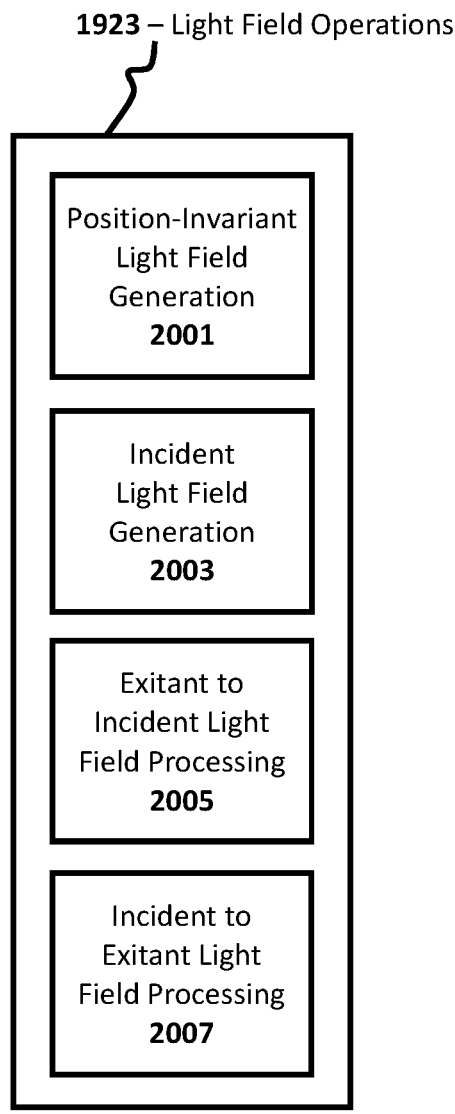
FIG. 20 is a schematic diagram that shows light field operations, according to some example embodiments.

FIG. 20 is a block diagram showing a light field operations module 1923 of an SRE, which is part of the spatial processing module 1113 of SRE 201. Light field operations module 1923 may include a position-invariant light field generation module 2001, an incident light field generation module 2003, an exitant to incident light field processing module 2005, and an incident to exitant light field processing module 2007.

The light field operations module 1923 performs operations on light in the form of SAOs and computes the interactions of light with media, from whatever source, represented as octrees. Octree nodes may contain mediels that will transmit or reflect or scatter light or modify it in some other way according to properties stored in or associated with the nodes. The SAOs represent the light incident or exitant from some region of volumetric space at a point in that space. In a scene, the light entering from the outside the scene is represented as a position-invariant SAO. A single position-invariant SAO is valid for any position in the associated workspace. While a scene may have multiple sub-workspaces, each with its own position-invariant SAO, only a single workspace will be discussed. To compute the total point light field SAO it needs to be supplemented with light from within the scene. For a specified point within the workspace, an incident lightfield is generated and then used to, in effect, overwrite a copy of the position-invariant SAO.

The incident light at a mediel that interacts with the light causes a responsive light field SAO which is added to any emissive light. The mediel's BLIF, is used to generate the responsive SAO for the mediel based on the incident SAO.

The position-invariant light field generation module 2001 generates a position-invariant SAO of incident light acquired from, for example, outward-looking images from the workspace. By definition, the objects represented by the position-invariant SAO exhibit no parallax when viewed from anywhere within the associated scene workspace. A single position-invariant SAO is thus applicable for all positions within the workspace. This is further described in relation to FIG. 28A.

Light can also enter the scene that does exhibit parallax. To represent this, a surface light field can be used. In one embodiment this light is represented by a surface lightfield composed of exitant SAO on the scene boundary or on some other appropriate surface. They are typically created as needed to represent external light.

The incident light field generation module 2003 computes a light field SAO for any point within the scene based on the media in the scene. As used here, "media" in a mediel will be anything within the space that emits or interacts with light. It may be predetermined (e.g., terrain models, surfels, CAD models) or may be "discovered" during processing. In addition, it may be refined (new media, increased resolution, higher quality, etc.) as processing operations continue.

As discussed, a position-invariant SAO is a single SAO that is a representation of the incident light at any point within its workspace. For a point light field SAO, it must be modified, however, if the space within the frontier is not completely empty. For anything in the scene inside the frontier, the assumption of no parallax from inside the workspace is no longer valid. To account for this, an incident SAO is generated for any specified point within the workspace and then combined with the position-invariant SAO. Such SAOs can be generated outside the workspace but the position-invariant SAO is no longer valid.

The concept of SAO layers is introduced for concentric SAOs (same center point). SAOs are arranged into layers of decreasing illumination priority when moving away from the center. Thus, for a given point in the workspace, the highest priority SAO is generated for the media and objects within the frontier, the incident SAO, and does not include the frontier. The position-invariant SAO is at a lower priority, beyond the incident SAO. The two are merged to form a composite SAO, the point light field SAO for the location. The incident SAO, in effect, overwrites the position-invariant SAO. It is not necessary for a new SAO to be created or the position-invariant SAO to be changed. They can be UNIONed together with the incident nodes taking priority (used where nodes with properties exist in both).

A position-invariant SAO itself may be composed of layers. A lower-priority layer could model the sun, for example, and anything else closer than the sun that does not exhibit parallax could be represented as a higher-priority SAO.

Media is represented as mediel nodes of one or more octrees. The behavior is determined by the nature of the media represented by a particular octree (common to all nodes) and by the specific properties contained in the nodes. When incident light encounters media, the responsive light resulting from a BLIF interaction is modeled. Octree nodes could attenuate the light's intensity, change its color, and so on, in addition to changing its direction (with the SAO properties appropriately modified).

Incident light field generation module 2003 implements a procedure that generates an incident SAO for a given point. For such points that are in the workspace it, in effect, overwrites a common copy of the position-invariant SAO wherever media has been found to block the view of the frontier from the given point.

The algorithm used in incident light field generation module 2003 is cast into the form of an intersection operation between the solid angles of interest centered on a specified point and the mediels in the universe. This minimizes the need to access media outside of regions needed to generate the SAO. Using the hierarchical nature of octrees, the higher-resolution regions of interest are accessed only when a potential intersection is indicated at a lower-level of resolution.

The light from a direction must be only from the nearest spatial region of media in that direction. Unnecessary computations and database accesses occur if the media behind the closest region is processed. The directional traversal of octrees (based on spatial sorting) is used. By searching in a front-to-back octree traversal sequence, in this case outward from the specified point, traversal in a particular direction ceases when the first node with opaque media is encountered for a particular octree.

Figure 31A:
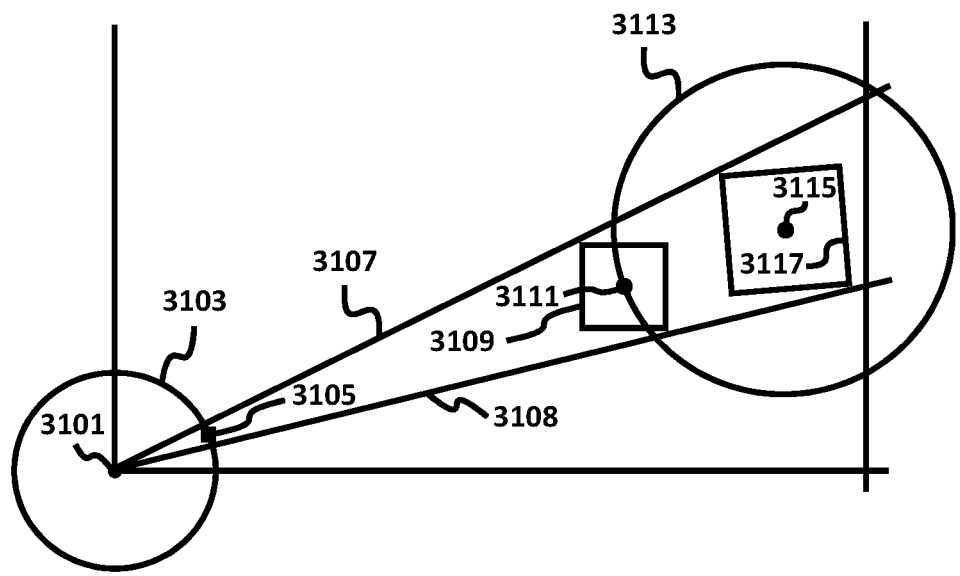
FIG. 31A is a geometric diagram that shows the exitant SAO to incident SAO relationships, according to some example embodiments.
Figure 31B:
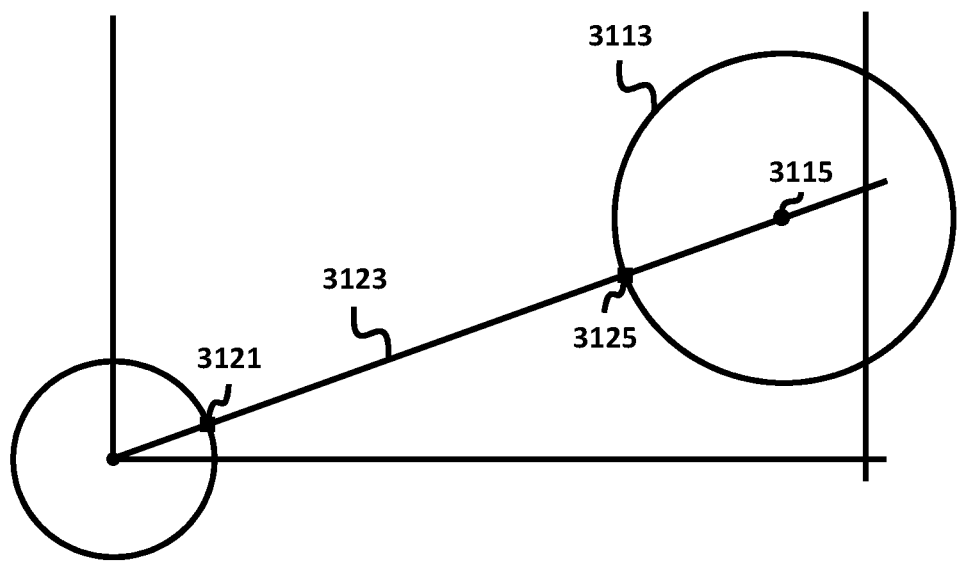
FIG. 31B is a geometric diagram that shows the incident SAO resulting from FIG. 31A, according to some example embodiments.

Exitant to incident light field processing module 2005 operates to generate the incident light field SAO for a point or represented region of space, in general, the contribution of multiple exitant SAOs in the scene must be accumulated. The operation is illustrated in FIG. 31A and FIG. 31B in 2D.

The function of the incident to exitant light field processing module 2007 is to compute the exitant light from a location on a surface which is the sum of any light that is internally generated plus the incident light as reflected or refracted by the surface.

A SAO can be used to represent the incident light, the emissive light and the responsive light. In another use, a SAO is used to represent the BLIF (or other related property or set of properties) for a mediel. The BLIF coefficients are stored as BLIF SAO node properties. They are typically defined as a set of weights in four-dimensions (two incident angles and two exitant angles). A SAO represents two angles. Thus the two remaining angles can be represented as a set of properties in each node, resulting in a single SAO. Or they can be represented in multiple SAOs. The actual weights can be stored or generated on-the-fly during a processing operation. Other methods can be employed as understood by one skilled in the art.

A spherical BLIF SAO is rotated appropriately for each exitant direction of interest using the geometry processing module 1905 (described with FIG. 38). The coefficients will, for example, be multiplied by the corresponding values in the incident light SAO and summed. Any light generated within the media would be added to the exitant light also. This is further described in relation to FIG. 32.

FIG. 22 shows a 2D example of a SAO with light rays. The node with a center at point 2209 is bounded by rays 2211 and 2212 which are the angular limits of the solid angle (in the 2D plane). At the next lower level in the SAO (higher resolution) the child node with a center at 2210 represents the solid angle from ray 2213 to 2214.

The surface area of the unit sphere represented by a SAO node can be represented in various ways, depending on the needs of the operation and the computational limitations. For example, a property can be attached to the nodes of a SAO to indicate some area measure (e.g., angle of cone around ray through some point) or a direction vector for use in operations. Someone skilled in the art will understand that this can be done in various ways.

As noted above, the registration processor 1921 is used to refine the location of 3D points in a scene as estimated from 2D locations found in multiple images. Here the 3D points in the scene are called "landmarks" and the 2D projections of them on images are referred to as "features." In addition, the location and viewing directions of the cameras, when the images were taken, are to be refined. At the start of this process multiple 3D landmark points have been identified, roughly located at estimated 3D points in the scene, and labeled with unique identifiers. The associated 2D features are located and labeled in images in which they appear (a minimum of two). Rough estimates of the camera parameters (position and viewing direction) are also known.

These estimates can be computed in many ways. Basically, image features that correspond to the projection of the same landmark in 3D need to be detected. This process involves finding the features and the decision whether they correspond. From such a correspondence pair and an approximate knowledge of the camera poses, anybody skilled in the art can triangulate the rays emanating from these features and obtain a rough estimate of the landmark's 3D location.

Detected features have to be discriminative, well localized and they have to be able to be redetected when the corresponding landmark appears in other images. It is assumed here that the surface normal vector for every point in the 2D images as in 2349 in FIG. 23A has been computed.

Figure 23A:
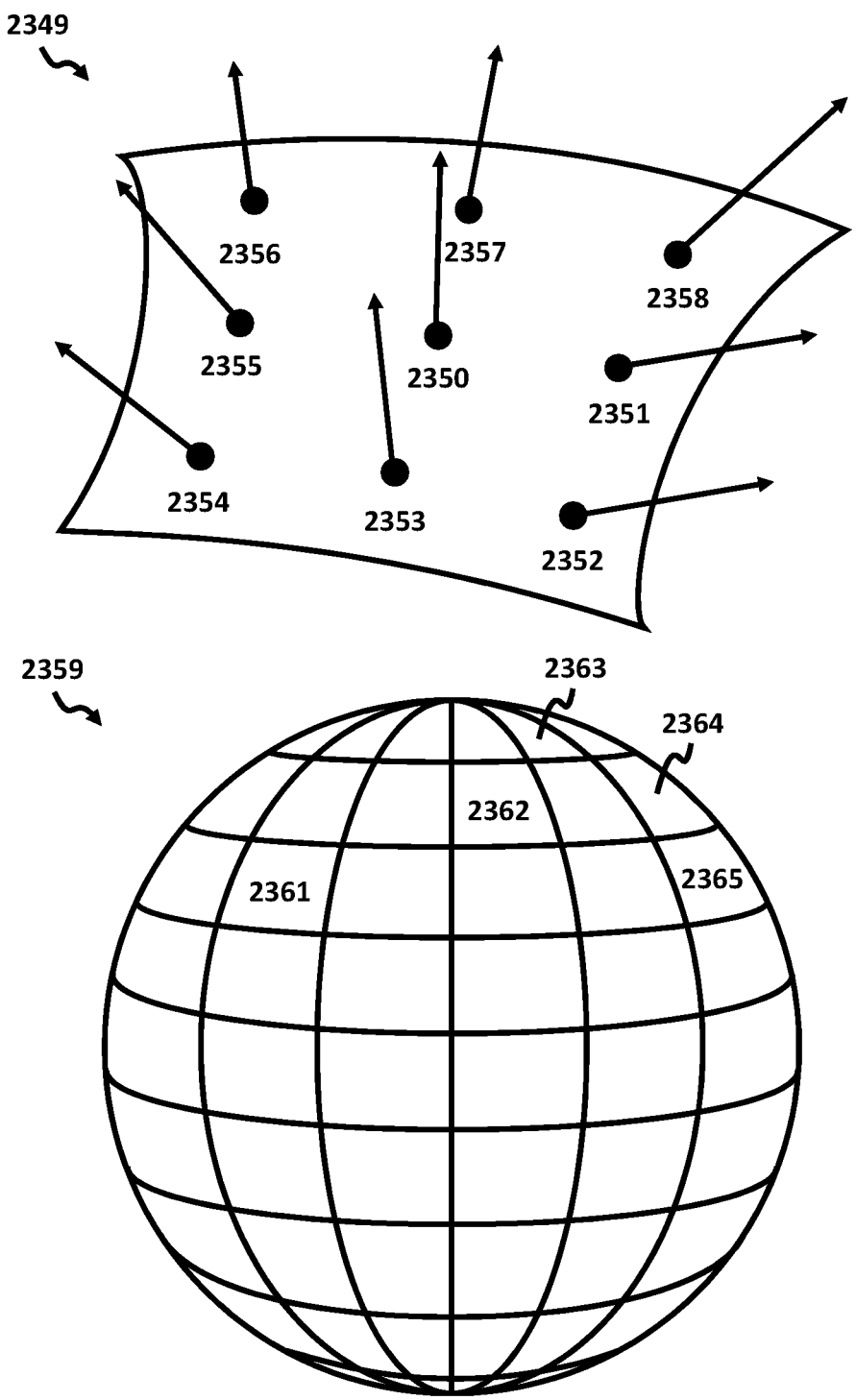
FIG. 23A is a geometric diagram that shows the feature correspondence of surface normal vectors.

For every point we compute the local scatter matrix of each normal vector as the 3×3 matrix $$\Sigma_{i=1\ldots 9}(N_i N_i^T) \qquad \text{[Eq. 10A]}$$

where each Ni is a normal vector (Nx, Ny, Nz) at i=1 ... 9 points depicted as 2350-2358 in 2349 in FIG. 23A. We define them as feature points, points where the determinant of this matrix is maximum. Such points correspond to points of maximal curvature. The determinant is invariant to surface rotations and the same point can be, thus, detected even if the surface has been rotated. The descriptor can be estimated over larger neighborhoods such as 5×5, or 7×7 proportionally to the resolution of the grid where normals have been estimated from Stokes vectors.

To find matches between features, we compute a descriptor that represents the local distribution of surface normals in the 3D neighborhood of the point. Consider a point detected at position 2350 in FIG. 23A. The illustrated surface 2349 is not known but the normals can be obtained from the Stokes vector values. Assume that the immediate neighborhood consists of 8 neighbors (2351-2358) of point 2350 each of them with a normal as shown in the figure. The descriptor is a spherical histogram 2359, where the bins are separated by uniformly spaced latitudinal and longitudinal lines. Normals with similar orientations will be grouped to the same bin: in the figure, normals at 2354, 2355, and 2356 will be grouped to bin 2361, normal at 2357 to bin 2363, normal at 2350 to bin 2362, normal at 2358 to bin 2364, and normal at 2351-2352 to bin 2365. The values of the histogram bins will be 3 for bin 2361, 1 for bins 2363, 2362, and 2364, and 2 for bin 2365. Similarity between features will be then expressed as similarity between spherical histograms. Observe that these spherical histograms are independent of the color or the lack thereof and, thus, depend only on the geometric description of the surface that is projected. One cannot take directly the absolute or squared difference between two spherical histograms of normals because the two view differ on orientation and one histogram is a rotated version of the histogram of the same point. Instead we compute an invariant using the spherical harmonics. If the spherical histogram is a function f(latitude,longitude) and its spherical harmonic coefficients are F(l,m) where l=0 . . . L−1 is the latitudinal and m=−(L−1) . . . (L−1) the longitudinal frequency then the magnitude of the vector [F(1,−L+1) . . . F(1,0) . . . G(1,L−1)] is invariant to 3D rotations and one can compute such an invariance for every l=0 . . . L−1. We compute the sum of squared differences between them and this is the measure of dissimilarity between two descriptors. We can choose as corresponding point in a 2nd view the one with the minimal dissimilarity to the considered point in the 1st view. One skilled in the art can apply any matching algorithm from the theory of algorithms (like the Hungarian Algorithm) given the above defined (dis) similarity measure. As mentioned above from every pair of corresponding features we can determine a rough estimate of the landmark position.

Figure 23B:
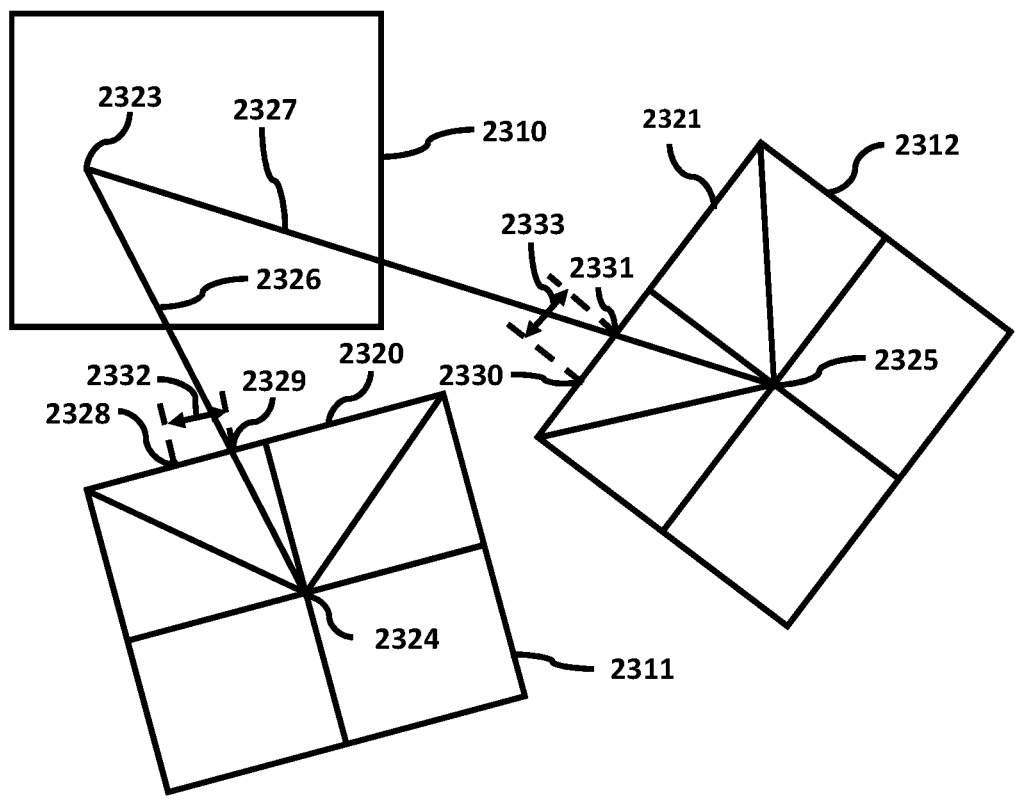
FIG. 23B is a geometric diagram that shows the projection of a landmark point on to two image feature points for registration, according to some example embodiments.

In general, there will be n landmarks and m images. In FIG. 23B, a 2D representation of a 3D registration situation, landmark point 2323 is contained in universe 2310. Images 2320 and 2321 are on an edge (face in 3D) of the universes 2311 and 2312, respectively, of the associated cameras positions. The two camera viewpoints are 2324 and 2325. The location, in image 2320, of the projection of the initial location of landmark 2323 to viewpoint 2324 along line 2326 is point 2329. The location where the landmark was detected in image 2320 is 2328, however. In image 2321 the projected feature position on line 2327 is 2331 while the detected location is 2330.

The detected feature points 2328 and 2330 are fixed locations in the images. The landmark 2323, the camera locations 2324 and 2325, and the orientations of the camera universes 2311 and 2312 are initial estimates. The goal of registration is to adjust them to minimize some defined cost function. There are many ways to measure the cost. The L2-norm cost will be used here. This is the sum of the squares of the 2D distances in the images between the adjusted feature locations and the detected locations. This is, of course, only for images in which the landmark appears as a feature. In FIG. 23B these two distances are 2332 and 2333.

Figure 24:
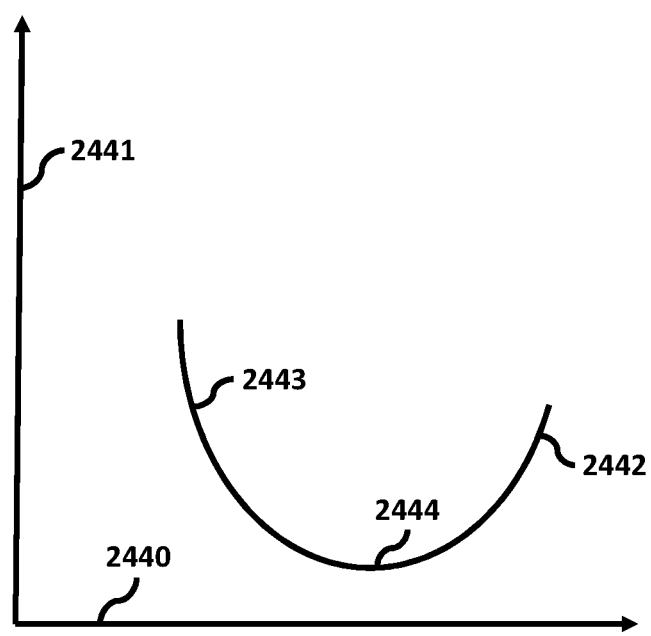
FIG. 24 is a geometric diagram that shows registration cost as a function of parameters, according to some example embodiments.

FIG. 24 is a plot of the cost function. Y axis 2441 is the cost while X axis 2440 represents the adjustable parameters (location of landmark, location of cameras, camera viewing direction, etc.). Every set of parameters on the X axis has a cost on curve 2442. The goal, given a starting point such as point 2443, is to find the set of parameters that minimizes the cost function, point 2444. This typically involves solving a set of nonlinear equations using iterative methods. The curve shows a single minimum cost, the global minimum, while, in general, there may be multiple local minima. The goal of this procedure is to find a single minimum. There are many known methods to search for other minima and to eventually locate a global minimum.

The equations that determine the image intersection points as a function of the variables are typically collected into a matrix applied to a parameter vector. To minimize the sum of the distances squared, the derivative of the cost (sum of squared 2D image distances) is typically set to zero indicating a minimum. Matrix methods are then employed to determine a solution which is then used to estimate the next set of parameters to use on the way to the minimum. This process is computationally intensive and requires a relatively long period of time as the number of parameters (landmarks, features and cameras) gets large. The method employed here does not directly compute the derivatives.

Registration processing module 1921 operates by iteratively projecting the landmark points on to the images and then adjusting the parameters so as to minimize the cost function in the next iteration. It uses the perspective projection image generation method of image generation module 1909 as described above to generate the feature locations of the landmark points, at their current positions, in the images represented as quadtrees. Such images are generated in a series of PUSH operations of the octree and quadtree that refine the projected locations.

The cost to be minimized is Σ d2 for all images where d is the distance in each image from any detected feature point in the image to the associated projected feature point. It is measured in pixels to some resolution. Each is the sum of the x2 and y2 components of the distance in the image (e.g., d2=dx2+dy2).

Figure 25A:
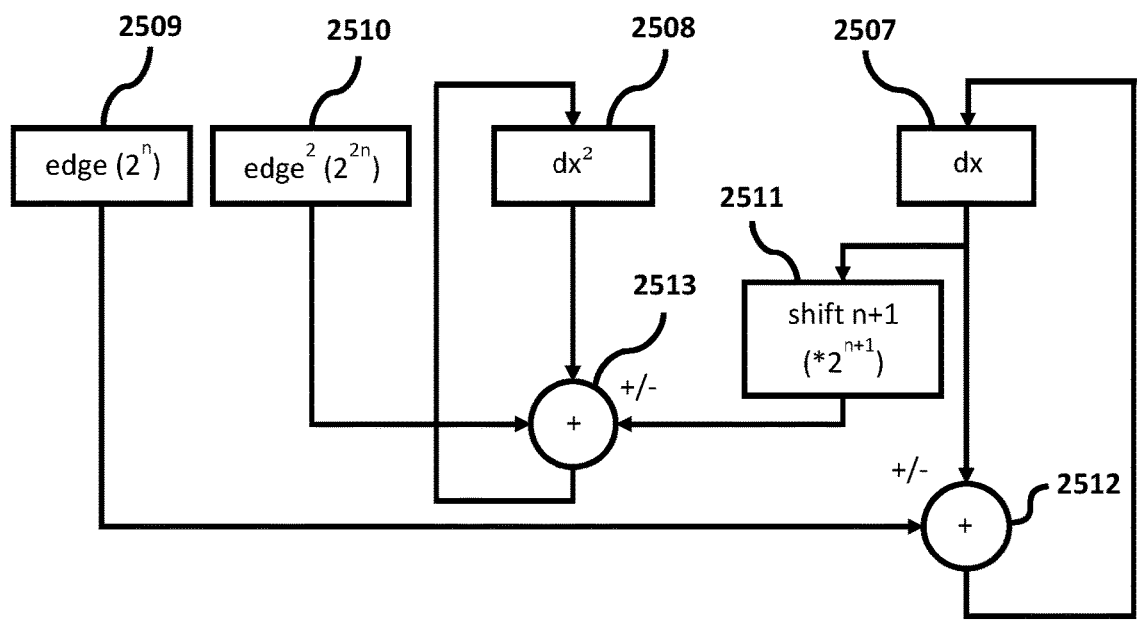
FIG. 25A is a schematic that shows generation of updated cost values after a PUSH operation, according to some example embodiments.

The computations are shown in FIG. 25A for the X dimension. Not shown, a similar set of computations is performed for the y value and the squared values are summed. The process for the X dimension begins by performing a projection of landmarks at the initial estimated positions to the quadtrees. For each feature in an image, the distance in X from the detected location to the computed location is saved as value dx in register 2507. One skilled in the art will understand that registers as used here can be any form of data storage. This value can be to any precision, not necessarily a power of two. The initial value also is squared and saved in register 2508.

The value of edge in shift register 2509 is the edge distance of the initial quadtree node, in X and Y, to move the center of the quadtree node to that of a child node. The edge distance will be added or subtracted from x and y location values of the parent to move the center to one of the four children. The purpose of the computation in FIG. 25A is to compute a new value for dx and dx2 after a PUSH of the quadtree. As an example, if the PUSH is to the child in the positive x and y directions, it computes the new values d' and d'2 as follows:

$$dx'=dx+\text{edge} \qquad [\text{Eq. 11}]$$

$$dx2=(dx+\text{edge})2=dx2+2*dx*\text{edge}+\text{edge}2 \qquad [\text{Eq. 12}]$$

Since the quadtree is constructed by a regular subdivision by 2, the edge of a node at any level (in X and Y) can be made a power of 2. The value for edge can thus be maintained by placing a value of 1 into the appropriate bit location in shift register 2509 and shifting to the right by one bit position on a PUSH. Likewise, the edge2 value in shift register 2510 is a 1 in the appropriate bit location that is then shifted two places to the right on a PUSH. Both are shifted left (register 2509 by one place and register 2510 by two) on a POP. As shown, edge is added to dx by adder 2512 to generate the new value on a PUSH.

To compute the new dx2 value, 2*dx*edge is needed. As shown, shifter 2511 is used to compute this. A shifter can be used for this multiplication because edge is a power of 2. An extra left shift is used to account for the factor of two. As shown, this is added to the old dx2 value plus the edge2 value by adder 2513 to compute the new dx2 value on a PUSH.

Note that the values in shift registers 2509 and 2510 will be the same for the y values. They do not need to be duplicated. Not shown is an adder to sum the dx2 and dy2 values. Depending on the particular implementation, the computation of a new d2 value on a PUSH can be accomplished in a single clock cycle. One normally skilled in the art understands that this computation can be accomplished in a variety of ways.

The overall process is to iteratively compute new sets of parameters that will move the cost down toward the minimum and to stop when the cost change is below a minimum. There are many methods that can be used to determine each new set of parameters. An example embodiment uses a well-known procedure, Powell's method. The basic idea is to select one of the parameter and to change just it to find a minimum cost. Another parameter is then selected and varied to move the cost to another, lower, minimum. This is done for each parameter. At the end, for example, the parameter with the largest change is fixed before a parameter deviation vector is generated and used to determine the next set of parameters.

When varying the x, y and z parameters of a particular landmark point (in the coordinate system of the scene), the contribution to $\Sigma$ d2 is just the summed d2 values for that landmark, independent of other landmarks. Thus, the coordinates can be modified individually and minimized in isolation. If the computations are spread over many processors, an iteration of many such changes can be computed quickly, perhaps in a single clock cycle.

Figure 25B:
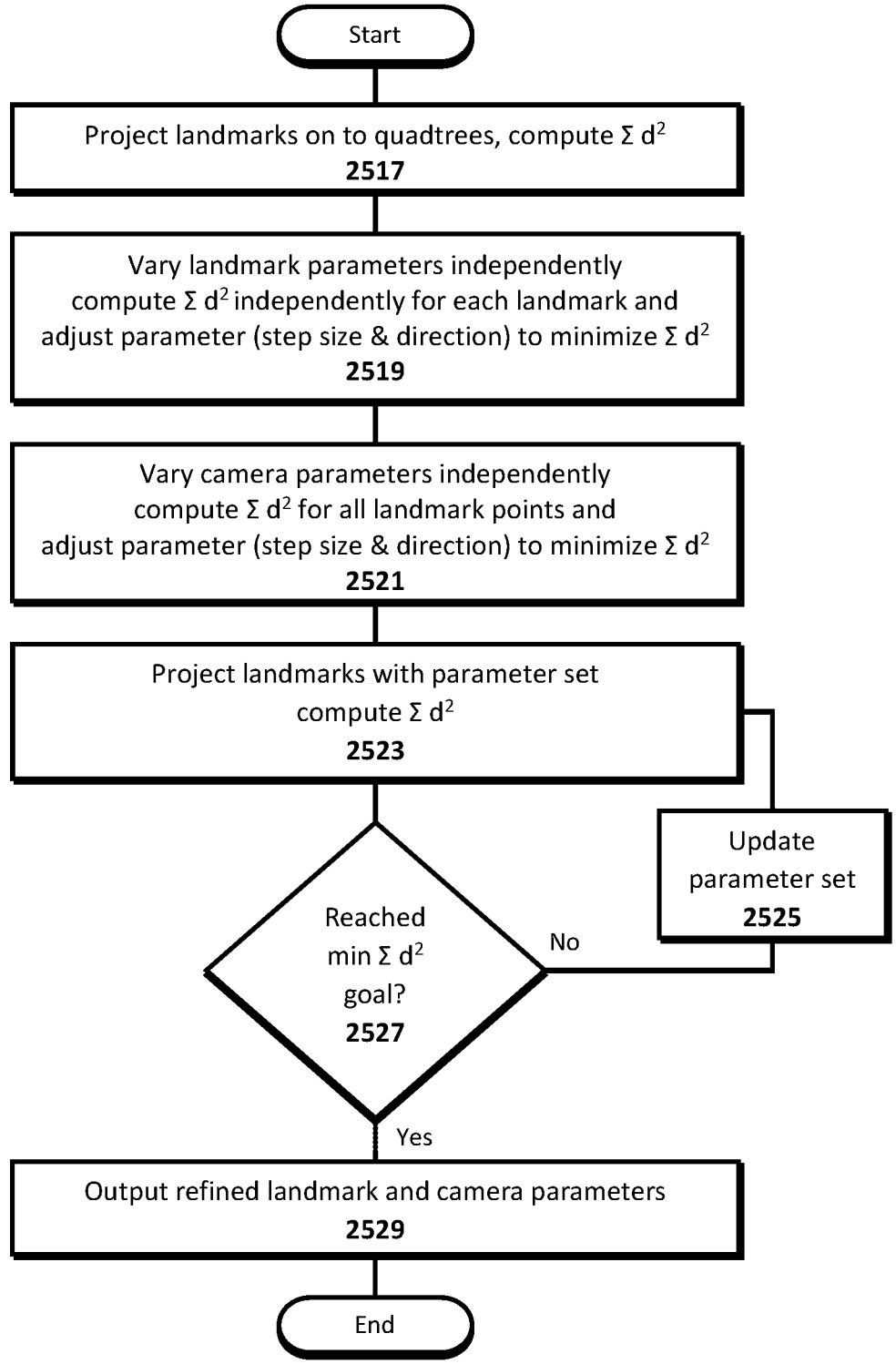
FIG. 25B is a flow diagram that shows a registration procedure, according to some example embodiments.

The procedure is registration process 2515 in FIG. 25B. The initial estimated landmarks are projected on to the quadtrees to determine starting feature locations in operation 2517. The differences from the detected feature locations are squared and summed for the initial cost value. The landmarks are then varied independently with the sum of their differences squared being minimized sequentially in each parameter that moves the landmark. This is performed in operation 2519.

The changing of parameters is then performed on camera parameters. In this case it is performed with all landmark points represented in the associated image. This is performed in operation 2521. The results of the parameter changes are computed in operation 2523. This process continues until a minimization goal has been achieved or until some other threshold has been reached (e.g., maximum number of iterations) in operation 2527. If not terminated, the results of operation 2523 are then used to compute the next parameter vector to apply in update operation 2525.

When terminated, operation 2529 outputs the refined landmark and camera parameters.

A method of moving a coordinate value (x, y or z) in a landmark represented by an octree is to step in only that dimension with each PUSH. This involves a change from using the center of a node as the parameter location to using, in the preferred method, the minimum corner.

Figure 26:
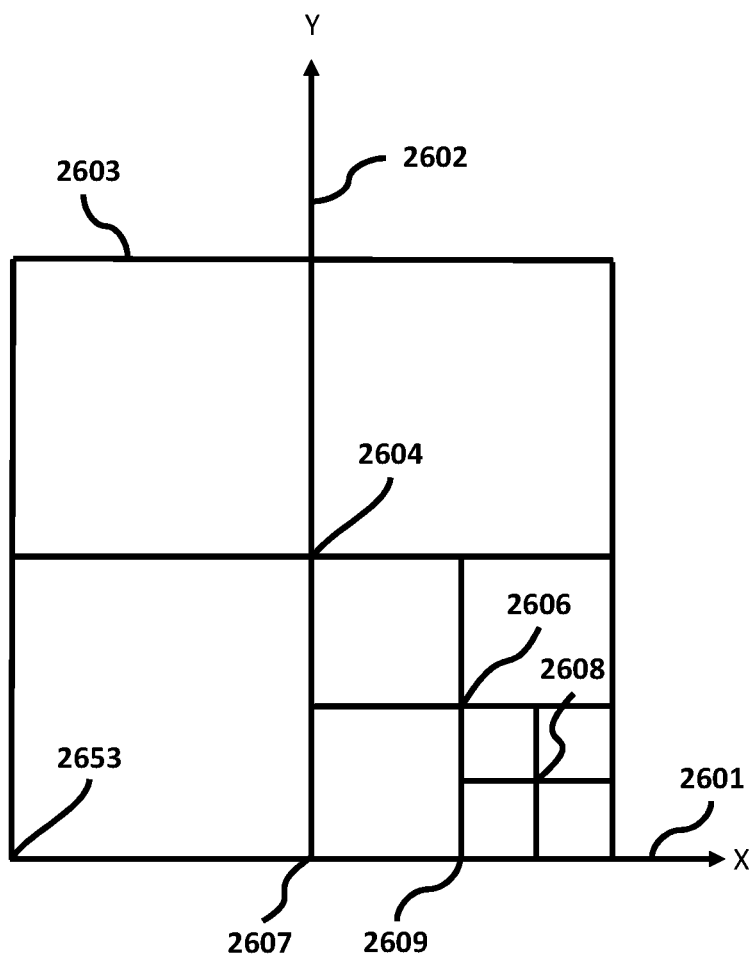
FIG. 26 is a geometric diagram that shows a move from a node center to a minimum point for registration, according to some example embodiments.

This is shown in FIG. 26 in 2D. Coordinate axis 2601 is the X axis and axis 2602 is the Y axis. Node 2603 has a center at point 2604. Instead of using it as two parameters (x and y, or x, y and z in 3D), the point 2653 is used. To then move the parameters for the next iteration, a subdivision is performed to the child node that has its center at 2606 but the new location for the parameters is 2607. In the next iteration, if the movement is again positive, the next child is the one with its center at 2608 but the new set of parameters changes to point 2609. Thus, only the x parameter is changed while the y value is fixed (along with all the parameters other than x).

Figure 27:
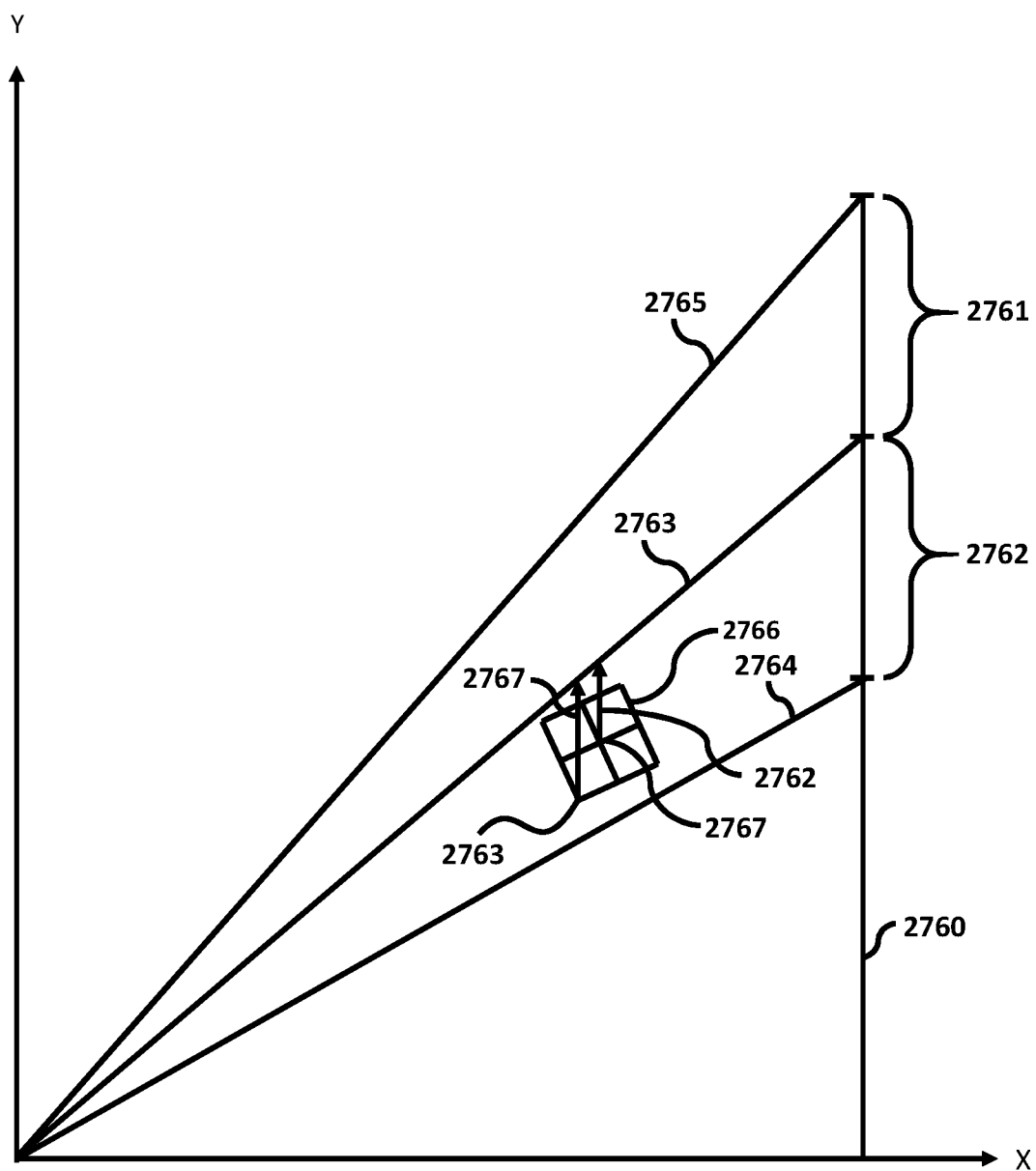
FIG. 27 is a geometric diagram that shows a move of minimum point in projection for registration, according to some example embodiments.

The use of the minimum location rather than the center of the node is illustrated in FIG. 27 in 2D. The quadtree plane is 2760. The two quadtree nodes that are the projection span are 2761 and 2762. Ray 2765 is the top-of-window ray and ray 2764 is the bottom-of-window ray. Ray 2763 is the origin ray. Node 2766 has its center at point 2767. The original node x span distance value is 2762. The node location for the measurement is now moved to the minimum node point (in x and y, x, y and z in 3D) and is point 2763. The new node x distance value is 2767.

Since the octree representing the landmark is subdivided, the steps are changed by half for each PUSH. If the new $\Sigma$ d2 for this landmark (and just this landmark) for the images that contain a related feature, is less than the current value, the current set of parameters is moved to it. If it is higher, the same increment change is used but in the opposite direction. Depending on the implementation, a move to a neighbor node may be necessary. If the cost for both are higher, the parameter set is left unchanged (select child with the same value) and another iteration is pursued with a smaller increment. The process continues until the cost changes drop below some threshold. The process may then continue with another dimension for the landmark.

While the above minimization can be performed simultaneously for multiple landmark points, modifying the parameters related to the camera locations and orientations require the $\Sigma$ d2 values to be computed for all the landmarks that appear in that image. It can, however, be performed independently and simultaneously for multiple cameras.

An alternative method of computing the cost (e.g., direct computation d2) is the use of dilation. The original images, with the detected feature points, are repeatedly dilated from the points with the cost (e.g., d2) attached to each dilated pixel out to some distance. This is done once for each image. Any feature too close to another can, for example, be added to a list of properties or placed into a another copy of the image. The images are then converted to quadtrees with the properties reduced (parent properties generated from children node properties). Minimum values could be used at the upper levels to abandon a projection traversal later if the minimum cost exceeds the current minimum, eliminating unnecessary PUSH operations. For higher precision the quadtrees would be computed to a higher resolution than the original images, especially if the original detected features were located to a sub-pixel precision.

This concept can also be extended to encompass the use of landmarks other than points. A planar curve could form a landmark, for example. It could be moved and rotated, then projected on to its associated image planes. The cost would be the sum of the values in the dilated quadtree that the projected voxels project on to. This could be extended into other types of landmarks by someone skilled in the art.

Figure 28A:
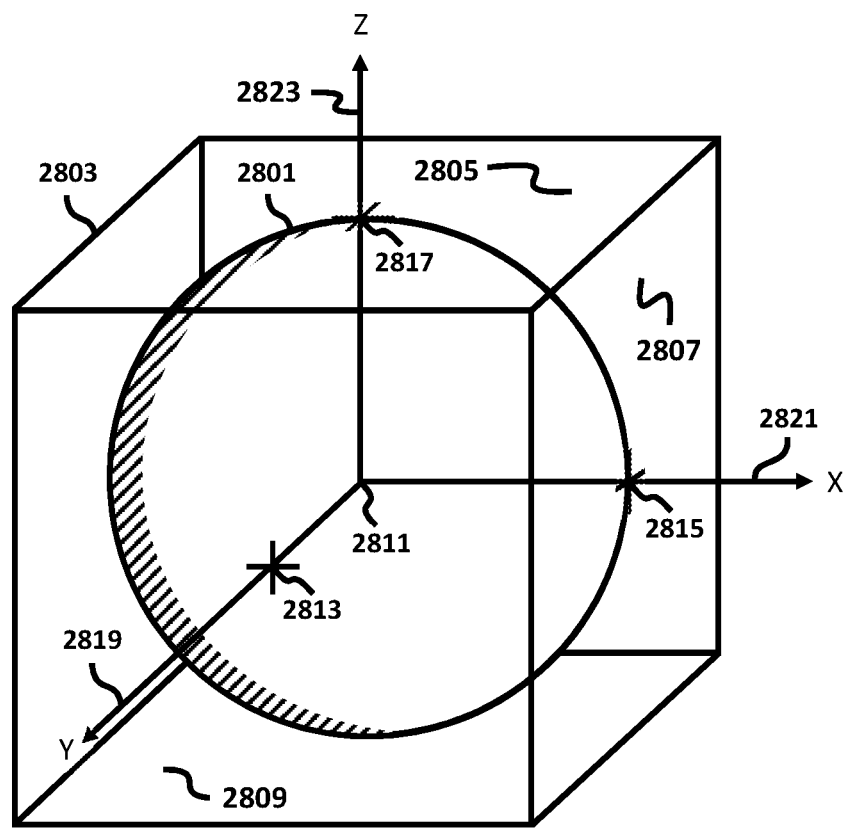
FIG. 28A is a geometric diagram that shows forward faces of a SAO bounding cube, according to some example embodiments.

FIG. 28A illustrates a position-invariant SAO sphere 2801 exactly enclosed by a unit cube 2803 with the forward facing faces 2805, 2807 and 2809. The three back-facing faces are not shown. The center of the SAO and the bounding cube is point 2811. It is also the axis of the coordinate system. The axes are X axis 2821, Y axis 2819 and Z axis 2823. The axes exit the cube at the center of the three front-facing axes indicated by cross 2815 on the X axis, cross 2813 on the Y axis and cross 2817 on the Z axis. Each sphere is divided into the six areas that exactly project on to a face of the cube from the center point. Each face is represented by a quadtree.

Figure 28B:
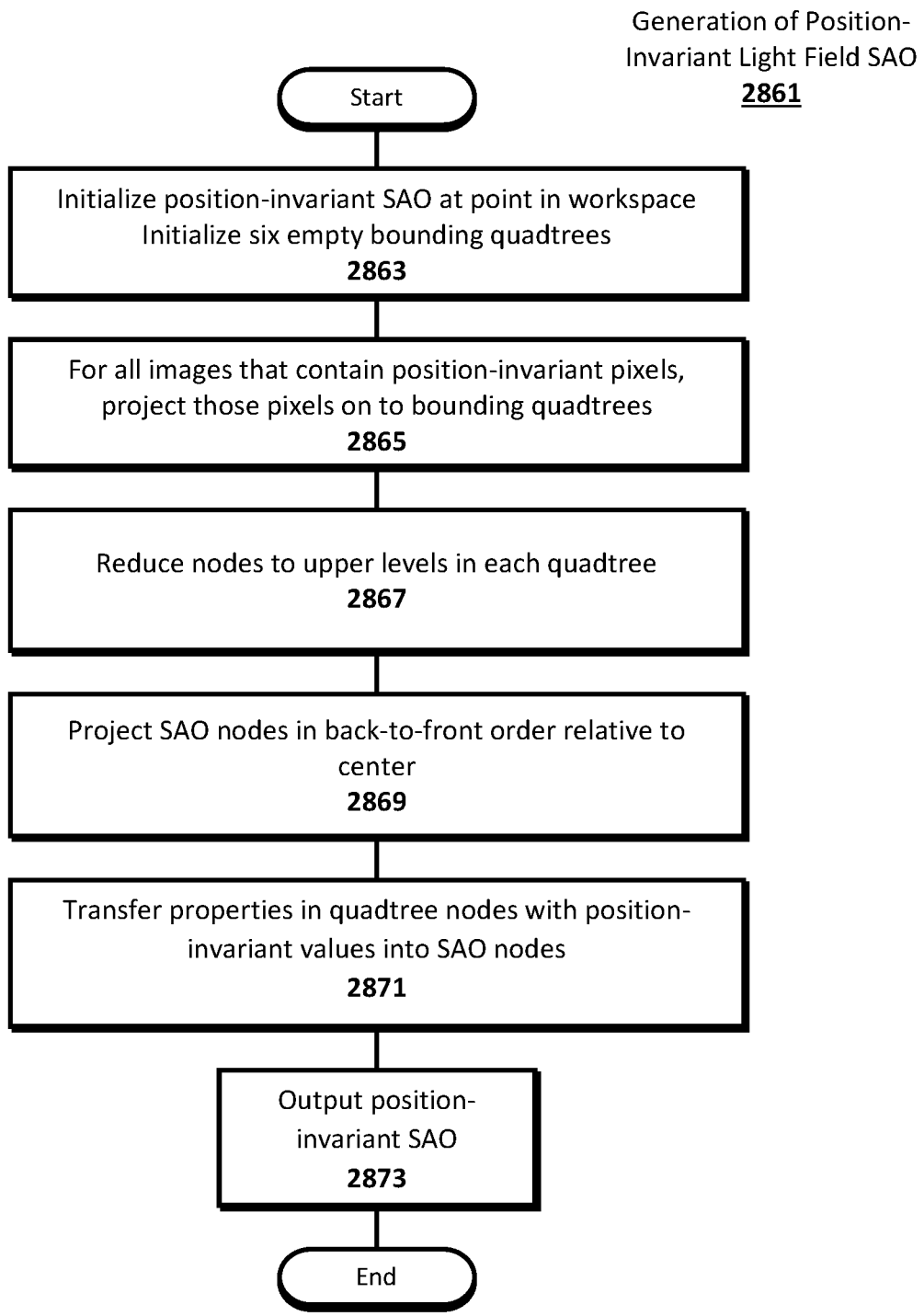
FIG. 28B is a flow diagram that shows the processes for generating a position-invariant SAO, according to some example embodiments.

The position-invariant SAO construction procedure is outlined in FIG. 28B which shows the generation steps 2861. The SAO and its six quadtrees are initialized in Step 2863 at some location within the workspace. Images of the frontier taken from within the workspace (or frontier information obtained in some other way) are appropriately projected on to one or more faces of the bounding cube and written into the quadtrees in Step 2865. For this, the quadtrees are treated as being at a sufficient distance from the workspace that parallax does not occur. Since the quadtree has a variable resolution, the distance used during projection is not important.

The properties in the lower levels of the quadtree are then appropriately reduced into the upper levels (e.g., average value) in Step 2867. Interpolation and filtering can be performed as part of this to generated, for example, interpolated nodes in the SAO. The position-invariant SAO is then populated in Step 2869 by projecting it on to the cube of quadtrees. In Step 2871 the properties originally from the images are written into the appropriate properties in the position-invariant SAO nodes. The position-invariant SAO is then output to the Scene Graph in Step 2873. In particular situations not all six quadtrees may be needed.

The use of a quadtree in this situation is a convenient method to combine diverse images into the frontier information for interpolation, filtering, etc. Someone normally skilled in the art could devise alternative methods to accomplish the generation of the frontier, including those where the use of the quadtrees are not used. The node properties would be processed and written directly from the images containing frontier information.

Figure 29:
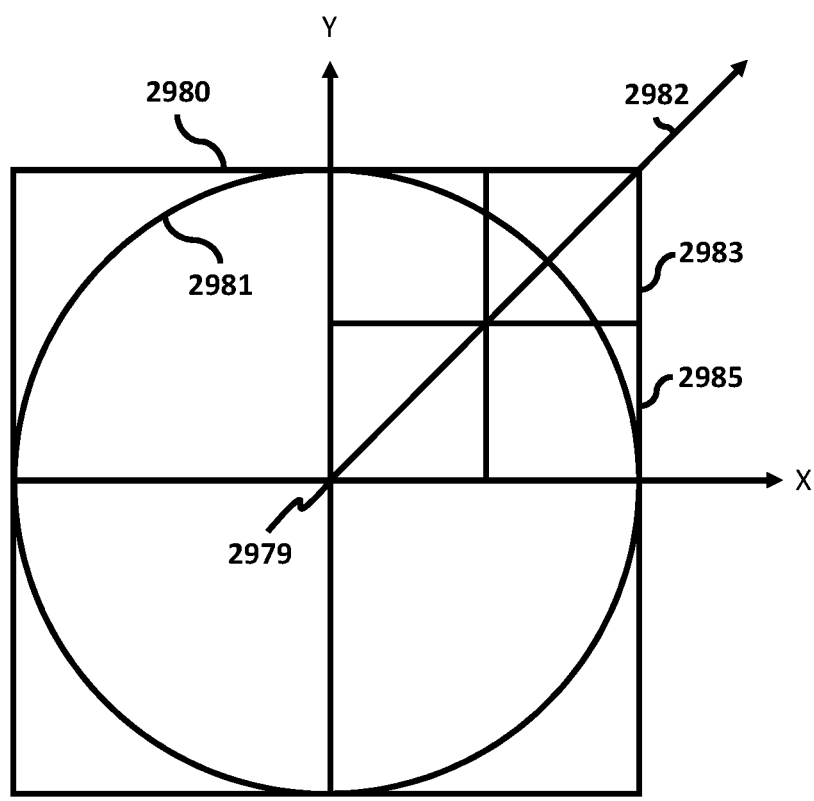
FIG. 29 is a geometric diagram that shows the projection of SAO on the face of a quadtree, according to some example embodiments.

To do this, the perspective projection method of image generation module 1909 is performed from the center of the SAO to the faces of the bounding cube. This is illustrated in FIG. 29 in 2D. The circle 2981 (sphere in 3D) is the SAO sphere. Square 2980 is a 2D representation of the cube. Point 2979 is the center of both. Ray 2982 is the +Y boundary of the quadtree in the +X face of the square (cube in 3D). Two quadtree nodes are node 2983 and node 2985.

The octree structure is traversed and projected on to the face. Instead of the property values in the SAOs nodes being used to generate a display value as is done in image generation, the reverse operation is performed (quadtree nodes written to octree nodes). The projection proceeds in a back-to-front sequence relative to the origin so the light in the quadtree will transferred to the outer nodes of the SAO (and reduced or eliminated in the quadtree node) first. This is the opposite of the usual front-to-back sequence used for display.

In a simple implementation, when the lowest-level node in the quadtree is reached (assuming a lowest level is currently defined or F nodes are encountered) the property values (e.g., Stokes S0, S1, S2) in the quadtree (nodes where the center of the SAO nodes project into) are copied into the node. This continues until all the nodes in the solid-angle octree, for that face, have been visited (with perhaps subtree traversals truncated with the use of masks).

This process can be performed after all frontier images have been accumulated and the quadtree properties reduced, or with any new images of the frontier. If a new value projects onto a SAO node that had previously been written into, it could replace the old value or it could be combined (e.g., averaged) or some figure of merit could be employed to make a selection (e.g., camera closer to frontier for one image). Similar rules are used when initially writing frontier images into quadtrees.

The use of a quadtree for each face helps account for the range of projected pixel sizes from various camera locations. The original pixels from the image are reduced (e.g., averaged, filtered, interpolated) to generate the upper levels (lower resolution) nodes of the quadtree. A measure of the variance of the child values may also be computed and stored as a property with the quadtree nodes.

In a sophisticated implementation the reduction and processing operations needed to generate the quadtree from an image can be performed simultaneously with the input of the image. It is thus possible that it might add a negligible amount of additional processing time.

At generation, if the highest level of resolution needed (for the current operation) in the SAO is reached and the bottom (pixel) level of the quadtree has been reached, the value from the current quadtree node is written into the node. If a higher quality value is desired, the projection location in the quadtree could be used to examine a larger region of the quadtree to compute a property or set of properties that include contributions from neighboring quadtree nodes.

If, on the other hand, the bottom level of the quadtree is reached before the bottom level of the octree, it's subdivision is stopped and the quadtree node values (derived from original pixel values from frontier images) are written into the lowest node levels of the SAO.

In general, it is desirable to perform the projection using a relatively low level of resolution in the solid-angle octree while saving whatever information is needed to later pick up the operation to generate or access lower level SAO nodes, if needed, during the execution of an operation or query, or requested for later use.

Advantage is taken of the multi-resolution nature of SAOs. For example, a measure of the rate of spatial change of illumination can be attached to nodes (e.g., illumination gradient). Thus, when the illumination is changing rapidly (e.g., in angle), lower levels of the SAO octree/quadtree could be accessed or created to represent a higher angular resolution.

Figure 30:
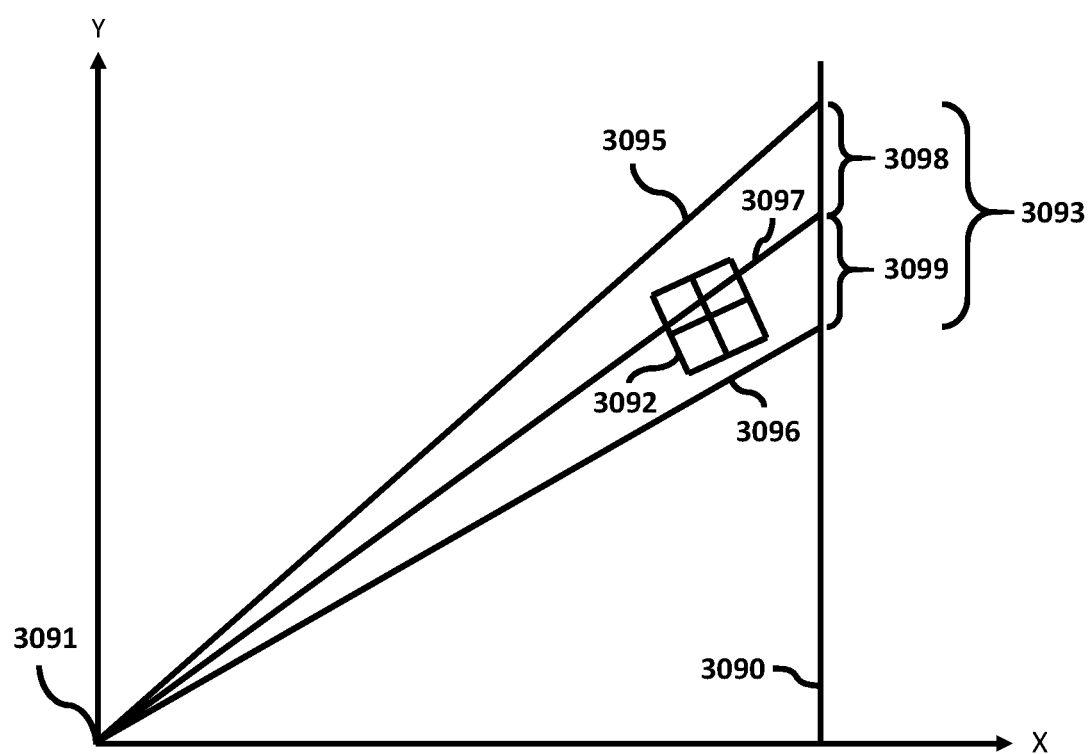
FIG. 30 is a geometric diagram that shows the projection of an octree in incident SAO generation, according to some example embodiments.

An incident SAO generation operation is similar to the frontier SAO except that the six frontier quadtrees are generated with an image generation operation of image generation module 1909 using the incident SAO's center as the viewpoint and a front-to-back sequence. As shown in FIG. 30, the initially-empty incident SAO is projected from its center at point 3091 on to the quadtree 3090. One quadtree node 3093 at some level n is shown. At the next level of subdivision, level n+1, nodes 3098 and 3099, are shown. The octree node at the current stage of traversal is node 3092. The two bounding projections are ray 3095 and ray 3096. Spans are measured from center ray 3097. As noted above, the quadtree images may be a composite of multiple projected octrees with different origins and orientations using a qz buffer. The same projection of the quadtrees on to the new SAO is then performed and transferred to the frontier SAO in a manner similar to that of generating a frontier SAO.

Since the direction from the center of a SAO to a sample point on the SAO sphere is fixed, a vector in the opposite direction (sphere to center point) could be a property in each light field SAO node containing a sample location. This could be used in computing the incident illumination to be used.

The operation of the exitant to incident light field processing module 2005 is illustrated in FIG. 31A and FIG. 31B in 2D. An exitant SAO has a center at point 3101 and unit circle 3103 (sphere in 3D). A particular exitant SAO node 3105 contains property values representing the light emerging in its direction from center point 3101. Using the same procedure as for generating an incident SAO, the nodes in the octree or octrees representing media in the scene are traversed in a front-to-back order from point 3101. In this case the first opaque node encountered is node 3117. The projection bounding rays are ray 3107 and ray 3108. The task is to transfer light from the exitant SAO with its center at point 3101 to an incident SAO associated with node 3117.

The incident SAO for node 3117 is an SAO with its center at 3115. It may already exist for node 3117 or may be created the first time incident illumination is encountered for it. As shown, the nodes of the incident SAO with its center at 3115 has its representation circle at 3113 (sphere in 3D).

The orientation of the coordinate system of the media octree or octrees is independent of the orientation of the coordinate system of the exitant SAO with its center at 3101, as is usual for Image Generation processing module 1909. In this implementation the coordinate systems of all SAOs are aligned. Thus, the coordinate system of the incident SAO associated with node 3117 is aligned with that of the exitant SAO centered at point 3101. A node in the incident SAO that will be used to represent the illumination from point 3101 is node 3109. It's center is at point 3111.

The computation to identify node 3109 proceeds by maintaining the location of nodes in the incident SAO while its center is moved with the media octree, point 3115 in the diagram. The incident SAO nodes are traversed in a front-to-back sequence from the center of the exitant SAO, point 3101 in this case, so the nodes on the correct side will be found. A mask can be used to remove the nodes of the incident SAO that are blocked from view and cannot receive illumination.

The traversal of the incident SAO nodes is complicated by the fact that its coordinate system will not, in general, be aligned with the coordinate of the octree that it is attached to. Thus, the movement from a node in the incident SAO must account not only for the movement relative to its own center but also for the movement of the node center of the media octree. This is accomplished by using the same offsets used by the media octree nodes for a PUSH added to the normal offsets for the SAO itself. While the two sets of offsets will be the same at any particular level as used by the media octree and the exitant SAO, its computation must accumulate the sum of the offsets of both independently because the sequence of PUSH operations and offset calculations will, in general, be different from either that of the exitant SAO or the media octree.

When the level of subdivision for the particular operation underway is achieved, the appropriate illumination property information from the exitant node, node 3105 in this case, is transferred to the incident node, node 3109 in this case. The transferred illumination is appropriately accounted for by changing the associated properties in the exitant node, node 3105 in this case. The characterization of the appropriate illumination transfer can be performed in many ways such as by the projected rectangular area determined by the projected node width and height in the X and Y dimensions.

Figure 32:
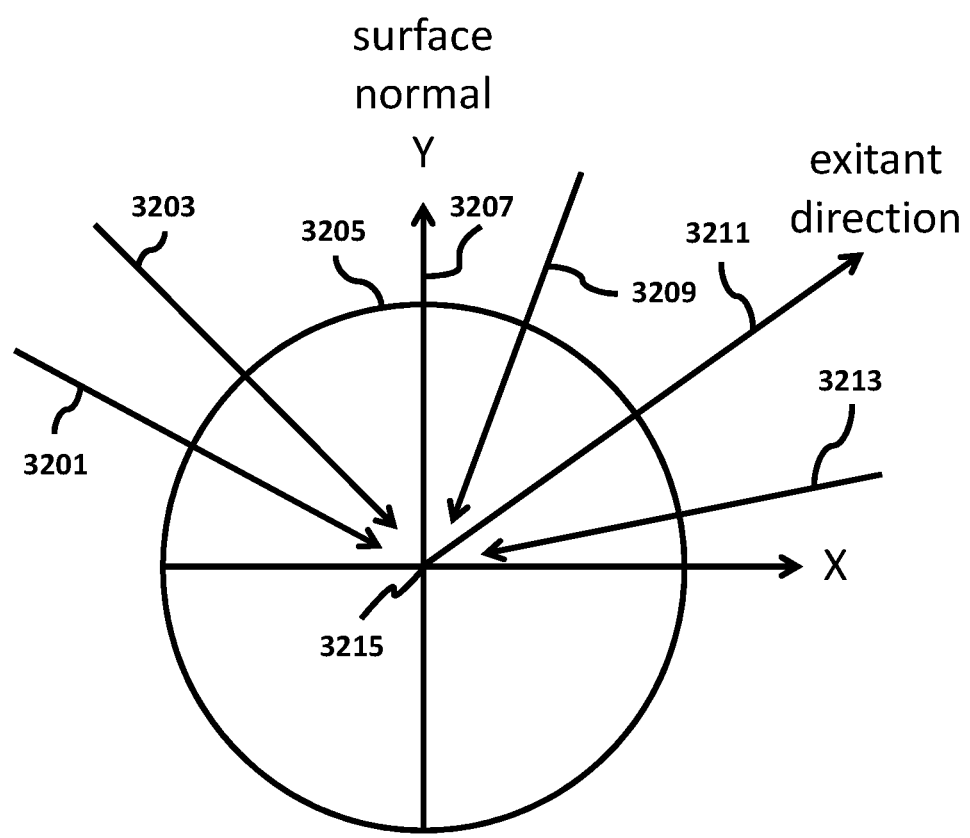
FIG. 32 is a geometric diagram that shows a bidirectional light interaction function (BLIF) SAO in 2D, according to some example embodiments.

As subdivision continues, FIG. 31B illustrates the result where the exitant SAO node 3121 projects its illumination along a narrow solid angle 3123 on to incident SAO node 3125 on circle 3113 (sphere in 3D), representing the illumination on the media node with the center at 3115. A 2D example of a BLIF SAO is shown in FIG. 32. It is defined by SAO center 3215 and circle 3205 (sphere in 3D).) The surface normal vector about which the weights are defined, is vector 3207 (the Y axis in this case). In the case shown the exitant light is being computed for direction 3211. The incident light on the surface location is represented by an incident-light SAO located at the same center point. In this case the light is shown from four directions 3201, 3203, 3209 and 3213. The SAO nodes containing the weights are located on the circle 3205 (a sphere in 3D). The exitant light in direction 3211 will be the sum of the weights for the incident directions multiplied by the light from that direction. In the figure this is four incident directions and four associated sets of weights.

The BLIF SAO surface normal direction will not, in general, correspond to a surface normal vector in a particular situation. The BLIF is thus rotated appropriately about its center using geometry module 1905 to align its normal direction with the local surface normal vector and the exitant direction to align with the BLIF SAO's exitant vector. The overlapping nodes in the two SAOs will be multiplied and summed to determine the characteristics of the light in the exitant direction. This will need to be performed for all exitant directions of interest for a particular situation. SAO masks can be used to exclude selected directions from processing (e.g., directions into the media).

This operation is typically performed in a hierarchical manner. When, for example, there is a large deviation in the BLIF coefficients in a certain range of angles, computations would be performed in the lower levels of the tree structures only in these ranges. Other regions of direction space will be computed more efficiently at reduced levels of resolution.

According to an example embodiment, 3D imaging system 200 can be used in the hail damage assessment (HDA) of vehicles. Hail causes major damage to vehicles every year. For example, there are approximately 5,000 major hail storms in the US each year that damage approximately 1 million vehicles. The assessment of damage currently requires visual inspection by skilled inspectors who must be quickly assembled in the affected area. The invention is an automatic assessment system that can automatically, quickly, consistently, and reliably detect and characterize vehicle hail damage.

Most hail dents are shallow, often a fraction of a millimeter in depth. In addition, there are often slight imperfections surrounding the dent itself, all leading to difficulties in the manual assessment of the damage and the cost to repair. Because of the uncertainty and the varying levels of effort required to repair individual dents, the estimated cost to repair a vehicle can vary widely, depending on the number of dents, their locations on the vehicle and their sizes and depths. The variance in manual assessments leads to large differences is estimated costs even for the same vehicle and damage. Reducing the variance is a major goal of automating the process. Conventional machine vision and laser technologies have difficulty characterizing hail damage. A major problem is the shiny nature of vehicle surfaces because they are highly non-Lambertian. They often exhibit mirror-like characteristics that, combined with the shallowness of many hail dents, render accurate characterization difficult with those methods. Some properties, however, such as shiny surfaces, enable trained observers to decipher the resulting light patterns when moving their view around to assess damage and, ultimately, estimate the repair cost. Some example embodiments of the present invention provide a system that can characterize light reflected from the surfaces of a vehicle from multiple viewpoints and then interpret the reflected light. The light incident to and exitant from the vehicle surfaces is analyzed. The method employs polarimetric imaging, the physics of light transport, and mathematical solvers to generate a scene model that represents, in 3D, both a media field (geometric/optical) and a light field.

Figure 33:
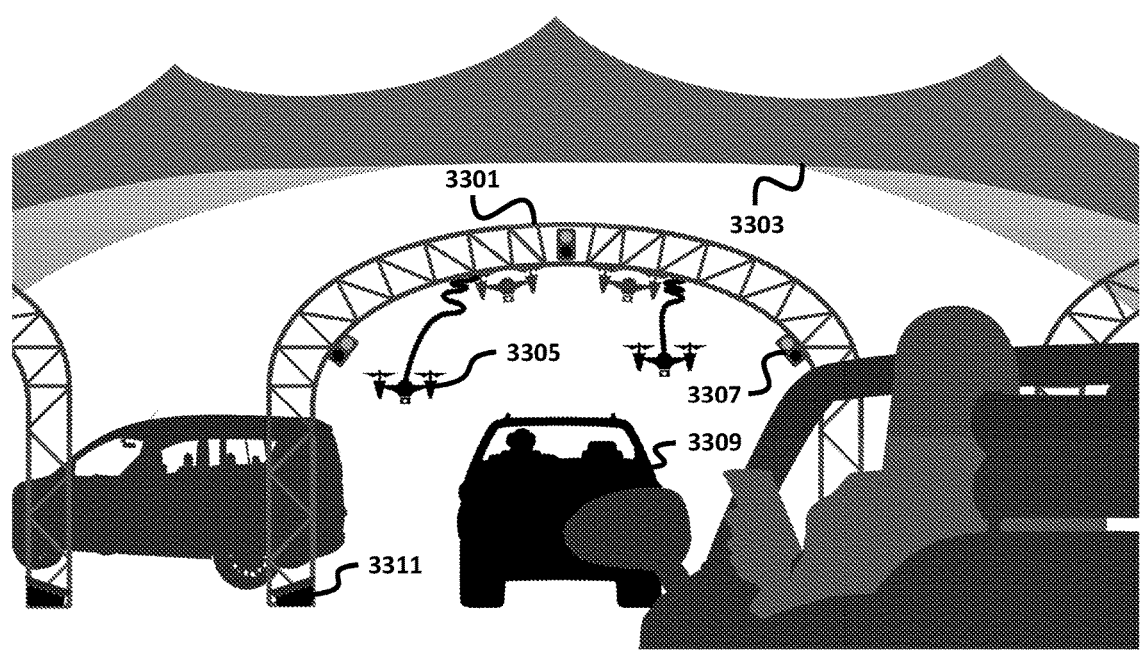
FIG. 33 is a concept drawing that shows a hail damage assessment application, according to some example embodiments.

In some example embodiments of the present invention, polarimetric cameras acquire images of the vehicle panels and parts from multiple viewpoints. This can be accomplished in many ways. One version would have a stationary vehicle imaged by a set of polarimetric cameras mounted on a moving gantry that would pause at multiple locations. As an alternative, UAVs such as quadcopters, perhaps tethered, could be used to transport the cameras. This occurs within a custom structure to control external lighting plus to protect the vehicle and equipment from the weather. Inside the structure, non-specialized (e.g., non-polarized) lighting is used. For example, standard floodlights within a tent could be used. An artist's rendition of a possible implementation is shown in FIG. 33. Vehicles such as vehicle 3309 drive into enclosure 3303 for inspection and stop. In this implementation a fixed gantry 3301 is used for both quadcopters carrying cameras and fixed cameras. Light 3311 is mounted low to the ground to illuminate the side of the vehicle. Control light unit 3307 instructs the driver to enter the enclosure, when to stop and when the scanning process is complete and the vehicle should exit. A camera is carried by quadcopter 3305.

The use of an enclosure can be eliminated in some situations by using a system to observe and model the light field in the natural environment.

After imaging the vehicle, the HDA system constructs a model of the vehicle surfaces. This begins with image processing or other methods (including existing 3D models of the vehicle type, if available) to segment the vehicle into parts (hood, roof, door, handle, etc.). This is used later to determine the repair procedure and cost for each detected hail dent on each part or panel. For example, often dents can be repaired by skillfully hitting the dent from the underside using specialized tools. A knowledge of the structure of the underside of a vehicle panel can be used to determine access to particular dents and improve estimates of repair costs.

The model constructed from the images for each panel is combined with knowledge of the vehicle year, model, shape, paint characteristics, etc. to form a dataset for analysis or for input to a machine-learning system for hail damage detection and characterization.

The use of a polarization image alone can provide some surface information concerning hail damage, other damage, debris, and so on. Such an image can also be used to compute precise surface orientation vectors on a pixel-by-pixel basis, providing additional information. As noted above, the BLIF gives the exitant light at a particular exit direction from a surface point as the sum of weights applied to all of the incident light falling on the point.

For vehicle panels the intensity of the reflected light in a particular exitant direction is influenced by the orientation of the surface at the reflection point. But the surface orientation generally cannot be determined using intensity observations alone. Using polarimetry, however, the orientation can be resolved (up to a small set of ambiguous alternatives). Given the incident light intensity from the various directions, the BLIF specifies the polarization to be expected in any exitant direction as a function of surface orientation. For non-Lambertian surfaces this typically provides sufficient information to distinguish exitant directions uniquely. In some BLIF formulations, any polarization that the incident light might have is also incorporated.

Thus, given the intensity (and the polarization, if known) of the incident light on a surface location, the estimated polarization of the exitant light in all possible directions can be computed. By comparing the Stokes vector values actually seen in an image to the possible values, the surface normal of the surface at the observed location can be selected. The incident light field SAO and the BLIF SAO can be used to efficiently compute the exitant light's polarization for comparison to the sensed polarization in a pixel or group of pixels. The closest match indicates a likely surface-normal direction.

If the surface normals are varying relatively smoothly in a region, they can then be integrated to form an estimated 3D surface from the single image. Abruptly changing normals are typically caused by some form of an edge, indicating a boundary terminating a surface.

In addition to some estimate of the illumination hitting a surface from various directions, this method requires an estimate of the BLIF of the surface. Sometimes a priori knowledge of the illumination and the objects can be used to initialize the BLIF estimation process. For vehicles, the BLIF may be known based on knowledge of the vehicle or a known set of BLIF can be individually tested to find the best fit.

While the single-image capability is useful, there are limitations. The absolute location in 3D (or range from the camera) cannot be directly determined and there can be some ambiguity in recovered surface orientations. Also, the viewpoint is important. Surface areas that are nearly perpendicular to the camera axis suffer from low SNR (signal-to-noise ratio), leading to the loss of surface orientation information and voids (holes) in the reconstructed surface.

A solution is to generalize the use of polarization to multiple images. Given the scene polarization observed from two or more viewpoints, the scene model can be cast into a mathematical formulation that can be solved as a non-linear, least-squares problem. This is used to estimate the scene light field and surface BLIFs. The position and shape of surfaces of interest can then be estimated. The scene model, which consists of surface elements (surfels) and the light field, is incrementally resolved to ultimately generate the model that best matches the observations (in a least-squares sense). And, depending on the camera viewpoints, the absolute position and orientation of each surfel can be determined on a voxel-by-voxel basis.

Figure 34:
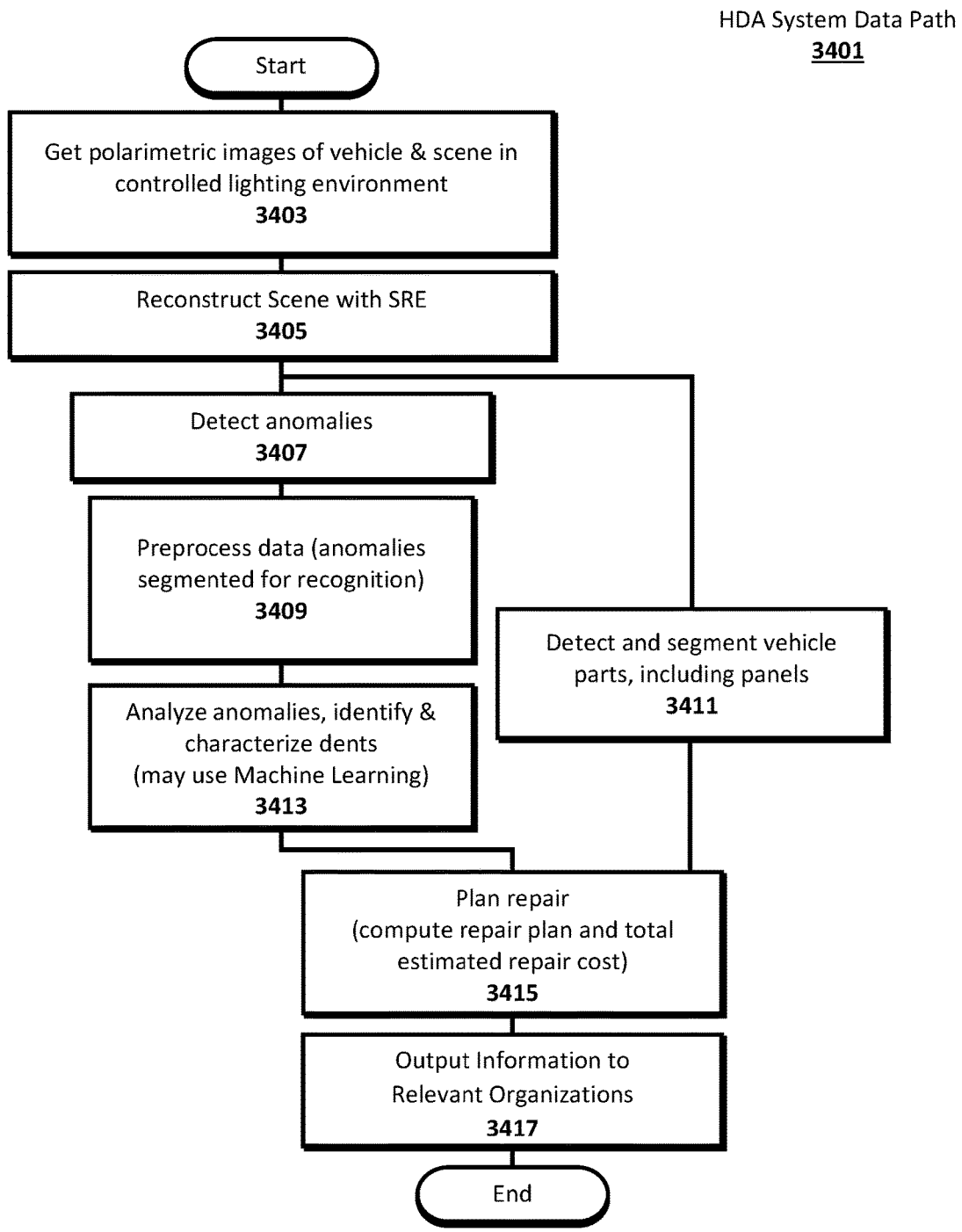
FIG. 34 is a flow diagram of an application process for a hail damage assessment (HDA), according to some example embodiments.

The HDA system process 3401 is shown in FIG. 34. In the polarimetric image acquisition operation 3403 a set of polarimetric images is acquired of a vehicle from multiple viewpoint in an enclosed environment where the lighting is controlled. At operation 3405, the scene reconstruction engine (SRE) processes the set of images to determine the location and pose of the camera in each image. Any related external information (e.g., from an inertial measurement unit) can be used and known photogrammetry methods can also be employed. The SRE estimates the scene light field to the extent needed to determine the incident light on the surfaces of interest. A model of the exitant light from the enclosure and lighting is acquired during system setup or in later operations and is used in this process.

The BLIF function is estimated by the SRE for the surfaces. This is based on observing polarization from multiple viewpoints looking at a surface region presumed to be relatively flat (negligible curvature) or of nearly constant curvature. Knowing the estimated surface illumination and BLIF, the exitant polarization is estimated for all relevant directions. The SRE estimates for each scene voxel the postulated surfel presence (voxel occupied or empty), the sub-voxel surfel position, and the surfel orientation that best explain all observations of polarized light exiting the voxel. For example, voxel and surfel characteristics are evaluated based on radiometric consistency between polarized light rays exiting each voxel under consideration. Each resulting surfel represents approximately the area of a surface that projects on to a single pixel of the nearest camera, typically located a few feet from the most distant vehicle surface point. For each surfel the following (locally differential) data is computed: depth, normal vector and BLIF.

Each relevant region of the vehicle surface is examined to identify potential anomalies for further analysis. This information is used by an anomaly detector module at operation 3407 to detect anomalies and also a panel segmentation module at operation 3411 to separate the vehicles into panels for later use in planning repairs.

One skilled in the art understands that many methods can be used to exploit this information to detect and characterize hail damage. In the preferred embodiment of the invention, machine learning and/or machine intelligence is used to improve the recognition of hail damage in the presence of other damage and debris. At operation 3409, the HDA preprocessing module, sensed normal vectors and the 3D reconstructions are used to create datasets for machine learning use. This could be, for example, synthetic images from a viewpoint directly above a potential dent, a "hail view" image, augmented with additional information.

This process begins by determining a mathematical model of the undamaged vehicle panel being examined. This can be derived from the 3D locations of the surfels that do not appear (as detected in the acquired images) to be part of any damage or debris (e.g., normals vary only slowly). If a nominal model of the surface is available based on the vehicle model, it can be employed here. Next, for each surfel, the deviation of measured or computed values from the expected values are computed. In the case of normals, this is the deviation of the sensed normal from the expected normal at that location on the mathematical model of the surface (e.g., dot product). For sensed vectors where the deviation is significant, the direction of the vector in the local surface plane relative, say, to the coordinate system of the vehicle, is computed. This gives a magnitude of the normal vector's deviation and a direction. Large deviations pointing inward from a circle indicate, for example, the walls of a dent. Other information, such as the difference in reflective properties of the surfel from that expected and the surfel's spatial deviation from the mathematical surface (e.g., depth), would also be attached to each surfel. This can, for example, be encoded into an image format combining depth, normal and reflectance.

The next operation is to normalize and "flatten" the data. This means resizing the surfels to a uniform size and transforming them into a flat array, similar to an image pixel array. The local "up" direction can also be added. The expected direction of impact computed for any dent is then compared to neighboring dents and to the assumed direction of hail movement. This then forms the initial dataset to be encoded into a format that can be fed to a machine intelligence (MI) and/or database module for recognizing patterns from dents caused by hail. Shapes highlighted with associated information form patterns that are ultimately recognized as hail dents at operation 3413 by machine intelligence and/or database module.

The results are input, at operation 3415, into a repair planner module where the dent information is analyzed to generate a repair plan to be later used to estimate the cost. The results of panel segmentation module from operation 3411 are used here to analyze the anomalies by panel. The resulting plans and related information are then sent to relevant organizations such as insurance companies and repair shops in operation 3417 by an output processing module.

Figure 35:
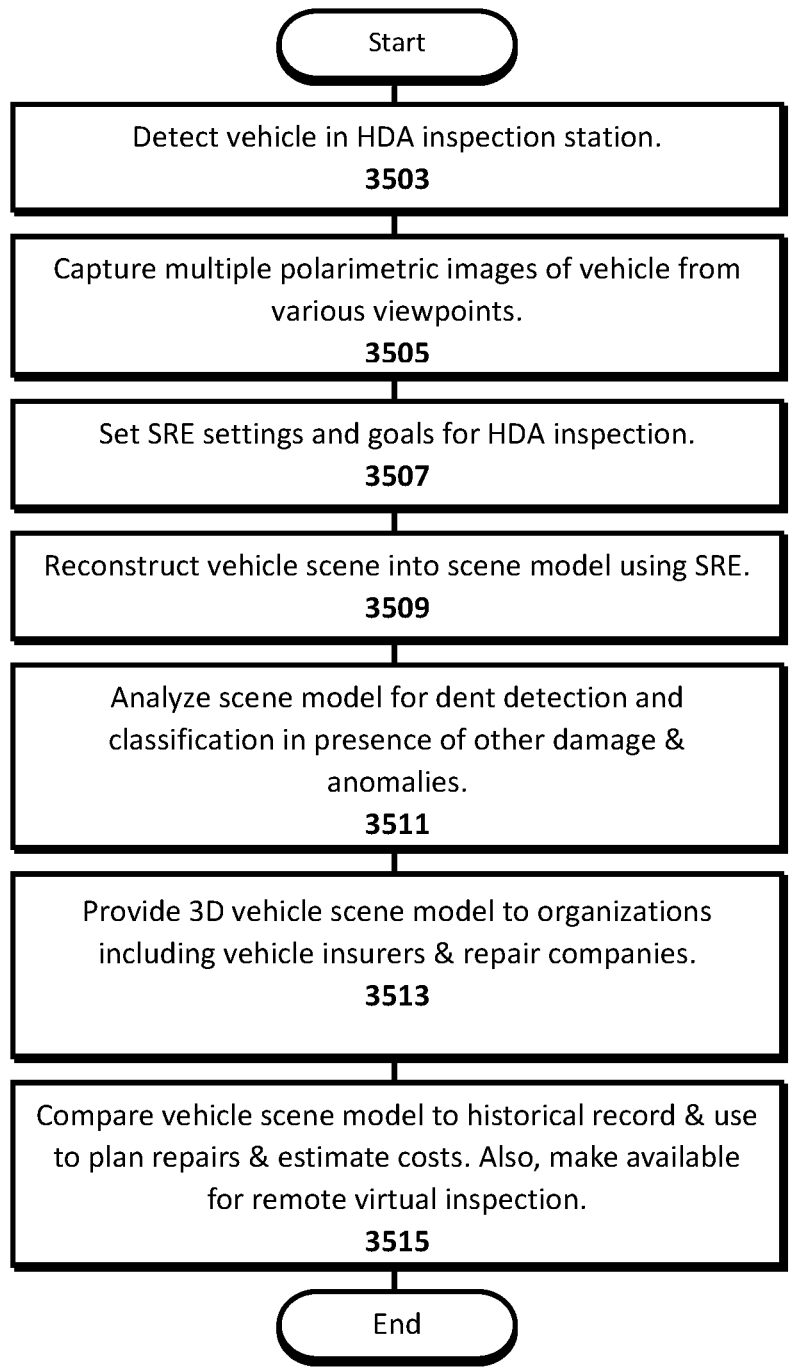
FIG. 35 is a flow diagram of an HDA inspection process, according to some example embodiments.

HDA inspection process 3501 is used to inspect a vehicle for hail damage and is shown in FIG. 35. This starts at operation 3503 with detecting the vehicle driven into the inspection station. In the illustrated embodiment, the vehicle stops for inspection but someone skilled in the art will know that the vehicle could also be inspected while moving either under its own power or by some external means. The images are then acquired in operation 3505.

The SRE uses various parameters to guide its operation in reconstructing a scene. Operation 3507 acquires the setting and goal parameters relevant for HDA inspection. The reconstruction is then performed in operation 3509. The results are then analyzed by the machine intelligence and/or database module in operation 3511. The regions where anomalies are detected are examined. They are classified as caused by hail or something else such as non-hail damage, debris such as tar and so on. Those identified as hail dents are further characterized (e.g., size, location, depth).

The 3D model of the vehicle including identified dents and other anomalies is distributed to relevant parties' systems in operation 3513, perhaps to geographically distributed locations. Such information is used for different purposes in operation 3515. For example, an insurance company will use its internal methods to compute what it will pay for repairs. Its inspectors may access the 3D model for an in-depth examination of the situation, possibly including original or synthetic images of the vehicle, vehicle panels or individual dents. The 3D model may be viewed from any viewpoint for a full understanding. For example, the 3D model with detailed surface and reflectance information can be "relighted" with simulated illumination to mimic real-life inspection. Insurance companies may also compare historical records to determine if damage submitted for repair had been previously reported. Repair companies can use the same of similar information and capabilities to submit a repair cost.

Although process steps, algorithms or the like, including without limitation with reference to processes described herein, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

It will be appreciated that as used herein, the terms system, subsystem, service, logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A volumetric scene reconstruction engine for forming a stored volumetric scene model of a real scene, said scene reconstruction engine comprising:
    at least one digital data processor connected to communicate with digital data memory and data input/output circuits, said at least one digital data processor having been configured to:
    access data defining digital images of a light field in a real scene containing different types of media, said digital images having been formed by a camera from opposingly directed poses, each digital image containing image data elements defined by stored data representing light field flux received by light sensing detectors in the camera;
    process said digital images to form a digital volumetric scene model representing the real scene, the volumetric scene model (i) containing volumetric data elements defined by stored data representing one or more media characteristics and (ii) containing solid angle data elements defined by stored data representing the flux of the light field, adjacent volumetric data elements forming corridors, at least one of the volumetric data elements in at least one corridor representing media that is partially light transmissive; and
    store said digital volumetric scene model data in said digital data memory.

2. The volumetric scene reconstruction engine as in claim 1 further comprising:
    a digital camera configured to acquire and store said digital images while aiming said camera in different poses within a workspace of said real scene.

3. The volumetric scene reconstruction engine as in claim 2 wherein said digital camera is a user-borne portable camera including at least one digital data processor configured to acquire said digital images and to communicate at least some data to a remote data processing site where at least some of the volumetric scene model processing is performed.

4. The volumetric scene reconstruction engine as in claim 3 wherein said user-borne portable camera is carried within a frame for user-worn eye-glasses.

5. The volumetric scene reconstruction engine as in claim 1 wherein said image data elements include data representing a sensed flux value of polarized light for a plurality of predetermined polarization characteristics.

6. The volumetric scene reconstruction engine as in claim 5 wherein said real scene includes a hail damaged vehicle panel surface, and said volumetric scene reconstruction engine is further configured to:
    compare a reconstructed scene model of the hail damaged vehicle panel to that of a corresponding undamaged vehicle panel surface model; and
    analyze resulting comparison data to provide a quantitative measure of detected hail damage.

7. The volumetric scene reconstruction engine as in claim 5 wherein at least some of said volumetric data elements represent media surface elements that have a surface element normal determined using said polarization characteristics.

8. The volumetric scene reconstruction engine as in claim 7 wherein a surface normal gradient formed from adjacent surface element normals is used as a localized feature descriptor for labeling corresponding features across plural polarimetric images.

9. The volumetric scene reconstruction engine as in claim 1 wherein at least one of said corridors occupies a region between a light sensing detector in a camera at a time when a respectively associated digital image was formed and a volumetric data element represents a media reflective surface.

10. The volumetric scene reconstruction engine as in claim 1 wherein said volumetric scene reconstruction engine is further configured to accept user identification of at least one scene reconstruction goal and wherein said processing is iteratively continued until the identified goal has been achieved to a predetermined degree of accuracy in the volumetric scene model by the scene reconstruction engine.

11. The volumetric scene reconstruction engine as in claim 10 wherein said volumetric scene reconstruction engine is further configured to iteratively repeat said processing until angular resolution of volumetric data elements in the volumetric scene model from a viewing frustum and the angular resolution of solid angle data elements is better than angular resolution of one minute.

12. The volumetric scene reconstruction engine as in claim 10 wherein images of a goal-defining object have been taken at differing focal plane distances.

13. The volumetric scene reconstruction engine as in claim 1 wherein said volumetric scene reconstruction engine has been configured to organize and store said volumetric data elements in a spatially sorted and hierarchical manner.

14. The volumetric scene reconstruction engine as in claim 1 wherein said solid angle data elements are stored in a solid-angle octree (SAO) format.

15. The volumetric scene reconstruction engine as in claim 1 wherein said volumetric scene reconstruction engine is further configured to employ a global, non-derivative, non-linear optimization method to compute the minimum of a cost function used to form characteristics of volumetric data elements and solid angle data elements in said scene model.

16. The volumetric scene reconstruction engine as in claim 1 wherein said volumetric scene reconstruction engine is further configured to compare (a) projected images of a previously constructed digital volumetric scene model to (b) respectively corresponding digital images of the real scene.

17. The volumetric scene reconstruction engine as in claim 16 wherein said volumetric scene reconstruction engine is further configured to partition the digital volumetric scene model into smaller temporarily independent models.

18. The volumetric scene reconstruction engine as in claim 1 wherein a plurality of said solid angle data elements are centered at a point in the volumetric scene model.

19. The volumetric scene reconstruction engine as in claim 1 wherein said volumetric scene reconstruction engine is further configured to use spans to perform perspective projection of light in a scene.

20. The volumetric scene reconstruction engine of claim 1 implemented in processors without using general divide operations.

21. A volumetric scene reconstruction engine for constructing a stored volumetric scene model of a quotidian scene, said volumetric scene reconstruction engine comprising:
    a digital camera and at least one digital data processor connected to communicate with said digital camera, digital data memory and data input/output circuits, said at least one digital camera and data processor having been configured to:
    acquire digital images of a light field in a real scene containing different types of media while aiming a camera in different directions from different positions within a workspace of said real scene, each digital image containing image data elements defined by stored data representing one or more sensed radiometric characteristics of the light field including a measured radiance value of polarized light for at least one predetermined polarization characteristic;
    access data defining said digital images;
    process said digital image data into digital volumetric scene model data including (a) corridors of adjacent volumetric data elements representing said media of said real scene and (b) solid angle data elements representing said light field of said real scene, some of said volumetric elements in a plurality of corridors representing partially transmissive media,
    wherein said corridors extend outwardly from a light sensor position, at a time when a respectively associated digital image was formed, and at least some of said volumetric data elements located at distal ends of the corridors represent a non-transmissive reflective media surface that is featureless when observed via non-polarized light; and
    store said digital volumetric scene model data in said digital data memory.

22. The volumetric scene reconstruction engine as in claim 21 wherein said digital camera is a user-borne digital camera and wherein said processing is at least partially performed at a remote site that is in data communication with the user-borne digital camera.

23. A method for forming a stored volumetric scene model of a real scene, said method comprising:
    accessing data defining digital images of a light field in a real scene containing different types of media, said digital images having been formed by a camera from opposingly directed poses, each digital image containing image data elements defined by stored data representing light field flux received by light sensing detectors in the camera;
    processing said digital images with a scene reconstruction engine to form a digital volumetric scene model representing the real scene, the volumetric scene model (i) containing volumetric data elements defined by stored data representing one or more media characteristics and (ii) containing solid angle data elements defined by stored data representing the flux of the light field, adjacent volumetric data elements forming corridors, at least one of the volumetric data elements in at least one corridor representing media that is partially light transmissive; and
    storing said digital volumetric scene model data in a digital data memory.

24. The method as in claim 23 further comprising:
    acquiring and storing said digital images while aiming a camera in different poses within a workspace of said real scene.

25. The method as in claim 24 wherein a user-borne portable camera is used to acquire said digital images and to communicate at least some data to a remote data processing site where at least some of the volumetric scene model processing is performed.

26. The method as in claim 25 wherein said user-borne portable camera is carried within a frame for user-worn eye-glasses.

27. The method as in claim 23 wherein said digital image data elements include data representing a sensed flux value of polarized light for a plurality of predetermined polarization characteristics.

28. The method as in claim 27 wherein said real scene includes a hail damaged vehicle panel surface, and said method further comprises:
    comparing a reconstructed scene model of the hail damaged vehicle panel to that of a corresponding undamaged vehicle panel surface model; and
    analyzing resulting comparison data to provide a quantitative measure of detected hail damage.

29. The method as in claim 27 wherein at least some of said volumetric data elements represent media surface elements that have a surface element normal determined using said polarization characteristics.

30. The method as in claim 29 wherein a surface normal gradient formed from adjacent surface element normals is used as a localized feature descriptor for labeling corresponding features across plural polarimetric images.

31. The method as in claim 23 wherein at least one of said corridors occupies a region between a light sensing detector in a camera at a time when a respectively associated digital image was formed and a volumetric data element represents a media reflective surface.

32. The method as in claim 23 further comprising user identification of at least one scene reconstruction goal and wherein said processing is iteratively continued until the identified goal has been achieved to a predetermined degree of accuracy in the volumetric scene model by the scene reconstruction engine.

33. The method as in claim 32 wherein said processing step is iteratively repeated until angular resolution of volumetric data elements in the volumetric scene model from a viewing frustum and the angular resolution of solid angle data elements is better than angular resolution of one minute.

34. The method as in claim 32 wherein images of a goal-defining object have been taken at differing focal plane distances.

35. The method as in claim 23 wherein said storing step organizes and stores said volumetric data elements in a spatially sorted and hierarchical manner.

36. The method as in claim 23 wherein said solid angle data elements are stored in a solid-angle octree (SAO) format.

37. The method as in claim 23 wherein said processing step employs a global, non-derivative, non-linear optimization method to compute the minimum of a cost function used to form characteristics of volumetric data elements and solid angle data elements in said scene model.

38. The method as in claim 23 wherein said processing step includes comparing (a) projected images of a previously constructed digital volumetric scene model to (b) respectively corresponding digital images of the real scene.

39. The method as in claim 38 wherein said processing step includes partitioning the digital volumetric scene model into smaller temporarily independent models.

40. The method as in claim 23 wherein a plurality of said solid angle data elements are centered at a point in the volumetric scene model.

41. The method as in claim 23 wherein said processing step includes using spans to perform perspective projection of light in a scene.

42. The method of claim 23 implemented in processors without using general divide operations.

43. A method for constructing a stored volumetric scene model of a quotidian scene, said method comprising:
  acquiring digital images of a light field in a real scene containing different types of media while aiming a camera in different directions from different positions within a workspace of said real scene, each digital image containing image data elements defined by stored data representing one or more sensed radiometric characteristics of the light field including a measured radiance value of polarized light for at least one predetermined polarization characteristic;
  accessing data defining said digital images;
  processing said digital image data with a scene reconstruction engine into digital volumetric scene model data including (a) corridors of adjacent volumetric data elements representing said media of said real scene and (b) solid angle data elements representing said light field of said real scene, some of said volumetric elements in a plurality of corridors representing partially transmissive media,
    wherein said corridors extend outwardly from a light sensor position, at a time when a respectively associated digital image was formed, and at least some of said volumetric data elements located at distal ends of the corridors represent a non-transmissive reflective media surface that is featureless when observed via non-polarized light; and
  storing said digital volumetric scene model data in a digital data memory.

44. The method as in claim 43 wherein said acquiring step is performed with a user-borne digital camera and said processing step is at least partially performed at a remote site that is in data communication with the user-borne digital camera.

45. A non-volatile digital memory medium containing executable computer program instructions which, when executed on at least one processor, effect:
  accessing data defining digital images of a light field in a real scene containing different types of media, said digital images having been formed by a camera from opposingly directed poses, each digital image containing image data elements defined by stored data representing light field flux received by light sensing detectors in the camera;
  processing said digital images to form a digital volumetric scene model representing the real scene, the volumetric scene model (i) containing volumetric data elements defined by stored data representing one or more media characteristics and (ii) containing solid angle data elements defined by stored data representing the flux of the light field, adjacent volumetric data elements forming corridors, at least one of the volumetric data elements in at least one corridor representing media that is partially light transmissive; and
  storing said digital volumetric scene model data in a digital data memory.

46. The non-volatile digital memory medium as in claim 45 wherein said computer program instructions, when executed, provide an interface with a digital camera to further effect:
  acquiring and storing said digital images while aiming a camera in different poses within a workspace of said real scene.

47. The non-volatile digital memory medium as in claim 46 wherein a user-borne portable camera is used to acquire said digital images and to communicate at least some data to a remote data processing site where at least some of the volumetric scene model processing is performed.

48. The non-volatile digital memory medium as in claim 47 wherein said user-borne portable camera is carried within a frame for user-worn eye-glasses.

49. The non-volatile digital memory medium as in claim 45 wherein said digital image data elements include data representing a sensed flux value of polarized light for a plurality of predetermined polarization characteristics.

50. The non-volatile digital memory medium as in claim 49 wherein said real scene includes a hail damaged vehicle panel surface, and said computer program instructions, when executed, further effect:
  comparing a reconstructed scene model of the hail damaged vehicle panel to that of a corresponding undamaged vehicle panel surface model; and
  analyzing resulting comparison data to provide a quantitative measure of detected hail damage.

51. The non-volatile digital memory medium as in claim 49 wherein at least some of said volumetric data elements represent media surface elements that have a surface element normal determined using said polarization characteristics.

52. The non-volatile digital memory medium as in claim 51 wherein a surface normal gradient formed from adjacent surface element normals is used as a localized feature descriptor for labeling corresponding features across plural polarimetric images.

53. The non-volatile digital memory medium as in claim 45 wherein at least one of said corridors occupies a region between a light sensing detector in a camera at a time when a respectively associated digital image was formed and a volumetric data element represents a media reflective surface.

54. The non-volatile digital memory medium as in claim 45 wherein said program instructions, when executed, further effect user identification of at least one scene reconstruction goal and wherein said processing is iteratively continued until the identified goal has been achieved to a predetermined degree of accuracy in the volumetric scene model.

55. The non-volatile digital memory medium as in claim 54 wherein said processing is iteratively repeated until angular resolution of volumetric data elements in the volumetric scene model from a viewing frustum and the angular resolution of solid angle data elements is better than angular resolution of one minute.

56. The non-volatile digital memory medium as in claim 54 wherein images of a goal-defining object have been taken at differing focal plane distances.

57. The non-volatile digital memory medium as in claim 45 wherein said computer program instructions, when executed, effect organizing and storing said volumetric data elements in a spatially sorted and hierarchical manner.

58. The non-volatile digital memory medium as in claim 45 wherein said solid angle data elements are stored in a solid-angle octree (SAO) format.

59. The non-volatile digital memory medium as in claim 45 wherein said processing employs a global, non-derivative, non-linear optimization method to compute the minimum of a cost function used to form characteristics of volumetric data elements and solid angle data elements in said scene model.

60. The non-volatile digital memory medium as in claim 45 wherein said processing includes comparing (a) projected images of a previously constructed digital volumetric scene model to (b) respectively corresponding digital images of the real scene.

61. The non-volatile digital memory medium as in claim 60 wherein said processing includes partitioning the digital volumetric scene model into smaller temporarily independent models.

62. The non-volatile digital memory medium as in claim 45 wherein a plurality of said solid angle data elements are centered at a point in the volumetric scene model.

63. The non-volatile digital memory medium as in claim 45 wherein said processing includes using spans to perform perspective projection of light in a scene.

64. The non-volatile digital memory medium as in claim 45 wherein said computer program instructions are executed in processors without using general divide operations.

65. A non-volatile digital memory medium containing executable computer program instructions which, when executed on at least one processor, construct a stored volumetric scene model of a quotidian scene, said program instructions, when executed, effecting:
acquiring digital images of a light field in a real scene containing different types of media while aiming a camera in different directions from different positions within a workspace of said real scene, each digital image containing image data elements defined by stored data representing one or more sensed radiometric characteristics of the light field including a measured radiance value of polarized light for at least one predetermined polarization characteristic;
accessing data defining said digital images;
processing said digital image data into digital volumetric scene model data including (a) corridors of adjacent volumetric data elements representing said media of said real scene and (b) solid angle data elements representing said light field of said real scene, some of said volumetric elements in a plurality of corridors representing partially transmissive media,
wherein said corridors extend outwardly from a light sensor position, at a time when a respectively associated digital image was formed, and at least some of said volumetric data elements located at distal ends of the corridors represent a non-transmissive reflective media surface that is featureless when observed via non-polarized light; and
storing said digital volumetric scene model data in a digital data memory.

66. The non-volatile digital memory medium as in claim 65 wherein said acquiring is performed with a user-borne digital camera and said processing is at least partially performed at a remote site that is in data communication with the user-borne digital camera.

* * * * *